United States Patent
Saini et al.

(12)

(10) Patent No.: US 9,945,220 B2
(45) Date of Patent: Apr. 17, 2018

(54) METHODS AND SYSTEM FOR CREATING HIGH CONDUCTIVITY FRACTURES

(71) Applicant: Lubrizol Oilfield Solutions, Inc., Wickliffe, OH (US)

(72) Inventors: Rajesh K. Saini, Houston, TX (US); Clayton S. Smith, Houston, TX (US); Mathew M. Samuel, Houston, TX (US); Kern L. Smith, Houston, TX (US); Chih-Chau Hwang, Houston, TX (US); Leonid Vigderman, Houston, TX (US); Duane Treybig, Houston, TX (US); Pratyush Singh, Houston, TX (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 14/546,246

(22) Filed: Nov. 18, 2014

(65) Prior Publication Data

US 2015/0101808 A1 Apr. 16, 2015

Related U.S. Application Data

(63) Continuation-in-part of application No. 12/690,292, filed on Jan. 20, 2010, now Pat. No. 8,950,493, and a
(Continued)

(51) Int. Cl.
*C09K 8/64* (2006.01)
*C09K 8/528* (2006.01)
(Continued)

(52) U.S. Cl.
CPC .............. *E21B 43/267* (2013.01); *C09K 8/68* (2013.01); *C09K 8/805* (2013.01); *C09K 8/506* (2013.01);
(Continued)

(58) Field of Classification Search
CPC ............ Y10S 507/901; Y10S 507/924; Y10S 507/936; C09K 8/58; C09K 8/60; C09K 8/86
(Continued)

(56) References Cited

U.S. PATENT DOCUMENTS 2,196,042 A 4/1940 Timpson ........................ 23/11
2,390,153 A 12/1945 Kern .............................. 260/72
(Continued)

FOREIGN PATENT DOCUMENTS

CA 2125513 1/1995
DE 4027300 5/1992 ............. B10D 53/14
(Continued)

*Primary Examiner* — Aiqun Li
(74) *Attorney, Agent, or Firm* — Christopher P. Demas; Teresan W. Gilbert

(57) ABSTRACT

Methods for forming proppant pillars in a formation during formation fracturing include include periods of pumping a first fracturing fluid including a proppant and an aggregating composition including a reaction product of a phosphate compound or a plurality of phosphate and an amine, periods of pumping a second fracturing fluid excluding a proppant and an aggregating composition including a reaction product of a phosphate compound and periods of pumping a third fracturing fluid including an aggregating composition including a reaction product of a phosphate compound, where the pumping of the three fracturing fluids may be in any order and may involve continuous pumping, pulse pumping, or non-continuous pumping.

4 Claims, 13 Drawing Sheets

Related U.S. Application Data continuation-in-part of application No. 13/914,513, filed on Jun. 10, 2013, now abandoned, and a continuation-in-part of application No. 13/914,526, filed on Jun. 10, 2013, and a continuation-in-part of application No. 14/308,160, filed on Jun. 18, 2014, and a continuation-in-part of application No. 12/247,985, filed on Oct. 8, 2008, now abandoned.

(60) Provisional application No. 61/905,340, filed on Nov. 18, 2013.

(51) Int. Cl.
| | |
|---|---|
| *E21B 43/26* | (2006.01) |
| *E21B 43/267* | (2006.01) |
| *C09K 8/80* | (2006.01) |
| *C09K 8/68* | (2006.01) |
| *C09K 8/506* | (2006.01) |

(52) U.S. Cl.
CPC ...... *C09K 2208/04* (2013.01); *C09K 2208/08* (2013.01)

(58) Field of Classification Search
USPC .......................................... 507/238, 269, 901
See application file for complete search history.

(56) References Cited

U.S. PATENT DOCUMENTS

| | | | | |
|---|---|---|---|---|
| 2,419,755 A | * | 4/1947 | Albaugh | C09K 8/602 507/242 |
| 2,805,958 A | | 7/1959 | Bueche et al. | 106/308 |
| 3,059,909 A | | 10/1962 | Wise | 261/39.3 |
| 3,163,219 A | | 12/1964 | Wyant et al. | 166/283 |
| 3,301,723 A | | 1/1967 | Chrisp | 149/20 |
| 3,301,848 A | | 1/1967 | Halleck | 536/123.1 |
| 3,303,896 A | | 2/1967 | Tillotson et al. | 175/69 |
| 3,317,430 A | | 5/1967 | Priestley et al. | 510/503 |
| 3,565,176 A | | 2/1971 | Wittenwyler | 166/270 |
| 3,856,921 A | | 12/1974 | Shrier et al. | 423/228 |
| 3,888,312 A | | 6/1975 | Tiner et al. | 166/308.5 |
| 3,933,205 A | | 1/1976 | Kiel | 166/308.1 |
| 3,937,283 A | | 2/1976 | Blauer et al. | 166/307 |
| 3,960,736 A | | 6/1976 | Free et al. | 507/216 |
| 3,965,982 A | | 6/1976 | Medlin | 166/249 |
| 3,990,978 A | | 11/1976 | Hill | 507/235 |
| 4,007,792 A | | 2/1977 | Meister | 166/308.2 |
| 4,052,159 A | | 10/1977 | Fuerst et al. | |
| 4,067,389 A | | 1/1978 | Savins | 166/246 |
| 4,108,782 A | | 8/1978 | Thompson | 507/205 |
| 4,112,050 A | | 9/1978 | Sartori et al. | 423/223 |
| 4,112,051 A | | 9/1978 | Sartori et al. | 423/223 |
| 4,112,052 A | | 9/1978 | Sartori et al. | 423/223 |
| 4,113,631 A | | 9/1978 | Thompson | 507/202 |
| 4,378,845 A | | 4/1983 | Medlin et al. | 166/297 |
| 4,385,935 A | | 5/1983 | Skyeldal | 106/607 |
| 4,461,716 A | | 7/1984 | Barbarin et al. | 252/307 |
| 4,479,041 A | | 10/1984 | Fenwick et al. | 200/81 R |
| 4,506,734 A | | 3/1985 | Nolte | 166/308.1 |
| 4,514,309 A | | 4/1985 | Wadhwa | 507/211 |
| 4,541,935 A | | 9/1985 | Constien et al. | 507/225 |
| 4,549,608 A | | 10/1985 | Stowe et al. | 166/280.1 |
| 4,561,985 A | | 12/1985 | Glass, Jr. | 507/108 |
| 4,623,021 A | | 11/1986 | Stowe | 166/250.1 |
| 4,654,266 A | | 3/1987 | Kachnik | 428/403 |
| 4,657,081 A | | 4/1987 | Hodge | 166/380.5 |
| 4,660,643 A | | 4/1987 | Perkins | 166/283 |
| 4,683,068 A | | 7/1987 | Kucera | 507/201 |
| 4,686,052 A | | 8/1987 | Baranet et al. | 507/244 |
| 4,695,389 A | | 9/1987 | Kubala | 507/244 |
| 4,705,113 A | | 11/1987 | Perkins | 166/302 |
| 4,714,115 A | | 12/1987 | Uhri | 166/308.1 |
| 4,718,490 A | | 1/1988 | Uhri | 166/281 |
| 4,724,905 A | | 2/1988 | Uhri | 166/250.1 |
| 4,725,372 A | | 2/1988 | Teot et al. | 507/129 |
| 4,739,834 A | | 4/1988 | Peiffer et al. | 166/308.4 |
| 4,741,401 A | | 5/1988 | Walles et al. | 166/300 |
| 4,748,011 A | | 5/1988 | Baize | 423/228 |
| 4,779,680 A | | 10/1988 | Sydansk | 166/300 |
| 4,795,574 A | | 1/1989 | Syrinek et al. | 507/238 |
| 4,817,717 A | | 4/1989 | Jennings, Jr. et al. | 166/278 |
| 4,830,106 A | | 5/1989 | Uhri | 166/250.1 |
| 4,846,277 A | | 7/1989 | Khalil et al. | 166/280.1 |
| 4,848,468 A | | 7/1989 | Hazlett et al. | 166/300 |
| 4,852,650 A | | 8/1989 | Jennings, Jr. et al. | 166/250.1 |
| 4,869,322 A | | 9/1989 | Vogt, Jr. et al. | 166/280.1 |
| 4,892,147 A | | 1/1990 | Jennings, Jr. et al. | 166/280.2 |
| 4,926,940 A | | 5/1990 | Stromswold | 166/247 |
| 4,938,286 A | | 7/1990 | Jennings, Jr. | 166/280.1 |
| 4,978,512 A | | 12/1990 | Dillon | 423/226 |
| 5,005,645 A | | 4/1991 | Jennings, Jr. et al. | 166/280.1 |
| 5,024,276 A | | 6/1991 | Borchardt | 166/308.6 |
| 5,067,556 A | | 11/1991 | Fudono et al. | 62/196.4 |
| 5,074,359 A | | 12/1991 | Schmidt | 166/280.1 |
| 5,074,991 A | | 12/1991 | Weers | 208/236 |
| 5,082,579 A | | 1/1992 | Dawson | 507/211 |
| 5,106,518 A | | 4/1992 | Cooney et al. | 507/21 |
| 5,110,486 A | | 5/1992 | Manalastas et al. | 507/260 |
| 5,169,411 A | | 12/1992 | Weers | 44/421 |
| 5,224,546 A | | 7/1993 | Smith et al. | 166/300 |
| 5,228,510 A | | 7/1993 | Jennings, Jr. et al. | 166/263 |
| 5,246,073 A | | 9/1993 | Sandiford et al. | 166/295 |
| 5,259,455 A | | 11/1993 | Nimerick et al. | 166/308.5 |
| 5,330,005 A | | 7/1994 | Card et al. | 166/280.2 |
| 5,342,530 A | | 8/1994 | Aften et al. | 252/8.551 |
| 5,347,004 A | | 9/1994 | Rivers et al. | 544/180 |
| 5,363,919 A | | 11/1994 | Jennings, Jr. | 166/308.1 |
| 5,402,846 A | | 4/1995 | Jennings, Jr. et al. | 166/259 |
| 5,411,091 A | | 5/1995 | Jennings, Jr. | 166/280.1 |
| 5,424,284 A | | 6/1995 | Patel et al. | 507/129 |
| 5,439,055 A | | 8/1995 | Card et al. | 166/280.2 |
| 5,462,721 A | | 10/1995 | Pounds et al. | 423/226 |
| 5,465,792 A | | 11/1995 | Dawson et al. | 166/295 |
| 5,472,049 A | | 12/1995 | Chaffe et al. | 166/250.1 |
| 5,482,116 A | | 1/1996 | El-Rabaa et al. | 166/250.1 |
| 5,488,083 A | | 1/1996 | Kinsey, III et al. | 507/211 |
| 5,497,831 A | | 3/1996 | Hainey et al. | 166/308.1 |
| 5,501,275 A | | 3/1996 | Card et al. | 166/280.2 |
| 5,539,044 A | | 7/1996 | Dindi et al. | 524/570 |
| 5,551,516 A | | 9/1996 | Norman et al. | 166/308.2 |
| 5,624,886 A | | 4/1997 | Dawson et al. | 507/217 |
| 5,635,458 A | | 6/1997 | Lee et al. | 507/240 |
| 5,649,596 A | | 7/1997 | Jones et al. | 166/300 |
| 5,669,447 A | | 9/1997 | Walker et al. | 166/300 |
| 5,674,377 A | | 10/1997 | Sullivan, III et al. | 208/208 R |
| 5,688,478 A | | 11/1997 | Pounds et al. | 423/228 |
| 5,693,837 A | | 12/1997 | Smith et al. | 556/148 |
| 5,711,396 A | | 1/1998 | Joerg et al. | 180/444 |
| 5,722,490 A | | 3/1998 | Ebinger | 166/281 |
| 5,744,024 A | | 4/1998 | Sullivan, III et al. | 208/236 |
| 5,755,286 A | | 5/1998 | Ebinger | 166/281 |
| 5,775,425 A | | 7/1998 | Weaver et al. | 166/276 |
| 5,787,986 A | | 8/1998 | Weaver et al. | 166/280.2 |
| 5,806,597 A | | 9/1998 | Tjon-Joe-Pin et al. | 166/300 |
| 5,807,812 A | | 9/1998 | Smith et al. | 507/238 |
| 5,833,000 A | | 11/1998 | Weaver et al. | 166/276 |
| 5,853,048 A | | 12/1998 | Weaver et al. | 166/279 |
| 5,871,049 A | | 2/1999 | Weaver et al. | 166/276 |
| 5,877,127 A | | 3/1999 | Card et al. | 507/273 |
| 5,908,073 A | | 6/1999 | Nguyen et al. | 166/276 |
| 5,908,814 A | | 6/1999 | Patel et al. | 507/131 |
| 5,964,295 A | | 10/1999 | Brown et al. | 166/308.2 |
| 5,979,557 A | | 11/1999 | Card et al. | 166/300 |
| 5,980,845 A | | 11/1999 | Cherry | 423/229 |
| 6,001,887 A | | 12/1999 | Keup et al. | 516/118 |
| 6,016,871 A | | 1/2000 | Burts, Jr. | 166/300 |
| 6,035,936 A | | 3/2000 | Whalen | 166/308.5 |
| 6,047,772 A | | 4/2000 | Weaver et al. | 166/276 |
| 6,054,417 A | | 4/2000 | Graham et al. | 507/238 |
| 6,059,034 A | | 5/2000 | Rickards et al. | 166/280.2 |
| 6,060,436 A | | 5/2000 | Synder et al. | 507/266 |
| 6,063,972 A | | 5/2000 | Duncum et al. | 585/15 |

(56) References Cited

U.S. PATENT DOCUMENTS

| | | | |
|---|---|---|---|
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,055,628 B2 | 6/2006 | Grainger et al. | 175/66 |
| 7,186,353 B2 | 3/2007 | Novak | 252/70 |
| 7,268,100 B2 | 9/2007 | Kippie et al. | 507/244 |
| 7,350,579 B2 | 4/2008 | Gatlin et al. | 166/308.3 |
| 7,392,847 B2 | 7/2008 | Gatlin et al. | 166/280.2 |
| 7,517,447 B2 | 4/2009 | Gatlin | 208/236 |
| 7,565,933 B2 | 7/2009 | Kippie et al. | 166/372 |
| 7,566,686 B2 | 7/2009 | Kippie et al. | 507/213 |
| 7,712,535 B2 | 5/2010 | Venditto et al. | 166/308.2 |
| 7,767,628 B2 | 8/2010 | Kippie et al. | 507/102 |
| 7,829,510 B2 | 11/2010 | Gatlin et al. | 166/295 |
| 7,886,824 B2 | 2/2011 | Kakadjian et al. | 166/300 |
| 7,915,203 B2 | 3/2011 | Falana et al. | 507/138 |
| 7,932,214 B2 | 4/2011 | Zamora et al. | 507/202 |
| 7,942,201 B2 | 5/2011 | Ekstrand et al. | 166/246 |
| 7,956,017 B2 | 6/2011 | Gatlin et al. | 507/238 |
| 7,956,217 B2 | 6/2011 | Falana et al. | 562/572 |
| 7,971,659 B2 | 7/2011 | Gatlin et al. | 510/492 |
| 7,989,404 B2 | 8/2011 | Kakadjian et al. | 507/261 |
| 7,992,653 B2 | 8/2011 | Zamora et al. | 175/65 |
| 8,011,431 B2 | 9/2011 | van Petegem et al. | 166/270 |
| 8,028,755 B2 | 10/2011 | Darnell et al. | 166/379 |
| 8,034,750 B2 | 10/2011 | Thompson et al. | 507/273 |
| 8,084,401 B2 | 12/2011 | Lukocs et al. | 507/238 |
| 8,093,431 B2 | 1/2012 | Falana et al. | 564/471 |
| 8,097,567 B2 | 1/2012 | Wilson, Jr. | 507/131 |
| 8,141,661 B2 | 3/2012 | Kakadjian et al. | 175/69 |
| 8,158,562 B2 | 4/2012 | Wilson, Jr. et al. | 507/238 |
| 8,172,952 B2 | 5/2012 | Wanner et al. | 134/22.11 |
| 8,220,546 B2 | 7/2012 | Kakadjian et al. | 166/305.1 |
| 8,258,339 B2 | 9/2012 | Falana et al. | 562/572 |
| 8,273,693 B2 | 9/2012 | Schwartz | 507/238 |
| 8,287,640 B2 | 10/2012 | Zamora et al. | 106/677 |
| 8,362,298 B2 | 1/2013 | Falana et al. | 562/590 |
| 8,466,094 B2 | 6/2013 | Kakadjian et al. | 507/229 |
| 8,475,585 B2 | 7/2013 | Zamora et al. | 106/677 |
| 8,507,412 B2 | 8/2013 | Lukocs et al. | 507/238 |
| 8,507,413 B2 | 8/2013 | Wilson, Jr. | 507/240 |
| 8,524,639 B2 | 9/2013 | Falana et al. | 507/202 |
| 8,530,394 B2 | 9/2013 | Gatlin et al. | 507/239 |
| 8,563,481 B2 | 10/2013 | Gatlin et al. | 507/203 |
| 8,714,283 B2 | 5/2014 | Gatlin et al. | 175/69 |
| 8,728,989 B2 | 5/2014 | Kakadjian et al. | 507/221 |
| 8,772,203 B2 | 7/2014 | Schwartz | 507/128 |
| 8,835,364 B2 | 9/2014 | Thompson et al. | 507/267 |
| 8,841,240 B2 | 9/2014 | Kakadjian et al. | 507/221 |
| 8,846,585 B2 | 9/2014 | Falana et al. | 507/233 |
| 8,851,174 B2 | 10/2014 | Zamora et al. | 166/295 |
| 8,871,694 B2 | 10/2014 | Zamora et al. | 507/238 |
| 8,899,328 B2 | 12/2014 | Zamora et al. | 166/285 |
| 8,932,996 B2 | 1/2015 | Falana et al. | 507/128 |
| 8,944,164 B2 | 2/2015 | Veldman et al. | 166/276 |
| 8,946,130 B2 | 2/2015 | Zamora et al. | 507/204 |
| 8,950,493 B2 | 2/2015 | van Petegem et al. | 166/308.2 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2004/0261995 A1* | 12/2004 | Nguyen | C09K 8/80 166/279 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2006/0196661 A1* | 9/2006 | East, Jr. | C09K 8/80 166/276 |
| 2010/0252262 A1 | 10/2010 | Ekstrand et al. | 166/280.1 |
| 2010/0305010 A1 | 12/2010 | Falana et al. | 507/274 |
| 2010/0311620 A1 | 12/2010 | Kakadjian et al. | 507/136 |
| 2011/0001083 A1 | 1/2011 | Falana et al. | 252/178 |
| 2011/0177982 A1 | 7/2011 | Ekstrand et al. | 507/201 |
| 2011/0240131 A1 | 10/2011 | Parker | 137/13 |
| 2012/0071367 A1 | 3/2012 | Falana et al. | 507/103 |
| 2012/0073813 A1 | 3/2012 | Zamora et al. | 166/285 |
| 2012/0097893 A1 | 4/2012 | Wanner et al. | 252/184 |
| 2012/0273206 A1 | 11/2012 | Zamora et al. | 166/308.1 |
| 2012/0279727 A1 | 11/2012 | Kakadjian et al. | 166/386 |
| 2012/0295820 A1 | 11/2012 | Falana et al. | 507/128 |
| 2012/0302468 A1 | 11/2012 | Falana et al. | 507/110 |
| 2012/0325329 A1 | 12/2012 | Schwartz | 137/1 |
| 2013/0081820 A1 | 4/2013 | Falana et al. | 166/308.1 |
| 2013/0096038 A1 | 4/2013 | Kim et al. | 507/221 |
| 2013/0175477 A1 | 7/2013 | Falana et al. | 252/389.23 |
| 2013/0270012 A1 | 10/2013 | Kakadjian et al. | 175/65 |
| 2013/0274151 A1 | 10/2013 | Kakadjian et al. | 507/204 |
| 2013/0312977 A1 | 11/2013 | Lembcke et al. | 166/311 |
| 2013/0331301 A1 | 12/2013 | Falana et al. | 507/105 |
| 2014/0087977 A1 | 3/2014 | Kim et al. | 507/225 |
| 2014/0128294 A1 | 5/2014 | Gatlin et al. | 507/110 |
| 2014/0128308 A1 | 5/2014 | Levey et al. | 510/188 |
| 2014/0166285 A1 | 6/2014 | Santra et al. | 166/292 |
| 2014/0262287 A1 | 9/2014 | Treybig et al. | 166/305.1 |
| 2014/0262319 A1 | 9/2014 | Treybig et al. | 166/371 |
| 2014/0303048 A1 | 10/2014 | Kakadjian et al. | 507/236 |
| 2014/0315763 A1 | 10/2014 | Kakadjian et al. | 507/115 |
| 2014/0318793 A1 | 10/2014 | van Petergem et al. | 166/305.1 |
| 2014/0318795 A1 | 10/2014 | Thompson et al. | 166/308.5 |
| 2014/0323360 A1 | 10/2014 | Comarin et al. | 507/111 |
| 2014/0323362 A1 | 10/2014 | Falana et al. | 507/127 |
| 2015/0007989 A1 | 1/2015 | Tan et al. | 166/279 |
| 2015/0011440 A1 | 1/2015 | Zamora et al. | 507/202 |
| 2015/0051311 A1 | 2/2015 | Zamora et al. | 523/130 |
| 2015/0068747 A1 | 3/2015 | Hwang et al. | 166/280.2 |
| 2015/0072901 A1 | 3/2015 | Samuel et al. | 507/104 |
| 2015/0087561 A1 | 3/2015 | Falana et al. | 507/102 |
| 2015/0087562 A1 | 3/2015 | Falana et al. | 507/102 |

FOREIGN PATENT DOCUMENTS

| | | | |
|---|---|---|---|
| GB | 775376 | 10/1954 | |
| GB | 1073338 A | 6/1967 | |
| JP | 10001461 | 6/1988 | C07C 211/50 |
| JP | 08151422 | 11/1996 | |
| JP | 10110115 A | 4/1998 | |
| JP | 2005194148 A | 7/2005 | |
| WO | WO 98/56497 | 12/1998 | |
| WO | WO 2009141308 | 11/2009 | C09K 8/528 |

* cited by examiner

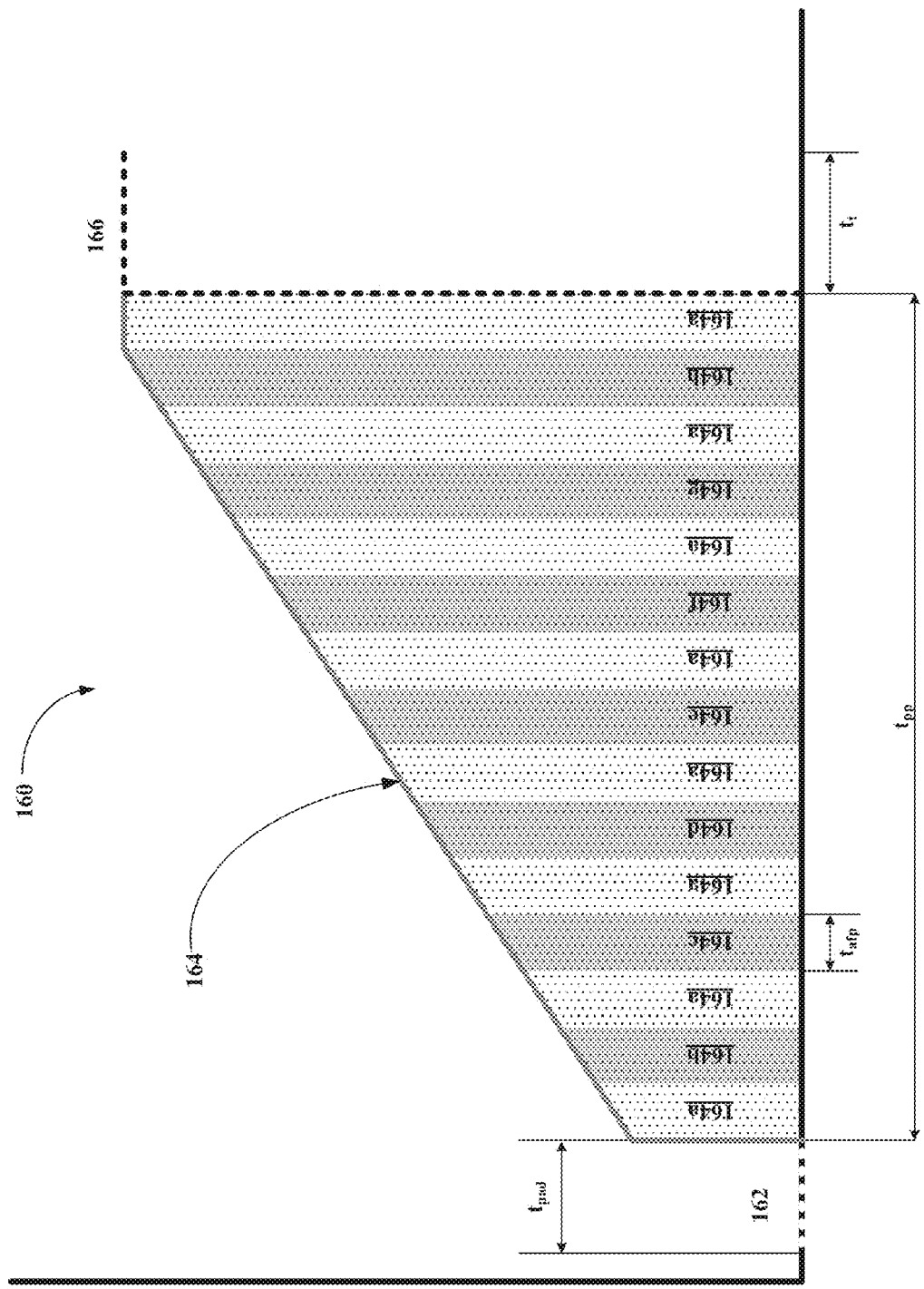

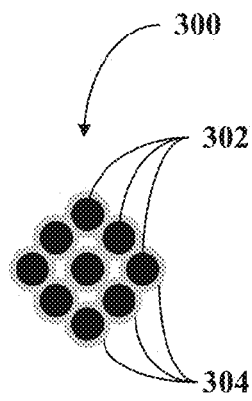
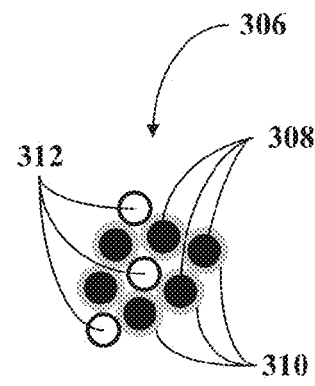
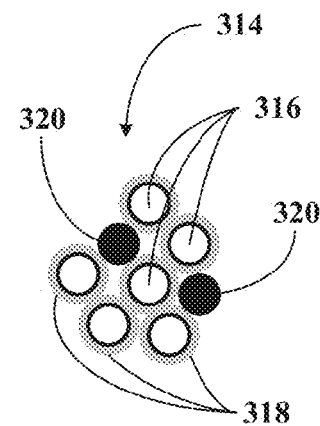
FIG. 3A  FIG. 3B  FIG. 3C
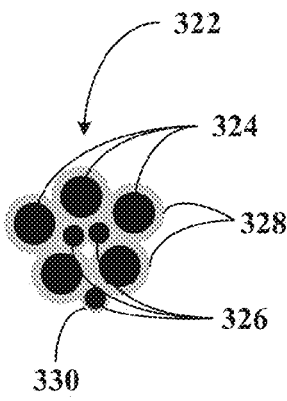
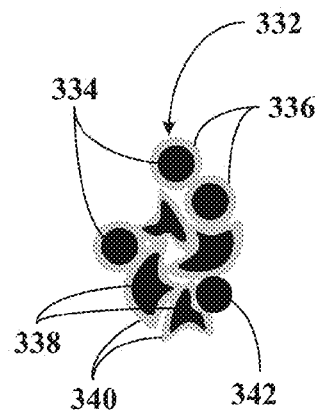
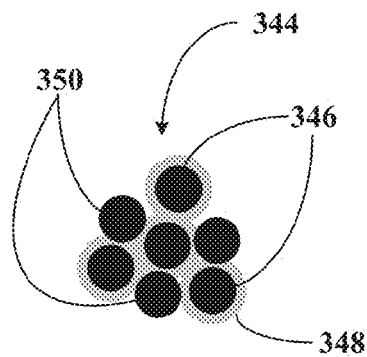
FIG. 3D  FIG. 3E  FIG. 3F
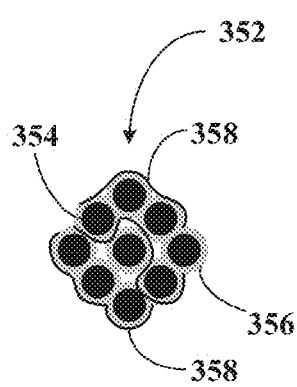
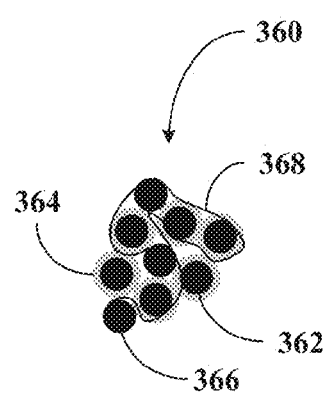
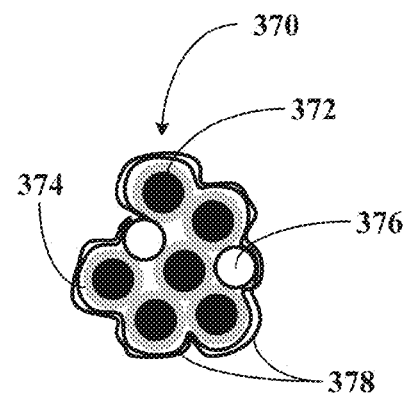
FIG. 3G  FIG. 3H  FIG. 3I

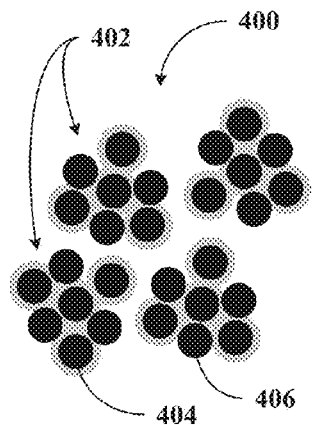
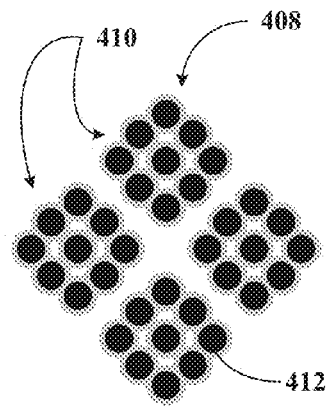
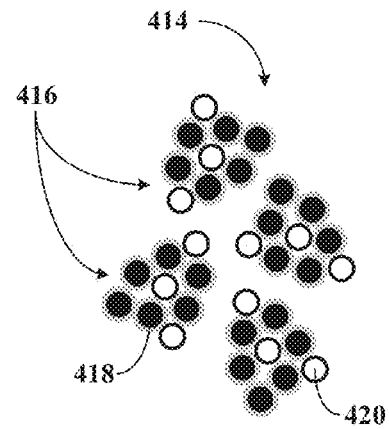
FIG. 4A  FIG. 4B  FIG. 4C
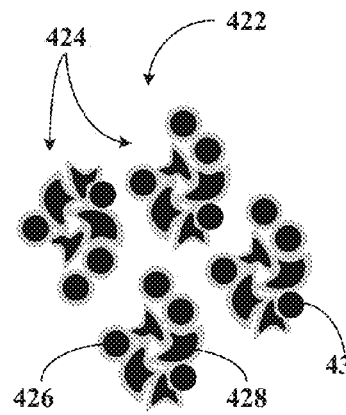
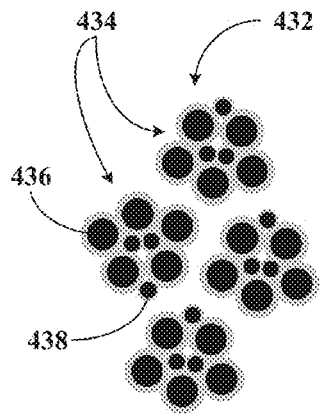
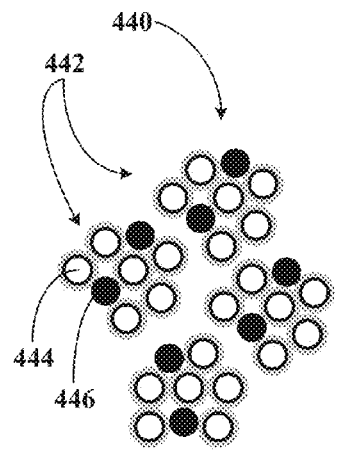
FIG. 4D  FIG. 4E  FIG. 4F
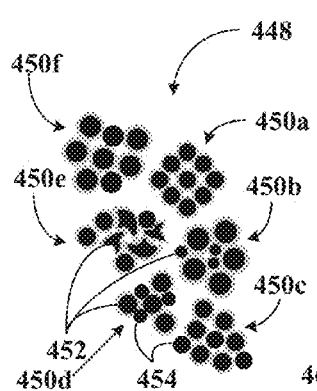
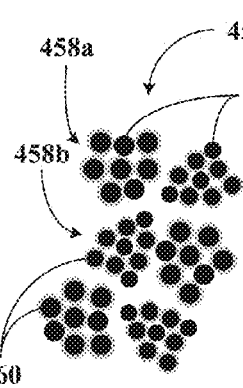
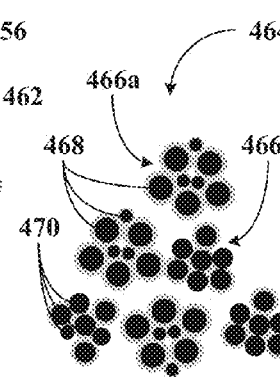
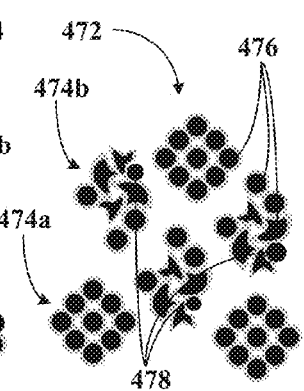
FIG. 4G  FIG. 4H  FIG. 4I  FIG. 4J

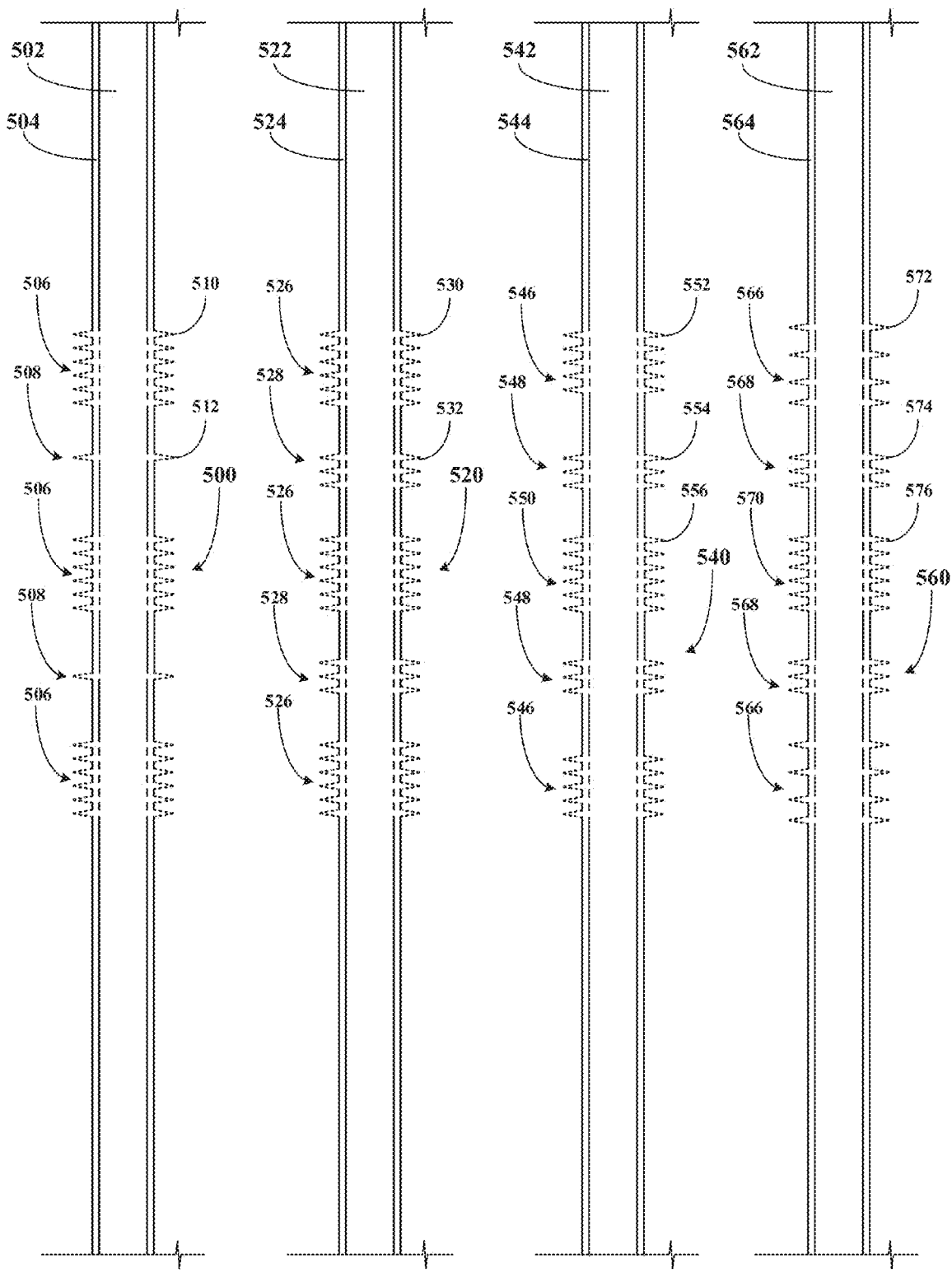

METHODS AND SYSTEM FOR CREATING HIGH CONDUCTIVITY FRACTURES

RELATED APPLICATIONS

The present invention claim provisional priority to and the benefit of U.S. Provisional Patent Application Ser. No. 61/905,340 filed 18 Nov. 2013 (11/18/2013)(18.11.2013) and continuations-in-part of U.S. patent application Ser. No. 12/690,292 filed Jan. 20, 2010, Ser. No. 13/914,513 filed Jun. 10, 2013, Ser. No. 13/914,526 filed Jun. 10, 2013, and Ser. No. 14/308,160 filed Jun. 18, 2014.

BACKGROUND OF THE INVENTION

1. Field of the Invention

Embodiments of this invention relate to methods for producing fluids from subterranean formations through the formation of a network of proppant pillars, clusters, columns, or islands in fractures in a formation during and/or after formation fracturing, proppant networks, and proppant pillars.

More particularly, embodiments of this invention relate to methods for producing fluids from subterranean formations through the formation of a network of proppant pillars, clusters, columns, or islands in fractures in a formation during and/or after formation fracturing, proppant networks, and proppant pillars, where the methods include a sequence of proppant stages designed to form proppant networks and proppant pillars that increase fracture conductivity.

2. Description of the Related Art

During fracturing applications, proppants are deposited in the fracture with the aid of fracturing fluid to keep the fracture opened. Generally proppant particles are placed in the fracture in concentrations sufficient to form a tight pack. When fractures close under pressure, this closure causes compaction, resulting in some of the proppant crushing or proppant embedment into the fracture face. Both phenomena results in restricted flow paths through the fracture stimulated volume and hence causes decreased fracture conductivity. The porosity of the pack decreases even more if the proppants are not of high strength, spherical or larger in size. Higher formation pressure also leads to decreased fracture conductivity.

Historically, many techniques have been proposed to get high conductivity fracture. For example, one techniques involves depositing low volume of proppant in the fractures and creating a "partial monolayer" to generate high conductivity. Proppants are placed far from each other, but are still able to keep fractures opened. Fluid flow around widely spaced proppants. This is practiced by Halliburton using plastic proppants and Baker Hughes using light weight or ultra-light weight proppants, for example, walnut hull. For another example, Schlumberger used channel hydraulic fracturing technique also called "HiWay" frac to create open pathways within the proppant pack, by intermittently pumped slugs of proppants during fracturing with fibers to form islands of proppants or pillars in the fractures. The engineered channels provide highly conductive paths for flow of fluids in the fractured formation. For another example, Halliburton described using proppants coated with adhesive substance at lower concentration to make the higher conductivity fractures. For yet another example, Halliburton described introducing degradable materials in the proppant pack, which over time degrade to provide higher porosity fractures. Many other techniques to form high porosity fractures has also been proposed, used or introduced.

While many inventions have been used to achieve high conductivity fractures that have a reduced tendency to collapse under high pressure production conditions, the present invention describes methods to create high conductivity fracture by increasing porosity using zeta potential altering chemistries and proppants introduced under fracturing conditions, where the conditions are sufficient to produce proppant pillars within a fractured formation through sequences of injections of different fracturing fluids into a formation some including no proppant and no aggregating or zeta altering compositions, some including no proppant, but aggregating or zeta altering compositions, and some including both proppants and aggregating or zeta altering compositions.

SUMMARY OF THE INVENTION

Embodiments of this invention provide methods for achieving high conductivity fractures within a formation being fractured using proppants and a zeta altering or aggregating composition. In certain embodiments, the zeta altering or aggregating composition is pumped with the fracturing fluid and the proppant into the formation during fracturing treatment. The zeta altering or aggregating composition coats or partially coats the proppant particles such as sand changing the zeta potential or aggregating propensity of the proppant particles causing the particles to aggregate or agglomerate into distinct pillars in formation fractures permitting lower concentrations of proppants needed to prop open the fractures and creating highly conductive fractures. These agglomerated pillars provide enough strength to keep the fractures opened during production leading to greater conductivity in the fractures. In other embodiments, the proppant is pre-treated with the zeta altering or aggregating composition to form a coated or partially coated proppant particles such as coated or partially coated sand particles before adding the proppant to the fracturing fluid and then pumping the resulting fracturing fluid into the formation under fracturing conditions. The coated or partially coated proppant particles agglomerate or aggregate into clusters permitting lower proppant concentrations to be used to fill the fractures formed during fracturing. In other embodiments, the proppant is pre-treated with the zeta altering or aggregating composition to form the coated or partially coated proppant particles such as coated or partially coated sand particles and then intermittently adding the proppant to the fracturing fluid as the fluid is being pumped downhole into the formation under fracturing conditions to create islands or pillars of agglomerated proppant particles (e.g., sand particles) in the fracture, thus achieving greater porosity and greater conductivity in the fractured formation. In the present technique, the regions of pillars and channels may be formed by the intermittently pumping of the proppant, the zeta altering or aggregating composition, and/or the pre-coated propant. Due to the presence of the coating or partial coating of the proppant particles with the zeta altering or aggregating composition, the region of pillars have improved strength allowing the structure to remain together after fracturing and during production or injection. In other techniques, it is suspected that the grains will not stay in place after fracturing. The present technique may be used in slick water fracturing systems, VES fracturing systems, linear gel fracturing systems, crosslinked fracturing systems or hybrid fracturing system using fresh water base fluids or brine base fluids.

Embodiments of this invention provide methods for forming proppant pillars in a formation during formation fracturing, where the methods include periods of pumping a first fracturing fluid including a proppant and an aggregating composition including a reaction product of a phosphate compound or a plurality of phosphate and an amine, periods of pumping a second fracturing fluid excluding a proppant and an aggregating composition including a reaction product of a phosphate compound and periods of pumping a third fracturing fluid including an aggregating composition including a reaction product of a phosphate compound, where the pumping of the three fracturing fluids may be in any order and may involve continuous pumping, pulse pumping, intermittent pumping, or non-continuous pumping. In certain embodiments, the methods may also include periods of hold times between pumping of the different fluids into the formation.

Embodiments of this invention provide methods for forming proppant pillars in a formation during formation fracturing, where the methods include a sequence of injections of one fracturing fluid or a plurality of different fracturing fluids, where the fracturing fluids are selected from the group consisting of fluids that include a proppant and a zeta altering or aggregating composition, fluids that do not include the proppant and the zeta altering or aggregating composition, fluids that include the zeta altering or aggregating composition, but no proppant, and fluids that include a proppant, but no zeta altering or aggregating composition. The sequences may include single injections of each fluid in any order or multiple injections of each fluid in any order. Thus, one sequence may include injecting a first fluid including no proppant, injection a second fluid including the zeta altering or aggregating composition, but no proppant, and a third fluid including the proppant and the zeta altering or aggregating composition. The fluids including a proppant may include untreated proppant, treated proppant comprising particles coated or partially coated with the zeta altering or aggregating composition, or mixtures thereof. Another sequence may include a plurality of first fluid injections, a plurality of second fluid injections, and a plurality of third fluid injections. Another sequence may include single injections of the first, second, and third fluids repeated a number of times during the course of the proppant placement stage of a fracturing operation. Another sequence may include multiple injections of each fluid in any given order. The sequence may also include a hold period between each injection. Thus, a sequence may include a first fluid injection, a first hold time, a second fluid injection, a second hold time, and a third fluid injection, and a third hold time, where the first, second and third fluid may be any of the fluid compositions listed above.

Embodiments of methods of this invention provide a proppant placement step involving injecting alternating slugs of proppant-free fluids and proppant-containing fluids into fractures of the fracturing layer above fracturing pressure through a number of perforation groups. The slugs of proppant-containing fluids form proppant pillars, clusters, or islands in the fractures during fracturing and/or after fracturing as the fractures closes.

Embodiments of methods of this invention provide a proppant placement step involving injecting alternating slugs of proppant-free fluids and proppant-containing fluids into the fractures of the fracturing layer above fracturing pressure through a number of perforation groups in a wellbore, and causing the sequences of slugs of proppant-free fluids and proppant-containing fluids injected through neighboring perforation groups to move through the fractures at different rates. The slugs of proppant-containing fluids again form proppant pillars, clusters, or island in the fractures during fracturing and/or after fracturing as the fractures closes.

Embodiments of methods of this invention provide a proppant placement step involving injecting alternating slugs of proppant-free fluids and proppant-containing fluids into the fractures of the fracturing layer above fracturing pressure through a number of perforation groups in a wellbore, and causing the sequences of slugs of proppant-free fluids and proppant-containing fluids injected through at least one pair of perforation groups to be separated by a region of injected proppant-free fluids. Again, the slugs of proppant-containing fluids form proppant pillars, clusters, or islands in the fractures during fracturing and/or after fracturing as the fractures closes.

There are many optional variations of these methods including, without limitation, (i) varying the proppant-free fluids in some or all of the proppant-free fluid slugs, (ii) varying the proppant-containing fluids in some or all of the proppant-containing fluid slugs, (iii) varying the proppant composition in some or all of the proppant-containing fluids, (iv) varying slug properties of some or all of the slugs, (v) varying the sequence of slugs, (vi) varying the number of perforation groups, (vii) varying the perforation group separations, (viii) varying a length of some or all of the group lengths, (ix) varying a number of perforation in some or all of the groups, or (xii) varying other fluid properties, other slug properties, other fracturing properties, etc.

In other variations, the methods may have a step following the proppant placement step involving continuous introduction of a proppant-containing fluid into the fracturing fluid, where the proppant has an essentially uniform particle size. This following step may include a reinforcing material, a proppant transport material, other materials, or mixtures thereof. The fluids may be viscosified with a polymer or with a viscoelastic surfactant. The number of holes in each perforation group may be the same or different. The diameter of holes in all of the groups may be the same or different. The lengths of the perforation groups and the spans separating the groups may be the same or different. At least two different perforation group forming methods may be used. Some of the groups may be produced using an underbalanced perforation technique or an overbalanced perforation technique. The orientations of the perforations in all of the groups relative to the preferred fracture plane may be the same or different.

In another variation, pairs of groups that produce slug pulses in the formation may be separated by a perforation group having sufficiently small perforations that the proppant bridges and proppant-free fluid enters the formation therethrough. Generally, a number of perforation in each group is between 2 and 300; in certain embodiments, the number may be between 2 and 100. Generally, the perforation group length between adjacent groups is between 0.15 m and 3.0 m; in certain embodiments the group length is from 0.30 m to 30 m. Generally, the perforation shot density is from 1 to 30 shots per 0.3. Generally, the proppant-containing slugs have a volume between 80 liters and 16,000 liters.

In certain embodiments, the fluid injection sequence is determined from a mathematical model; and/or the fluid injection sequence includes a correction for slug dispersion; and/or the perforation pattern is determined from a mathematical model.

In other embodiments, at least one of the parameters including slug volume, slug composition, proppant composition, proppant size, proppant concentration, number of holes per perforation group, perforation group length, perforation group separation, perforation group orientation, perforation group shot density, lengths of perforation groups, methods of perforation, is constant along the wellbore in the fracturing layer, or increases or decreases along the wellbore in the fracturing layer, or alternates along the wellbore in the fracturing layer.

The methods of this invention are designed to allow proppant pillars, clusters, or islands to form in the fractures such that the proppant pillars do not extend across an entire dimension of the fractures parallel to the wellbore including regions of proppant pillars, clusters, or islands interrupted by flow channels or pathways between the pillars form pathways that lead to the wellbore, i.e., the proppant pillars, clusters, or islands are separated in a distribution in the fractures to form the flow channels or pathways. In certain embodiments, the proppant compositions and the proppant placement step are designed to lower an amount of proppant needed to achieve a desired level of fracture conductivity greater than a fracture conductivity in the absence of the proppant pillars, clusters, or islands formed in the fractures.

BRIEF DESCRIPTION OF THE DRAWINGS

The invention can be better understood with reference to the following detailed description together with the appended illustrative drawings in which like elements are numbered the same:

FIG. 1D depicts another embodiment of a fracturing profile of this invention.

FIGS. 3A-I depict nine different illustrative proppant clusters.

FIGS. 4A-J depict ten different proppant groups of proppant clusters.

FIGS. 5A-D depict four different perforation patterns.

DEFINITIONS OF TERM USED IN THE INVENTION

Figure 1A:
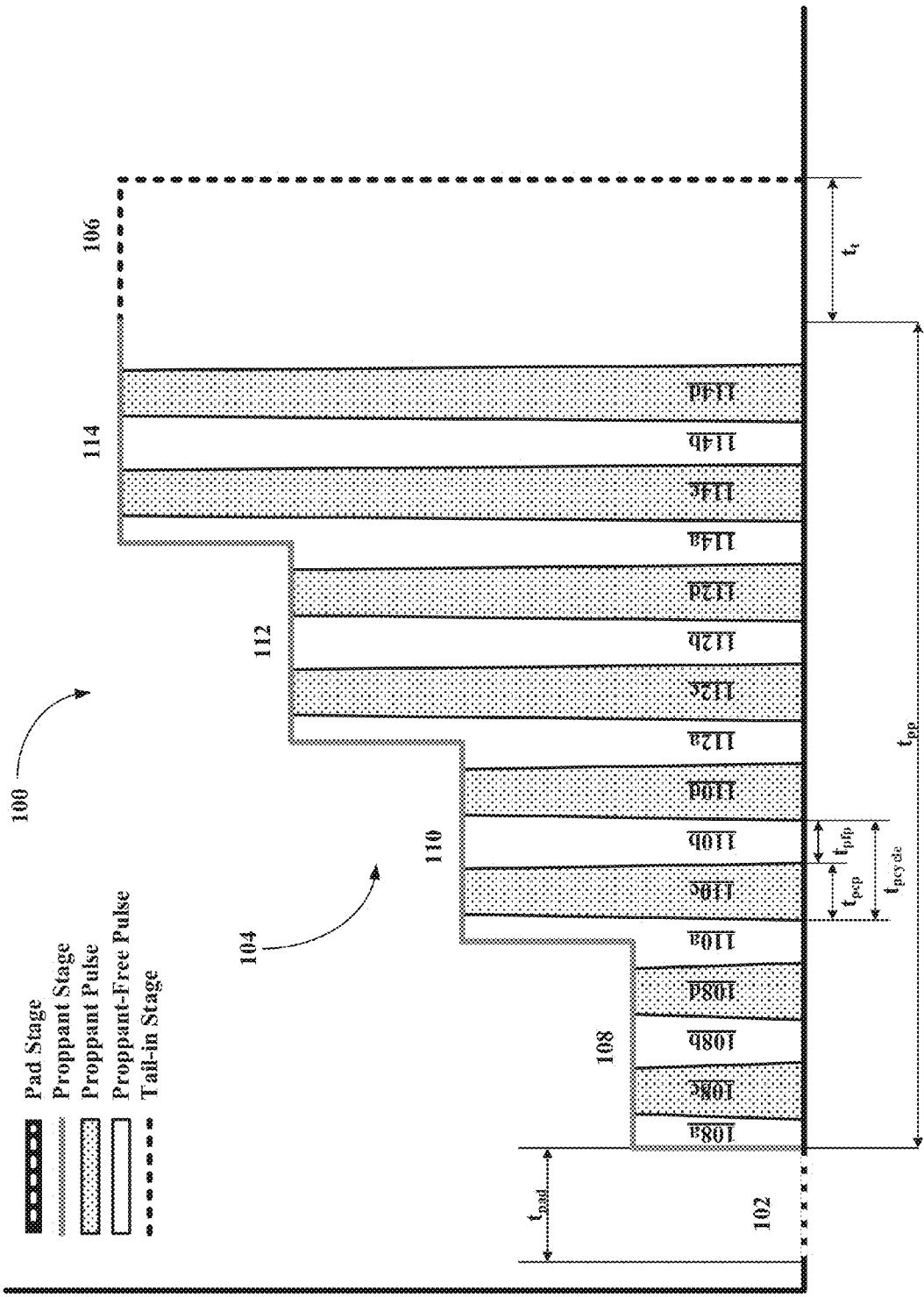
FIG. 1A depicts an embodiment of a fracturing profile of this invention.

The following definitions are provided in order to aid those skilled in the art in understanding the detailed description of the present invention.

The term "about" means that the value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "substantially" means that the value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "proppant pillar, proppant island, proppant cluster, proppant aggregate, or proppant agglomerate" mean that a plurality of proppant particles are aggregated, clustered, agglomerated or otherwise adhered together to form discrete structures.

The term "mobile proppant pillar, proppant island, proppant cluster, proppant aggregate, or proppant agglomerate" means proppant pillar, proppant island, proppant cluster, proppant aggregate, or proppant agglomerate that are capable of repositioning during fracturing, producing, or injecting operations.

The term "self healing proppant pillar, proppant island, proppant cluster, proppant aggregate, or proppant agglomerate" means proppant pillar, proppant island, proppant cluster, proppant aggregate, or proppant agglomerate that are capable of being broken apart and recombining during fracturing, producing, or injecting operations.

The term "premature breaking" as used herein refers to a phenomenon in which a gel viscosity becomes diminished to an undesirable extent before all of the fluid is introduced into the formation to be fractured. Thus, to be satisfactory, the gel viscosity should preferably remain in the range from about 50% to about 75% of the initial viscosity of the gel for at least two hours of exposure to the expected operating temperature. Preferably the fluid should have a viscosity in excess of 100 centipoise (cP) at 100 sec$^{-1}$ while injection into the reservoir as measured on a Fann 50 C viscometer in the laboratory.

The term "complete breaking" as used herein refers to a phenomenon in which the viscosity of a gel is reduced to such a level that the gel can be flushed from the formation by the flowing formation fluids or that it can be recovered by a swabbing operation. In laboratory settings, a completely broken, non-crosslinked gel is one whose viscosity is about 10 cP or less as measured on a Model 35 Fann viscometer having a R1B1 rotor and bob assembly rotating at 300 rpm.

The term "amphoteric" refers to surfactants that have both positive and negative charges. The net charge of the surfactant can be positive, negative, or neutral, depending on the pH of the solution.

The term "anionic" refers to those viscoelastic surfactants that possess a net negative charge.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present invention include, but are not limited to, conventional proppants familiar to those skilled in the art such as sand, 20-40 mesh sand, resin-coated sand, sintered bauxite, glass beads, and similar materials.

The abbreviation "RPM" refers to relative permeability modifiers.

The term "surfactant" refers to a soluble, or partially soluble compound that reduces the surface tension of liquids, or reduces inter-facial tension between two liquids, or a liquid and a solid by congregating and orienting itself at these interfaces.

The term "viscoelastic" refers to those viscous fluids having elastic properties, i.e., the liquid at least partially returns to its original form when an applied stress is released.

The phrase "viscoelastic surfactants" or "VES" refers to that class of compounds which can form micelles (spherulitic, anisometric, lamellar, or liquid crystal) in the presence of counter ions in aqueous solutions, thereby imparting viscosity to the fluid. Anisometric micelles in particular are preferred, as their behavior in solution most closely resembles that of a polymer.

The abbreviation "VAS" refers to a Viscoelastic Anionic Surfactant, useful for fracturing operations and frac packing. As discussed herein, they have an anionic nature with preferred counterions of potassium, ammonium, sodium, calcium or magnesium.

The term "foamable" means a composition that when mixed with a gas forms a stable foam.

The term "fracturing layer" is used to designate a layer, or layers, of rock that are intended to be fractured in a single fracturing treatment. It is important to understand that a "fracturing layer" may include one or more than one of rock layers or strata as typically defined by differences in permeability, rock type, porosity, grain size, Young's modulus, fluid content, or any of many other parameters. That is, a "fracturing layer" is the rock layer or layers in contact with all the perforations through which fluid is forced into the rock in a given treatment. The operator may choose to fracture, at one time, a "fracturing layer" that includes water zones and hydrocarbon zones, and/or high permeability and low permeability zones (or even impermeable zones such as shale zones) etc. Thus a "fracturing layer" may contain multiple regions that are conventionally called individual layers, strata, zones, streaks, pay zones, etc., and we use such terms in their conventional manner to describe parts of a fracturing layer. Typically the fracturing layer contains a hydrocarbon reservoir, but the methods may also be used for fracturing water wells, storage wells, injection wells, etc. Note also that some embodiments of the invention are described in terms of conventional circular perforations (for example, as created with shaped charges), normally having perforation tunnels. However, the invention is may also be practiced with other types of "perforations", for example openings or slots cut into the tubing by jetting.

The term "gpt" means gallons per thousand gallons.

The term "ppt" means pounds per thousand gallons.

DETAILED DESCRIPTION OF THE INVENTION

The inventors have found that by changing a zeta potential or aggregating propensity of proppants such as sand using a zeta altering or aggregating composition such as SandAid™ available from Weatherford, the proppants will tend to aggregate and/or agglomerate in fractures of a formation during and/or after fracturing to form discrete pillars permitting a lower concentration of proppant particles to be pumped downhole during fracturing. The aggregation and/or agglomeration composition provides higher strength pillars to form in the fractures having a reduced tendency to be crushed under forces encountered during production. Unlike prior art treatments, where partial monolayers are formed on proppant particles are used for propping open fractures that are not able to withstand the crush force encountered during production, the zeta altering or aggregating compositions of this invention modify the aggregation and/or agglomeration particles to improve pillar crush strength and pillar aggregation propensity. Also, embedding proppant in the formation tends to choke the permeability, and, therefore, these technique are not widely used. In Hiway fracturing technique, the clusters are formed by intermittent adding of particles to fracturing fluid with fibers. The fibers help to suspend the proppants, but it is suspected that the clusters formed do not remain together to form conductive channels. On the other hand, in the present invention, we are certain that the proppant (e.g., sand) agglomeration with zeta altering or aggregating composition keep the clusters of agglomerated particles discreet and in tact. The added advantage of this technique is that it will prevent fines migration by capturing fines and thus preventing the porosity to go down over time.

The inventors have found that using both chemistry and pumping technique advanced pillar type fracturing structures may be produced in the formation. This advanced pillar formation will permit maximization of fluid flow from the well because the advanced pillar formation increases conductivity.

It is the use of the zeta altering chemistry to ensure that the channels/pillars are efficiently formed and have greater strength to withstand erosion and proppant migration as compared to the other technologies previously disclosed. Prior art solutions to channinventions involve the use of dissolvable fibers which help with channel/pillar formation but it has been observed that once the wells are brought back on production with even minimal flux rate the channels/pillars lose their strength once the fibers have been dissolved and the channels collapse and the pillars erode leaving a conventional frac pac that will likely exhibit proppant migration and flow back.

The inventors have found that a composition can be produced that, when added to a particulate metal-oxide-containing solid or other solid materials or to a suspension or dispersion including a particulate metal-oxide-containing solid or other solid materials, the particles are modified so that an aggregation propensity, aggregation potential and/or a zeta potential of the particles are altered. The inventors have also found that metal-oxide-containing solid particles or other solid particles can be prepared having modified surfaces or portions thereof, where the modified particles have improved aggregation tendencies and/or propensities and/or alter particle zeta potentials. The inventors have also found that the compositions and/or the modified metal-oxide-containing solid or other solid particles can be used in oil field applications including drilling, fracturing, producing, injecting, sand control, or any other downhold application. The inventors have also found that the modified particulate metal-oxide-containing solid particles or particles of any other solid material can be used any other application where increased particle aggregation potentials are desirable or where decreased absolute values of the zeta potential of the particles, which is a measure of aggregation propensity. The inventors have also found that a coated particulate metal-oxide-containing solid compositions can be formed, where the coating is deformable and the coated particles tend to self-aggregate and tend to cling to surfaces having similar coatings or having similar chemical and/or physical properties to that of the coating. That is to say, that the coated particles tend to prefer like compositions, which increase their self-aggregation propensity and increase their ability to adhere to surface that have similar chemical and/or physical properties. The inventors have found that the coating compositions of this invention are distinct from known compositions for modifying particle aggregation propensities and that the coated particles are ideally suited as proppants, where the particles have altered zeta potentials that change the charge on the particles causing them to attract and agglomerate. The change in zeta potential or aggregation propensity causes each particle to have an increased frictional drag keeping the proppant in the fracture. The compositions are also ideally suited for decreasing fines migrating into a fracture pack or to decrease the adverse impact of fines migration into a fractured pack.

The embodiments will be described for conventional hydraulic fracturing, but it is to be understood that embodiments of the invention also may include water fracturing and frac packing. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

In certain embodiments, the methods include periods of pumping different fracturing fluid into of fractures of a formation, where the pumping of the fluids may be in any order and may involve continuous pumping, pulse pumping, intermittent pumping, or non-continuous pumping, where the pumping may be under same or different fracturing conditions, where the fracturing conditions include at least temperature, temperature profile, pressure, pressure profile, injection rate, injection rate profile, injection volume, and injection volume profile, fluid composition, and fluid composition profile. In other embodiments, the methods may also include hold periods. In all of these methods, the periods may be the same or different.

Some embodiments illustrating the invention will be described in terms of vertical fractures in vertical wells, but are equally applicable to fractures and wells of any orientation, as examples horizontal fractures in vertical or deviated wells, or vertical fractures in horizontal or deviated wells. The embodiments will be described for one fracture, but it is to be understood that more than one fracture may be formed at one time. Embodiments will be described for hydrocarbon production wells, but it is to be understood that the Invention may be used for wells for production of other fluids, such as water or carbon dioxide, or, for example, for injection or storage wells. The embodiments will be described for conventional hydraulic fracturing, but it is to be understood that embodiments of the invention also may include water fracturing and frac packing. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

In certain embodiments, the proppant placement in fracturing of fracturing layers is fracturing design, where the fracturing design including perforation pattern, fluid sequence, fluid compositions, etc. creates a superior placement of proppant pillars, clusters, or islands within the fractures to increase, optimize or maximize an amount of open (void) space or flow pathwayes in the fractures. This, in turn, ensures increased, optimized, or maxized hydraulic conductivity of the fractures and enhanced hydrocarbon production from a reservoir layer. The creation and placement of (a) proppant pillars, clusters, or islands, (b) regions of proppant pillars, clusters, or islands, (c) flow pathways or channels, or (d) regions of flow pathways or channels in the fractures have the advantages of producing (a) longer (and/or higher) fractures with the same mass of proppant, and (b) more effective fracture clean-up of fracturing fluids from the fractures due to a greater volume of the fracture being flow pathways.

The perforation design is particularly effective when used in combination with proppant slug blends engineered to minimize slug dispersion during their transport through the hydraulic fractured, which may be achieved through the use of the proppant compositions and aggregating compositions of this invention.

Generally, the fracturing operation includes a first stage including the injection of a pad fluid into the formation (normally proppant-free viscosified fluid), which initiates fracture formation and furthers fracture propagation. A second stage of the fracturing operation generally includes a number of sub-stages. During each sub-stage, a proppant-containing fluid slug having a given (designed or calculated) proppant composition and concentration is pumped (called a slug sub-stage) into the formation followed by a proppant-free fluid interval sub-stage. The volumes of both proppant-containing fluid slugs and proppant-free fluid slugs significantly affects hydraulic conductivity of the fractures due to the formation and placement of proppant pillars, clusters, or islands in the fractures. The sequence of proppant-containing and proppant-free fluid slugs may be repeated the necessary number of times to achieve a desired pillar distribution and/or placement in the fractures. A duration of each sub-stage, the proppant composition, the proppant concentration, and the nature of the fluid in each slug may varied or optimized to increase, optimize or maximize proppant pillar, cluster, or island placement resulting in increased, improved, optimized or maximized fracture conductivity.

At the end of the treatment a heterogeneous proppant structure may be formed in the fractures. Following fracture closure, proppant pillars squeeze and form stable proppant formations (pillars) between the fracture walls and prevent the fracture from complete closure.

In the hydraulic fracturing methods of this invention for fracturing a subterranean formation, the fracturing sequence generally includes a first stage or "pad stage", that involves injecting a fracturing fluid into a borehole at a sufficiently high flow rate that it creates hydraulic fractures in the formation. The pad stage is pumped so that the fractures will be of sufficient dimensions to accommodate the subsequent slug including proppant-containing fluids. The volume and viscosity of the pad may be designed by those knowledgeable in the art of fracture design (for example, see "Reservoir Stimulation" $3^{rd}$ Ed. M. J. Economides, K. G. Nolte, Editors, John Wiley and Sons, New York, 2000).

Water-based fracturing fluids are common, with natural or synthetic water-soluble polymers added to increase fluid viscosity and are used throughout the pad and subsequent propped stages. These polymers include, but are not limited to, guar gums: (high molecular-weight polysaccharides composed of mannose and galactose sugars) or guar derivatives, such as hydroxypropyl guar, carboxymethyl guar, and carboxymethylhydroxypropyl guar. Cross-linking agents based on boron, titanium, zirconium or aluminum complexes are typically used to increase the polymer's effective molecular weight, making it better suited for use in high-temperature wells.

The second stage or "proppant stage" of a fracturing operation involves introduction into a fracturing fluid of a proppant in the form of solid particles or granules to form a suspension or slurry. The propped stage may be divided into a sequence of slugs of different fracturing fluids including non-viscosified proppant-free fluids, viscosified proppant-free fluids, non-viscosified proppant-containing fluids, or viscosified proppant-containing fluids. The sequence may include two or more periodically repeated sub-stages including "carrier sub-stages" involving the injection of the proppant-free fracturing fluids, and "proppant sub-stages" involving the injection of proppant-containing fracturing fluids. As a result of the periodic (but not continual) slugging of slurry containing granular propping materials, the proppant does not completely fill the fracture. Rather, the proppant form clusters, posts, pillars, or islands with channels or flow pathways therebetween through which formation or injection fluids may pass. The volumes of proppant sub-stages and carrier sub-stages as pumped may be different. That is, the volume of the carrier sub-stages may be larger or smaller than the volume of the proppant sub-stages. Furthermore, the volumes of the sub-stages may change over time. For example, a proppant sub-stage pumped early in the treatment may be of a smaller volume than a proppant sub-stage pumped latter in the treatment. The relative volume of the sub-stages is selected based on how much of the surface area of the fracture is to be supported by the proppant clusters, pillars, columns, or islands, and how much of the fracture area is to be open channels through which formation fluids are free to flow.

In certain embodiments, the proppant composition in the slugs may include reinforcing and/or consolidating materials to increase the strength of the proppant clusters, pillars, columns, or islands formed and to prevent their collapse during fracture closure. Typically, the reinforcement material is added to some of the proppant sub-stages. Additionally, the concentrations of both proppant and the reinforcing materials may varied continuously, periodically, or intermittently throughout the proppant stage. As examples, the concentration of reinforcing material and/or proppant may be different in two subsequent proppant sub-stages. It may also be suitable or practical in some applications of the method to introduce the reinforcing material in a continuous fashion throughout the proppant stage, both during the carrier and proppant sub-stages. In other words, introduction of the reinforcing material may not be limited only to the proppant sub-stage. In certain embodiments, the concentration of the reinforcing material does not vary during the entire proppant stage; monotonically increases during the proppant stage; or monotonically decreases during the proppant stage.

Curable, or partially curable, resin-coated proppant may be used as reinforcing and consolidating material to form proppant clusters. The selection of the appropriate resin-coated proppant for a particular bottom hole static temperature (BHST) and for a particular fracturing fluid are well known to experienced workers. In addition, organic and/or inorganic fibers may be used to reinforce the proppant cluster. These materials may be used in combination with resin-coated proppants or separately. These fibers may be modified to have an adhesive coating alone, or an adhesive coating coated by a layer of non-adhesive substance dissolvable in the fracturing fluid as it passes through the fracture. Fibers made of adhesive material may be used as reinforcing material, coated by a non-adhesive substance that dissolves in the fracturing fluid as it passes through the fracture at the subterranean temperatures. Metallic particles are another preference for reinforcing material and may be produced using aluminum, steel containing special additives that reduce corrosion, and other metals and alloys. The metallic particles may be shaped to resemble a sphere and measure 0.1-4 mm. In certain embodiments, fibers such as metallic particles used are of an elongated shape with an aspect ratio (length to width or diameter) of greater than 5:1, for example a length longer than 2 mm and a diameter of 10 to 200 microns. Additionally, plates of organic or inorganic substances, ceramics, metals or metal-based alloys may be used as reinforcing material. These plates may be disk or rectangle-shaped and of a length and width such that for all materials the ratio between any two of the three dimensions is greater than 5 to 1.

Proppant and fluid choice are also adjustable factors in the methods of this invention. The proppant composition and fluid compositions are chosen to increase, optimize, or maximize a strength of proppant clusters, pillars, columns and islands within the fractures after fracture closure. A proppant cluster should maintain a reasonable residual thickness at the full fracture closure stress. This ensures an increase in fluid flow through open channels formed between the proppant clusters. In this situation, the proppant pack permeability, as such, is not decisive for increasing well productivity. Thus, a proppant cluster may be created successfully using sand whose particles are too weak for use in standard hydraulic fracturing in the formation of interest. A proppant cluster may also be made from sand that has a very wide particle size distribution that would not be suitable for conventional fracturing. This is an important advantage, because sand costs substantially less than ceramic proppant. Additionally, destruction of sand particles during application of the fracture closure load might improve the strength of clusters consisting of sand granules. This can occur because the cracking/destruction of sand proppant particles decreases the cluster porosity and increases the proppant compactness. Sand pumped into the fracture to create proppant clusters does not need good granulometric properties, that is, the usually desirable narrow diameter distribution of particles. For example, to implement the method, it may be suitable to use 50,000 kg of sand, of which 10,000 to 15,000 kg have a diameter of particles from 0.002 to 0.1 mm, 15,000 to 30,000 kg have a diameter of particles from 0.2 to 0.6 mm, and 10,000 to 15,000 kg have a diameter of particles from 0.005 to 0.05 mm. It should be noted that about 100,000 kg of a proppant more expensive than sand would be necessary to obtain a similar value of hydraulic conductivity in the created fracture using the prior (conventional) methods of hydraulic fracturing.

In certain embodiments, some or all of the proppant sub-stages include slugs have proppant compositions including treated proppants and some or all of the carrier sub-stages have aggregating compositions of this invention that cause proppant particles to conglutinate.

In certain embodiments, the methods the fracturing operation may include a third stage or "tail-in stage" following the second state involving continuous introduction of an amount of proppant. If employed, the tail-in stage of the fracturing operation resembles a conventional fracturing treatment, in which a continuous bed of well-sorted conventional proppant is placed in the fracture relatively near to the wellbore. In certain embodiments, the tail-in stage is distinguished from the second stage by the continuous placement of a well-sorted proppant, that is, a proppant with an essentially uniform size of particles. The proppant strength in the tail-in stage is sufficient to prevent proppant crushing (crumbling), when it is subjected to the stresses that occur upon fracture closure. The role of the proppant at this stage is to prevent fracture closure and, therefore, to provide good fracture conductivity in proximity to the wellbore. The proppants used in this third stage should have properties similar to conventional proppants.

In certain embodiments, a fracturing operation design (the number, size, and orientation of perforations and the perforation distribution over the pay zone) includes a perforation pattern that acts as a "slug-splitter" for a given proppant slug, even when injection is into a single, homogeneous formation layer (that is, even when the fracturing layer is a single, homogeneous formation layer). The perforation pattern result in the splitting of the proppant slugs pumped down the wellbore into a predetermined number of separated smaller slugs within the fractures of a particular zone. The number of proppant slugs and the corresponding completion design may be optimized to achieve superior performance of the created hydraulic fracture.

In certain embodiments, the methods of pumping proppant slugs in order to create a hydraulic fracture including a network of proppant clusters, pillars, columns or islands and flow pathways, or a network of proppant rich regions including clusters, pillars, columns or islands and proppant lean regions rich, where the flow pathways separate the proppant clusters, pillars, columns or islands and the proppant lean regions separate the proppant rich regions. Interconnected pathways or proppant lean regions within the proppant pack form a network of channels throughout the fractures from its tip to the wellbore. The network of channels results in a significant increase of the effective hydraulic conductivity of the created hydraulic fractures. Carrier fluid composition, proppant fluid composition, sequence of slugs, slug properties, perforation pattern, and/ or other fracturing operation parameters may be varied to increase, optimize, or maximize hydraulic fracture conductivity, where the perforation pattern acts as a "slug-splitter" as described above.

It should be noted that although some embodiments are described for the case in which the fracturing layer is a single rock layer, it is not limited to use in single layers. The fracturing layer may be a single pay zone made up of multiple permeable layers. The fracturing layer may also be made up of more than one pay zone separated by one or more impermeable or nearly impermeable rock layers such as shale layers, and each pay zone and each shale layer may in turn be made of multiple rock layers. In one embodiment, each pay zone contains multiple perforation clusters and the processes of the invention occur in more than one pay zone in a single treatment. In other embodiments, at least one of the pay zones is treated by the method and at least one of the pay zones is treated conventionally, in a single fracturing treatment. The result is more than one fracture, at least one of which contains proppant placed heterogeneously according to the method of the invention. In another embodiment, the fracturing layer is made up of more than one pay zone separated by one or more impermeable or nearly impermeable rock layers such as shale layers, and each pay zone and each shale layer may in turn be made of multiple rock layers, and at least one pay zone contains multiple perforation clusters and the processes of the invention occur in at least one pay zone in a single treatment, but the job is designed so that a single fracture is formed in all the pay zones and in any intervening impermeable zones. Of course, any embodiment may be implemented more than once in one well.

Simulations conducted have shown that the number of perforation clusters required for a given formation typically may vary from 1 to 100, but may be as high as 300 for some the formations. Suitable sizes of pillars depends upon a number of factors, such as the "slug surface volume" (the product of the slurry flow rate and the slug duration), the number of clusters, the leak-off rate into the formation, etc. Calculations have revealed the importance of slug duration on the overall productivity of the heterogeneous fracture produced. Many reservoirs may require the slug duration to span a range of, for example, 2 to 60 sec (this corresponds to a slug surface volume of about 80 to 16,000 liters (0.5 to 100 barrels (bbl)) given a range of flow rates for a typical fracturing job of from 3,200 to 16,000 liters/minute (20 to 100 barrels per minute (bpm)). Other reservoirs will require proppant slug durations (as measured in the surface equipment) to be up to, for example, 5 min (16,000 to 79,500 liters (100 to 500 bbl) of frac fluid given a flow rate of 3,200 to 16,000 liters/minute (20-100 bpm)). And finally, for those treatments in which part of the fracture should be covered with proppant homogeneously, slugs may last for 10-20 minutes and longer. Furthermore, slug duration may also vary throughout the treatment in order to vary characteristic pillar footprints within a single hydraulic fracture. Typical ranges of slug duration will be the same as just detailed above. For example, a pumping schedule may start with 1 min long slugs and finish pumping with 5 sec long proppant slugs with 5 sec no-proppant intervals between them.

Compositions

The invention broadly relates to a composition including an amine and a phosphate ester. The composition modifies surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

Treated Structures and Substrates

The present invention also broadly relates to structures and substrates treated with a composition of this invention, where the structures and substrates include surfaces that are partially or completely coated with a composition of this invention. The structures or substrates can be ceramic or metallic or fibrous. The structures or substrates can be spun such as a glass wool or steel wool or can be honeycombed like catalytic converters or the like that include channels that force fluid to flow through tortured paths so that particles in the fluid are forced in contact with the substrate or structured surfaces. Such structures or substrates are ideally suited as particulate filters or sand control media.

Methods for Treating Particulate Solids

The present invention broadly relates to methods for treating metal oxide-containing surfaces including the step of contacting the metal oxide-containing material with a composition of this invention. The composition forms a partial and/or complete coating on the material surfaces altering the properties of the material and/or surfaces thereof so that the materials and/or surfaces thereof are capable to interacting with similarly treated materials to form agglomerated and/or aggregated structures. The treating may be designed to partially or completely coat continuous metal oxide containing surfaces and/or the surfaces of metal oxide containing particles. If both are treated, then the particles cannot only self-aggregate, but the particles may also aggregate, agglomerate and/or cling to the coated continuous surfaces. The compositions may be used in fracturing fluids, frac pack applications, sand pack applications, sand control applications, or any other downhole application. Moreover, structures, screens or filters coated with the compositions of this invention may be used to attract and remove fines that have been modified with the compositions of this invention.

Method for Fracturing and/or Propping

The present invention broadly relates to methods for fracturing a formation including the step of pumping a fracturing fluid including a composition of this invention into a producing formation at a pressure sufficient to fracture the formation. The composition modifies an aggregation potential and/or zeta-potential of formation particles and formation surfaces during fracturing so that the formation particles aggregate and/or cling to the formation surfaces or each other increasing fracturing efficiency and increasing productivity of the fracture formation. The composition of this invention can also be used in a pre-pad step to modify the surfaces of the formation so that during fracturing the formation surfaces are pre-coated. The prepared step involves pumping a fluid into the formation ahead of the treatment to initiate the fracture and to expose the formation face with fluids designed to protect the formation. Beside just using the composition as part of the fracturing fluid, the fracturing fluid can also include particles that have been prior treated with the composition of this invention, where the treated particles act as proppants to prop open the formation after fracturing. If the fracturing fluid also includes the composition, then the coated particle proppant will adhere to formation surfaces to a greater degree than would uncoated particle proppant.

In an alternate embodiment of this invention, the fracturing fluid includes particles coated with a composition of this invention as proppant. In this embodiment, the particles have a greater self-aggregation propensity and will tend to aggregate in locations that may most need to be propped open. In all fracturing applications including proppants coated with or that become coated with the composition of this invention during fracturing, the coated proppants are likely to have improved formation penetration and adherence properties. These greater penetration and adherence or adhesion properties are due not only to a difference in the surface chemistry of the particles relative to the surface chemistry of un-treated particles, but also due to a deformability of the coating itself. Thus, the inventors believe that as the particles are being forced into the formation, the coating will deform to allow the particles to penetrate into a position and as the pressure is removed the particles will tend to remain in place due to the coating interaction with the surface and due to the relaxation of the deformed coating. In addition, the inventors believe that the altered aggregation propensity of the particles will increase proppant particle density in regions of the formation most susceptible to proppant penetration resulting in an enhance degree of formation propping.

Slug Sequencing and Heterogeneous Proppant Placement

Various software tools are commercially available for fracture modeling tool, either as licensable modules or as part of an overall fracturing system, such as, for example, the hydraulic fracturing design and evaluation engineering application available from Schlumberger Oilfield Services under the trade designation FRACCADE, which is available in an integrated suite of engineering applications for well construction, production and intervention available under the trade designation CADE OFFICE. For example, the FRACCADE modeling tool is available with: a closure test/calibration module under the trade designation DATA-FRAC; a PSG module; an APM module; an optimization sub-module; a P3D simulator; an acid fracturing simulator; a multi-layered fracture sub-module; and so on; that can be used in an heterogeneous proppant placement (HPP) job or can be appropriately modified by the skilled artisan for use in an HPP job. For example, the PSG module may be modified with a dispersion algorithm to produce a pulsated proppant pumping schedule.

The design and updating of the model can include determining the amount of proppant for delivery. For example, an initial model can solve an optimization problem to determine the amount of proppant to be used to achieve particular fracture dimension. Results from the solved problem can then be used to develop an initial proppant placement schedule. As used herein, the term "proppant placement schedule" refers to a schedule for placing the proppant in the fracture and can include a pumping schedule, a perforation strategy, and the like or a combination thereof. A pumping schedule is a plan prepared to specify the sequence, type, content and volume of fluids to be pumped during a specific treatment. A perforation strategy is a plan to direct the flow of a well treatment fluid through certain perforations in a wellbore casing and/or to inhibit flow through other perforations and can include, for example, plugging and/or opening existing perforations or making new perforations to enhance conductivity and to control fracture growth.

The proppant placement schedule can include varying a proppant concentration profile in the treatment fluid. Further, the proppant concentration profile can be varied according to a dispersion method. For example, the model can include process control algorithms which can be implemented to vary surface proppant concentration profile to deliver a particular proppant slug concentration profile at perforation intervals. Under a normal pumping process, a slug of proppant injected into a wellbore will undergo dispersion and stretch and loose "sharpness" of the proppant concentration at the leading and tail edges of the proppant slug. For a uniform proppant concentration profile, the surface concentration profile can be solved by inverting a solution to a slug dispersion problem. Dispersion can thus be a mechanism which "corrects" the slug concentration profile from an initial surface value to a particular downhole profile.

With reference to E. L. Cussler, Diffusion: Mass Transfer in Fluid Systems, Cambridge University Press, pp. 89-93 (1984), an example of a system of equations that can be solved is shown below for a Taylor dispersion problem— laminar flow of a Newtonian fluid in a tube, where a solution is dilute, and mass transport is by radial diffusion and axial convection only. Virtually any fluid mechanics problem can be substituted for the above system, including turbulent or laminar flow, Newtonian or non-Newtonian fluids and fluids with or without particles. In practice, a downhole concentration profile will be defined, and equations solved in the inverse manner to determine initial conditions, for example, rates of addition for proppant, to achieve particular downhole slug properties.

The equations can include, for example, $$\overline{c}_1 = \frac{\frac{M}{\pi R_0^2}}{\sqrt{4\pi E_z t}} e^{-(z-v^0 t)^2 / 4 E_z t}$$

where M is total solute in a pulse (the material whose concentration is to be defined at a specific downhole location), $R_0$ is the radius of a tube through which a slug is traveling, z is the distance along the tube, $v^0$ is the fluid's velocity, and t is time. A dispersion coefficient $E_z$ can be shown to be, $$E = \frac{(R_0 v^0)^2}{48 D}$$

where D is a diffusion coefficient. A system of equations that yield this solution follows. Variable definitions can be found in E. L. Cussler, Diffusion: Mass Transfer in Fluid Systems, Cambridge University Press, pp. 89-93 (1984).

$$\frac{\partial \overline{c}_1}{\partial \tau} = \left(\frac{v^0 R_0}{48D}\right) \frac{\partial^2 \overline{c}_1}{\partial \zeta^2}$$

subject to the conditions, $$\tau = 0, \text{ all } \zeta, \overline{c}_1 = \frac{M}{\pi R_0^2} \delta(\zeta)$$

-continued $$\tau > 0, \zeta = \pm\infty, \overline{c}_1 = 0$$

$$\tau > 0, \zeta = 0, \frac{\delta \overline{c}_1}{\delta \tau}$$

The system of equations above can be applied in general to design any downhole proppant concentration profile, slugged or continuous. The solution for a dispersion of granular material flow in a fluid down a wellbore can be inverted to calculate a corresponding surface concentration of proppant in the fracturing fluid. Process control technology can then take this surface concentration schedule and proportion the proppant accordingly. For example, the surface concentration schedule can be factored into the model, the proppant placement schedule adjusted to the model and proppant delivered according to the proppant placement schedule.

The pumping time of "no slug", for example when the proppant-lean fluid is pumped, is one of the key parameters in an HPP proppant placement schedule. The "no slug" parameter can control the distance between columns of pillars created in the fracture. A "no slug" time which is too high can result in a pinching point, an area in which the fracture is at least partially collapsed due to a lack of support between two columns of pillars. A pinch point, or pinching, can block fracture conductivity and, therefore, effect production.

Another example of a computer software suite for performing heterogeneous proppant placement is found in U.S. Pat. No. 7,451,812 issued 18 Nov. 2008, but any protocol of slug injection, slug sequencing, and slug alternation may be used to produce and/or improve proppant island placement.

In a first order approximation the distance, L, between two neighboring columns of pillars in the fracture can be calculated by the following dependence relation:

$$L = \frac{t_{noslug} \cdot Q_{rate}}{2 \cdot w_{frac} \cdot H_{frac}}$$

where $t_{noslug}$ is the pumping time during which no proppant is pumped, $Q_{rate}$ is the pump flowrate, $w_{frac}$ is the fracture width and $H_{frac}$ is the fracture height. The numerator thus includes the total volume of the no-proppant slug. In the denominator, a factor of 2 accounts for two fracture wings.

Pinching can occur whenever the distance L is smaller than a critical value, $L_{crit}$, wherein:

$$L = \frac{t_{noslug} \cdot Q_{rate}}{2 \cdot w_{frac} \cdot H_{frac}}$$

The two parameters in the numerator on the right side of the above equation can be controlled during treatment, while the two in the denominator are not controlled and can change during treatment.

The consequences of pinching can be dramatic. Overall fracture conductivity can be considered as a chain of hydraulic conductivities of different parts of the fracture. Thus, the overall conductivity can be governed by the conductivity of a less-conducted fracture part. In the case of pinching, the fracture conductivity can be equal to the conductivity of the area where pinching occurred.

A simplified equation can be used to calculate fracture conductivity. The fracture conductivity is proportional to the third power of fracture width $$k \sim w^3$$

where k is the fracture conductivity and w is the fracture width.

In a pinching area, fracture width can be of the order of 0.05 mm or less, with this width due to the natural roughness of the fracture walls. In extreme cases where there is little to no wall roughness, the fracture width is essentially equal to zero (0), as is the effective fracture conductivity.

The mechanical properties of the pillars expected to form and of the formation such as, for example, Young's modulus, Poisson's ratio, formation effective stress, and the like can have a large impact on the fracture modeling and treatment design. For example, an optimization problem according to the formation mechanical properties can be solved during the design of an initial model to maximize the open channel volume within a fracture.

Young's modulus refers to an elastic constant which is the ratio of longitudinal stress to longitudinal strain and is symbolized by E. It can be expressed mathematically as follows: $E=(F/A)/(\Delta L/L)$, where E=Young's modulus, F=force, A=area, $\Delta L$=change in length, and L=original area.

Poisson's ratio is an elastic constant which is a measure of the compressibility of material perpendicular to applied stress, or the ratio of latitudinal to longitudinal strain. Poisson's ratio can be expressed in terms of properties that can be measured in the field, including velocities of P-waves and S-waves as follows: $\sigma = \frac{1}{2}(V_{p2}-2V_s^2)/(V_{p2}-V_s^2)$, where $\sigma$=Poisson's ratio, $V_p$=P-wave velocity and $V_s$=S-wave velocity. Effective stress, also know as "effective pressure" or "intergranular pressure", refers to the average normal force per unit area transmitted directly from particle to particle of a rock or soil mass.

Scheduling and placement of the proppant during the HPP hydraulic fracture treatment can be different than traditional treatments. In HPP treatments, slugging the proppant can aid in correctly placing clusters in various locations in the fracture. For example, the proppant placement schedule can include slugs of proppant alternated with a proppant-lean fluid, for example "no slug" fluids, as illustrated in the HPP examples of FIGS. 1A-D wherein the alternating proppant slug and proppant-lean fluid technique is compared with the techniques of continuously increasing proppant injection and step change proppant injection, respectively. Proppant-lean fluids can include fluids with some concentration of proppant, though the concentration of proppant in the proppant-lean fluid is less than the concentration of proppant in the proppant slug.

Heterogeneous proppant placement for open channels in a proppant pack can be achieved by applying techniques such as addition of a heterogeneity trigger to the treatment fluid while pumping. The treatment fluid can include a chemical reactant heterogeneity trigger, a physical heterogeneity trigger such as fibers or a combination thereof. In some treatments, a trigger may be added periodically.

Embodiments of the present invention relate to re-healable proppant islands that comprise a first amount of a treated proppant, where the treated proppant comprises a proppant having a partial or complete coating of a zeta potential altering composition. The first amount is sufficient: (a) to allow formation of proppant islands in fractures formed in a formation or zone thereof during fracturing operations and to maintain the proppant islands substantially intact, if the proppant islands and/or particles within the proppant islands move within the formation during and/or after fracturing operations, or during injection operations, or during production operations, or (b) to allow formation of proppant islands in fractures formed in a formation or zone thereof during fracturing operations, to allow the proppant islands to re-heal or break apart and reform during and/or after fracturing operations, or during injection operations, or during production operations maintaining high fracture conductivity, and to capture formation fines during and/or after fracturing operations, or during injection operations, or during production operations. In other embodiments, the islands may further include a second amount untreated proppant, a third amount of a non-erodiblel fiber, and a fourth amount of an erodible material comprising erodible particles, erodible fibers, or mixtures and combinations thereof. In other embodiments, the zeta potential altering composition comprises an aggregating composition comprising an amine-phosphate reaction product, an amine component, an amine-phosphate reaction product, amine polymeric aggregating composition, a coacervate aggregating composition, or mixtures and combinations thereof.

Embodiments of this invention relate to self healing proppant islands that comprise a first amount of a treated proppant, where the treated proppant comprises a proppant having a partial or complete coating of an aggregating composition comprising an amine-phosphate reaction product, amine component and amine-phosphate reaction product, amine polymeric aggregating composition, a coacervate aggregating composition, or mixtures and combinations thereof, where the second amount is sufficient: (a) to allow formation of proppant islands in fractures formed in a formation or zone thereof and to allow the islands to break apart and reform without substantial loss in proppant during and/or after fracturing operations, or during injection operations, or during production operations, or (b) to allow formation of proppant islands in fractures formed in a formation or zone thereof, to allow the islands to break apart and reform without substantial loss in proppant during and/or after fracturing operations, or during injection operations, or during production operations, and to capture formation fines during and/or after fracturing operations, or during injection operations, or during production operations. In certain embodiments, the islands further comprise a second amount untreated proppant, a third amount of a non-erodible fiber, and a fourth amount of an erodible material comprising erodible particles, erodible fibers, or mixtures and combinations thereof, where the relative amounts of the different type of proppant materials and fibers are chosen to fit particular features of a formation to be fractured. In other embodiments, the zeta potential altering composition comprises an aggregating composition comprising an amine-phosphate reaction product, an amine component, an amine-phosphate reaction product, amine polymeric aggregating composition, a coacervate aggregating composition, or mixtures and combinations thereof.

Embodiments of this invention relate to compositions for forming proppants islands within a formation or zone thereof, where the composition comprises a first amount of a treated proppant, where the treated proppant comprises a proppant having a partial or complete coating of a zeta potential altering composition, and the first amount is sufficient: (a) to allow the compositions to form islands in the formation or zone thereof during and/or after fracturing operations, or (b) to allow the compositions to form islands in the formation or zone thereof and to capture formation fines during and/or after fracturing operations, or during injection operations, or during production operations. In certain embodiments, the islands further comprise a second amount untreated proppant, a third amount of a non-erodible fiber, and a fourth amount of an erodible material comprising erodible particles, erodible fibers, or mixtures and combinations thereof. In other embodiments, the zeta potential altering composition comprises an aggregating composition comprising an amine-phosphate reaction product, an amine component, an amine-phosphate reaction product, amine polymeric aggregating composition, a coacervate aggregating composition, or mixtures and combinations thereof.

Embodiments of this invention relate to systems for forming proppant pillars in a formation during formation fracturing comprising the steps of a sequence of injections of a plurality of different fracturing fluids, where the different fracturing fluids selected from the groups consisting of: (a) proppant-free fluids including (i) a base fluid or (ii) a base fluid and an aggregating composition and/or a viscosifying composition and (b) proppant-containing fluids including (i) a base fluid, a viscosifying composition, and a proppant composition or (ii) a base fluid, a viscosifying composition, a proppant composition and an aggregating composition. In certain embodiments, the sequences may include single injections of each fluid in any order or multiple injections of each fluid in any order. In other embodiments, the sequence may include a plurality of first fluid injections, a plurality of second fluid injections, and a plurality of third fluid injections. In other embodiments, the sequence may include single injections of the first, second, and third fluids repeated a number of times, where the number of times extends over the entire proppant placement stage of the fracturing operation. In other embodiments, the sequence may include multiple injections of each fluid in any given order. In other embodiments, the sequence may also include a hold period between each injection. In other embodiments, the sequence may include a first fluid injection, a first hold time, a second fluid injection, a second hold time, and a third fluid injection, and a third hold time, where the first, second and third fluid may be any of the fluid compositions listed above.

Embodiments of this invention relate to methods for fracturing including a pad stage comprising injecting into a formation a pad fluid into a formation under fracturing conditions to fracture and/or extend fractures. The methods also include a proppant placement stage comprising injecting a series of proppant stages fluids according to a sequence designed to form proppant pillars or islands in the fractures. The proppant stage fluids include at least one proppant-free fluid and at least one proppant-containing fluid. The proppant-free fluids include viscosified fluids with or without an aggregating composition and crosslinked viscosified fluids with or without an aggregating composition. The proppant-containing fluids include viscosified fluids including a proppant compositions with or without an aggregating composition, a crosslinked fluid including a proppant composition with or without an aggregating composition. The methods may also include a tail-in stage comprising injecting in a tail-in fluid. The proppant stage may include the sequential injection of thousands of slugs of proppant-free and proppant-containing fluids, where the slug pulses have a duration between 5 s and 30 s.

Embodiments of this invention relate to methods for fracturing a subterranean formation comprising a proppant placement stage comprising injecting into the formation penetrated by a wellbore at least two fracturing fluids differing in: (1) at least one proppant composition property, or (2) at least one fracturing fluid property, or (3) a combination of these differences, where the differences improve proppant placement and proppant island formation in the fractures. In certain embodiments, the fracturing fluid properties include fluid composition, fluid pressure, fluid temperature, fluid pulse duration, proppant settling rate, or mixtures and combinations thereof, and the proppant composition properties include proppant types, proppant sizes, proppant strengths, proppant shapes, or mixtures and combinations thereof. In other embodiments, the fracturing fluids are selected from the group consisting of (a) proppant-free fluids including (i) a base fluid or (ii) a base fluid and an aggregating composition and/or a viscosifying composition and (b) proppant-containing fluids including (i) a base fluid, a viscosifying composition, and a proppant composition or (ii) a base fluid, a viscosifying composition, a proppant composition and an aggregating composition. In other embodiments, the aggregating composition comprising an amine-phosphate reaction product, amine component, amine polymeric aggregating composition, a coacervate aggregating composition, or mixtures and combinations thereof. In other embodiments, the proppant composition including untreated proppant, treated proppant, or mixtures and combinations thereof. In other embodiments, the treated proppant comprises a proppant having a partial or complete coating of an aggregating composition comprising an amine-phosphate reaction product, amine component, amine polymeric aggregating composition, a coacervate aggregating composition, or mixtures and combinations thereof. In other embodiments, the proppant compositions differ in at least one of the following properties: (a) an amounts of untreated and treated proppant, (b) densities of the untreated and/or treated proppants, (c) sizes of the untreated and/or treated proppants, (d) shapes of the untreated and/or treated proppants, or (e) strengths of the untreated and/or treated proppants. In other embodiments, the proppant compositions further include (i) anon-erodible fiber, (ii) an erodible material comprising erodible particles, erodible fibers, or mixtures and combinations thereof, or (iii) mixtures or combinations thereof. In other embodiments, the proppant settling rate is control by adjusting a pumping rates. In other embodiments, the viscosified fracturing fluids differ in the viscosifying composition. In other embodiments, the injecting step comprises injecting the at least two different fracturing fluids according to an injection sequence. At least one of the fluids is proppant-free and at least one of the fluids includes a proppant composition. In other embodiments, the injection sequence comprises injecting the at least two different fracturing fluids in alternating stages during the fracturing operation. In other embodiments, the methods further comprises prior to the proppant placement step, a pad stage comprising injecting into the a pad fluid comprising a base fluid and a viscosifying composition or a base fluid, a viscosifying composition, and an aggregating composition.

Embodiments of this invention relate to methods for fracturing a subterranean formation comprising a proppant placement stage comprising injecting into the formation penetrated by a wellbore at least two different fracturing fluid according to an injection sequence, where the fracturing fluids differ in at least one property. In certain embodiments, the methods further comprises prior to the proppant placement step, a pad stage comprising injecting into the a pad fluid comprising a base fluid and a viscosifying composition or a base fluid, a viscosifying composition, and an aggregating composition. In certain embodiments, the properties include a fluid composition, a fluid pressure, a fluid temperature, a fluid pulse duration, a proppant settling rate, proppant types, proppant sizes, proppant strengths, proppant shapes, or mixtures and combinations thereof. In certain embodiments, the fracturing fluids are selected from the group consisting of (a) proppant-free fluids including (i) a base fluid or (ii) a base fluid and an aggregating composition and/or a viscosifying composition and (b) proppant-containing fluids including (i) a base fluid, a viscosifying composition, and a proppant composition or (ii) a base fluid, a viscosifying composition, a proppant composition and an aggregating composition. In other embodiments, the aggregating composition comprising an amine-phosphate reaction product, amine component, amine polymeric aggregating composition, a coacervate aggregating composition, or mixtures and combinations thereof. In other embodiments, the proppant composition including untreated proppant, treated proppant, or mixtures and combinations thereof. In other embodiments, the treated proppant comprises a proppant having a partial or complete coating of an aggregating composition comprising an amine-phosphate reaction product, amine component, amine polymeric aggregating composition, a coacervate aggregating composition, or mixtures and combinations thereof. In other embodiments, the proppant compositions differ in at least one of the following properties: (a) an amounts of untreated and treated proppant, (b) densities of the untreated and/or treated proppants, (c) sizes of the untreated and/or treated proppants, (d) shapes of the untreated and/or treated proppants, or (e) strengths of the untreated and/or treated proppants. In other embodiments, the proppant compositions further include (i) a non-erodible fiber, (ii) an erodible material comprising erodible particles, erodible fibers, or mixtures and combinations thereof, or (iii) mixtures or combinations thereof. In other embodiments, the proppant settling rate is control by adjusting a pumping rates. In other embodiments, the viscosified fracturing fluids differ in the viscosifying composition. In other embodiments, the injecting step comprises injecting the at least two different fracturing fluids according to an injection sequence. In other embodiments, at least one of the fluids is proppant-free and at least one of the fluids includes a proppant composition. In other embodiments, the injection sequence comprises injecting the at least two different fracturing fluids in alternating stages during the fracturing operation. In other embodiments, the methods further comprising after the proppant placement step, a tail-in stage comprising injecting into the a tail-in fluid comprising (i) a base fluid, a viscosifying composition, and aproppant composition or (ii) abase fluid, a viscosifying composition, aproppant composition, and an aggregating composition.

Embodiments of this invention relate to methods for placing a proppant/flow path network in fractures in a fracturing layer penetrated by a wellbore, the method comprises a proppant placement stage comprising injecting, into the fracturing layer above fracturing pressure through a pattern of perforations comprising groups of perforations separated by non-perforated spans, a sequence of slugs of at least one proppant-free fluid selected from the group consisting of a non-viscosified proppant-free fluid or a viscosified proppant-free fluid and at least one proppant-containing fluid selected from the group consisting of a non-viscosified proppant-containing fluid or a viscosified proppant-containing fluid. In certain embodiments, the non-viscosified proppant-free fluid comprises (a) a base fluid or (b) a base fluid and an aggregating composition. In other embodiments, the viscosified proppant-free fluid comprises (a) a base fluid and a viscosifying composition or (b) a base fluid, a viscosifying composition, and an aggregating composition. In other embodiments, the non-viscosified proppant-containing comprises (a) a base fluid and a proppant composition, or (b) a base fluid, a proppant composition, and an aggregating composition. In other embodiments, the viscosified proppant-containing comprises (a) a base fluid, a viscosifying composition and, a proppant composition or (b) a base fluid, a viscosifying composition, a proppant composition, and an aggregating composition. In other embodiments, the aggregating composition comprises an amine-phosphate reaction product, amine component, amine polymeric aggregating composition, a coacervate aggregating composition, or mixtures and combinations thereof. In other embodiments, the proppant-containing fluids form proppant pillars within the fractures during fracturing and/or after fracturing as the fractures closes. In other embodiments, the methods further comprises causing the sequence of slugs injected through neighboring perforation groups to move through the fractures at different rates. In other embodiments, at least one of the parameters slug volume, slug composition, proppant composition, proppant sizes, proppant shapes, proppant densities, proppant strengths, proppant concentrations, pattern length, number of perforation groups, perforation group separations, perforation group orientations, number of holes in each perforation group, perforation group shot densities, perforation group lengths, number of non-perforation spans, non-perforation span lengths, methods of perforation, or combinations thereof change according to the slug sequence. In other embodiments, the proppant composition comprises a first amount of an untreated proppant, a second amount of a treated proppant, a third amount of an erodible or dissolvable proppant, and a fourth amount of a non-erodible fiber. In other embodiments, the treated proppant comprises a proppant having a partial or complete coating of the aggregating composition. In other embodiments, the erodible or dissolvable proppant comprises erodible or dissolvable organic particles, erodible or dissolvable organic fibers, erodible or dissolvable inorganic particles, and/or erodible or dissolvable inorganic fibers. In other embodiments, the non-erodible fibers comprise non-erodible organic fibers and/or non-erodible inorganic fibers. In other embodiments, a sum of the second amount is 100 wt. %, the first, third and fourth amounts may range between 0 wt. % and 100 wt. %, and the amounts may sum to values greater than 100%. In other embodiments, the methods further comprises prior to the proppant placement step, a pad stage comprising continuously injecting a viscosified proppant-free fluid into the fracturing fluid under fracturing conditions to form or elongate fractures. In other embodiments, the methods further comprises after the proppant placement step, a tail-in-stage comprising continuously injecting a viscosified proppant-containing fluid into the fracturing fluid.

Embodiments of this invention relate to methods for heterogeneous proppant placement in a fracture in a fracturing layer, the method comprising a) a proppant placement stage comprising injecting, into the fracturing layer above fracturing pressure through a pattern of perforations comprising groups of perforations separated by non-perforated spans, a sequence of slugs of at least one proppant-free fluid selected from the group consisting of a non-viscosified proppant-free fluid or a viscosified proppant-free fluid and at least one proppant-containing fluid selected from the group consisting of a non-viscosified proppant-containing fluid or a viscosified proppant-containing fluid, and b) causing the sequence of slugs injected through neighboring perforation groups to move through the fractures at different rates. In certain embodiments, the non-viscosified proppant-free fluid comprises (a) a base fluid or (b) a base fluid and an aggregating composition. In other embodiments, the viscosified proppant-free fluid comprises (a) a base fluid and a viscosifying composition or (b) a base fluid, a viscosifying composition, and an aggregating composition. In other embodiments, the non-viscosified proppant-containing comprises (a) a base fluid and a proppant composition, or (b) a base fluid, a proppant composition, and an aggregating composition. In other embodiments, the viscosified proppant-containing comprises (a) a base fluid, a viscosifying composition and, a proppant composition or (b) a base fluid, a viscosifying composition, a proppant composition, and an aggregating composition. In other embodiments, the aggregating composition comprises an amine-phosphate reaction product, amine component, amine polymeric aggregating composition, a coacervate aggregating composition, or mixtures and combinations thereof. In other embodiments, the proppant-containing fluids form proppant pillars within the fractures during fracturing and/or after fracturing as the fractures closes. In other embodiments, the methods further comprises prior to the proppant placement step, a pad stage comprising continuously injecting a viscosified proppant-free fluid into the fracturing fluid under fracturing conditions to form or elongate fractures. In other embodiments, the methods further comprises after the proppant placement step, a tail-in-stage comprising continuously injecting a viscosified proppant-containing fluid into the fracturing fluid. In other embodiments, at least one of the parameters slug volume, slug composition, proppant composition, proppant sizes, proppant shapes, proppant densities, proppant strengths, proppant concentrations, pattern length, number of perforation groups, perforation group separation, perforation group orientations, number of holes in each perforation group, perforation group shot densities, perforation group lengths, number of non-perforation spans, non-perforation span lengths, methods of perforation, or combinations thereof change according to the slug sequence. In other embodiments, a volume of the proppant-containing fluids is less than a volume of the proppant-free fluids. In other embodiments, a number of holes in each of the perforation groups is the same or different. In other embodiments, an orientations of all of the perforation groups are the same or different. In other embodiments, a diameter of holes in all of the perforation groups is the same or different. In other embodiments, perforation group lengths of all the perforation groups are the same or different. In other embodiments, at least two different perforation methods for forming the perforation groups are used. In other embodiments, some of the groups are produced using an underbalanced perforation technique and some of the groups are produced using an overbalanced perforation technique. In other embodiments, at least two perforation groups allow flow of a sequence of slugs of the proppant-free fluid and the proppant-containing fluid are separated by a perforation group having sufficiently small perforations that the proppant bridges and proppant-free fluids enter the formation therethrough. In other embodiments, every pair of perforation groups that produce a sequence of slugs of the proppant-free fluids and the proppant-containing fluids are separated by a perforation group having sufficiently small perforations that the proppant bridges and proppant-free fluid enters the formation therethrough. In other embodiments, a number of perforation groups is between 2 and 300. In other embodiments, the number of groups of perforations is between 2 and 100. In other embodiments, the perforation group length is between 0.15 m and 3.0 m. In other embodiments, the perforation group separation is from 0.30 m to 30 m. In other embodiments, the perforation shot density is from 1 to 30 shots per 0.3 m. In other embodiments, a fluid injection design is determined from a mathematical model. In other embodiments, a perforation pattern design is determined from a mathematical model. In other embodiments, the proppant pillars are a proppant/flow pathway network in the fractures such that the pillars do not extend over an entire dimension of the fractures parallel to the wellbore but are interrupted by flow paths that lead to the wellbore. In other embodiments, the proppant slugs have a volume between 80 and 16,000 liters. In other embodiments, the perforations are slots cut into tubing lining the wellbore.

Embodiments of this invention relate to compositions comprising a subterranean formation penetrated by a wellbore, where the formation includes fractures having a proppant/flow pathway network, where the network comprises a plurality of proppant clusters forming pillars and a plurality of flow pathways extending through the network to the wellbore improving fluid flow into or out of the fractures. In certain embodiments, the proppant clusters comprises a first amount of untreated proppant, a second amount of treated proppant, and a third amount of non-erodible fibers. In other embodiments, the treated proppant comprises a proppant having a partial or complete coating of an aggregating composition comprising an amine-phosphate reaction product, amine component, amine polymeric aggregating composition, a coacervate aggregating composition, or mixtures and combinations thereof. In other embodiments, the second amount is sufficient: (a) to form the network in the fractures, (b) to maintain the clusters substantially in tact, if the clusters move or break up and reform within the fractures during and/or after a fracturing operation, (c) to enable and enhance fluid flow into and out of the formation through the fractures, (d) to capture formation fines during and/or after a fracturing operation, or during a injection operation, or during production operation, or (e) mixtures and combinations thereof. In other embodiments, the network comprises proppant-rich regions and proppant-lean regions, where the proppant-lean regions include no or less than 10% of clusters in the proppant-rich regions. In other embodiments, the untreated proppant is selected from the group consisting of sand, nut hulls, ceramics, bauxites, glass, natural materials, plastic beads, particulate metals, drill cuttings, and combinations thereof. In other embodiments, the treated proppant comprising the untreated proppant including a partial or complete coating of the aggregating composition. In other embodiments, the second amount is 100 wt. %, the first and third amounts may range between 0 wt. % and 100 wt. %, and the amounts may sum to values greater than 100%. In other embodiments, the proppant clusters further comprise a fifth amount of erodible or dissolvable proppant particles and/or fibers, the erodible or dissolvable proppant particles and/or fibers that form a plurality of erodible or dissolvable clusters within the network, which erode or dissolve to from additional flow pathways in network. In other embodiments, a sum of the second and third amounts is 100 wt. %, the first, fourth and fifth amounts may range between 0 wt. % and 100 wt. %, and the amounts may sum to values greater than 100%.

Embodiments of this invention relate to compositions comprising a subterranean formation penetrated by a wellbore, where the formation includes fractures having a proppant/flow pathway network, where the network comprises a plurality of proppant clusters forming pillars, a plurality of erodible or dissolvable clusters, and a plurality of flow pathways extending through the network to the wellbore improving fluid flow into or out of the fractures. In certain embodiments, the proppant clusters comprises proppant composition including a first amount of untreated proppant, a second amount of treated proppant, a third amount of erodible or dissolvable proppant particles and/or fibers, and a fourth amount of non-erodible fibers. In other embodiments, the treated proppant comprises a proppant having a partial or complete coating of an aggregating composition comprising an amine-phosphate reaction product, amine component and amine-phosphate reaction product, amine polymeric aggregating composition, a coacervate aggregating composition, or mixtures and combinations thereof. In other embodiments, the second amount is sufficient: (a) to form the clusters in the fracture, (b) to maintain the clusters substantially in tact, if the mobile proppant island moves within a formation during fracturing operations, (c) to enable and enhance fluid flow from the formation through the fracture toward the wellbore, (d) to capture formation fines during fracturing operations, injection operations, or production operations, or (e) mixtures and combinations thereof. In other embodiments, the network comprises proppant-rich regions and proppant-lean regions, where the proppant-lean regions include no or less than 10% of clusters in the proppant-rich regions. In other embodiments, the untreated proppant is selected from the group consisting of sand, nut hulls, ceramics, bauxites, glass, natural materials, plastic beads, particulate metals, drill cuttings, and combinations thereof. In other embodiments, the treated proppant comprise the untreated proppant including a partial or complete coating of the aggregating composition. In other embodiments, a sum of the second and third amounts is 100 wt. %, the first, fourth and fifth amounts may range between 0 wt. % and 100 wt. %, and the amounts may sum to values greater than 100%.

Compositional Ranges Useful in the Invention

Fracturing fluids are all based on 100 wt. % of a base fluid and various wt. % of the other components so that the final fracturing fluid weight percentages may sum to greater than 100%, thus, the other components represent relative amounts. These formulations are therefore similar to rubber compositions which are expressed relative amounts based on 100 parts rubber. With this in mind, the fracturing fluids may include 100 wt. % of a base fluid and varying amounts of: an aggregating composition, a viscosifying composition, a proppant composition, and other additives. Base fluid are prepared from guar or guar derivatives, cellulose or cellulose derivatives, synthetic water soluble polymers, slick water polymer, surfactants etc. dissolved in brine, fresh water, produced water etc. as set forth herein. Table 1 tabulations permitted proppant-free fracturing fluid compositions in ranges of components.

TABLE 1

Proppant-Free Fluids-All Amount in Weight Percentages

| Type | BF$^a$ | AC$^b$ | VC$^d$ | OC$^e$ | PC$^f$ |
|---|---|---|---|---|---|
| 1 | 100 | 0 | 0 | 0 | 0 |
| 2 | 100 | 0.1-20 (0.1-10) {0.1-5} | 0 | 0 | 0 |
| 3 | 100 | 0 | 0 | 0 | 0 |
| 4 | 100 | 0 | 0.01-20 (0.01-10) {0.01-5} | 0 | 0 |
| 5 | 100 | 0 | 0 | 0.01-20 (0.01-10) {0.01-5} | 0 |
| 6 | 100 | 0.01-20 (0.01-10) {0.01-5} | 0 | 0 | 0 |

TABLE 1-continued

Proppant-Free Fluids-All Amount in Weight Percentages

| Type | BF$^a$ | AC$^b$ | VC$^d$ | OC$^e$ | PC$^f$ |
|---|---|---|---|---|---|
| 7 | 100 | 0.01-20 (0.01-10) {0.01-5} | 0.01-20 (0.01-10) {0.01-5} | 0 | 0 |
| 8 | 100 | 0.01-20 (0.01-10) {0.01-5} | 0 | 0.01-20 (0.01-10) {0.01-5} | 0 |
| 9 | 100 | 0 | 0.01-20 (0.01-10) {0.01-5} | 0 | 0 |
| 10 | 100 | 0 | 0 | 0.01-20 (0.01-10) {0.01-5} | 0 |
| 11 | 100 | 0 | 0.01-20 | 0.01-20 | 0 |
| 12 | 100 | 0.01-20 (0.01-10) {0.01-5} | 0.01-20 (0.01-10) {0.01-5} | 0 | 0 |
| 13 | 100 | 0.01-20 (0.01-10) {0.01-5} | 0 | 0.01-20 (0.01-10) {0.01-5} | 0 |
| 14 | 100 | 0.01-20 (0.01-10) {0.01-5} | 0.01-20 (0.01-10) {0.01-5} | 0.01-20 (0.01-10) {0.01-5} | 0 |
| 15 | 100 | 0 | 0.01-20 (0.01-10) {0.01-5} | 0.01-20 (0.01-10) {0.01-5} | 0 |
| 16 | 100 | 0.01-20 (0.01-10) {0.01-5} | 0.01-20 (0.01-10) {0.01-5} | 0.01-20 (0.01-10) {0.01-5} | 0 |

$^a$base fluid,
$^b$aggregating composition,
$^c$coating crosslinking composition,
$^d$viscosifying composition,
$^e$other additives, and
$^f$proppant composition - ( ) narrower range, { } still narrower range, (( )) still narrower range Table 2 tabulates permitted proppant-containing fracturing fluids in ranges of components.

TABLE 2

Proppant Containing Fluids-All Amount in Weight Percentages

| Type | BF$^a$ | AC$^b$ | VC$^d$ | OC$^e$ | PC$^f$ |
|---|---|---|---|---|---|
| 1 | 100 | 0 | 0 | 0 | 0.1-400 (0.1-300) {0.1-200} ((.01-100)) |
| 2 | 100 | 0.01-20 (0.01-10) {0.01-5} | 0 | 0 | 0.1-400 (0.1-300) {0.1-200} ((.01-100)) |
| 3 | 100 | 0 | 0 | 0 | 0.1-400 (0.1-300) {0.1-200} ((.01-100)) |
| 4 | 100 | 0 | 0.01-20 (0.01-10) {0.01-5} | 0 | 0.1-400 (0.1-300) {0.1-200} ((.01-100)) |
| 5 | 100 | 0 | 0 | 0.01-20 (0.01-10) {0.01-5} | 0.1-400 (0.1-300) {0.1-200} ((.01-100)) |
| 6 | 100 | 0.01-20 (0.01-10) {0.01-5} | 0 | 0 | 0.1-400 (0.1-300) {0.1-200} ((.01-100)) |
| 7 | 100 | 0.01-20 (0.01-10) {0.01-5} | 0.01-20 (0.01-10) {0.01-5} | 0 | 0.1-400 (0.1-300) {0.1-200} ((.01-100)) |

TABLE 2-continued

Proppant Containing Fluids-All Amount in Weight Percentages

| Type | BF[a] | AC[b] | VC[d] | OC[e] | PC[f] |
|---|---|---|---|---|---|
| 8 | 100 | 0.01-20<br>(0.01-10)<br>{0.01-5} | 0 | 0.01-20<br>(0.01-10)<br>{0.01-5} | 0.1-400<br>(0.1-300)<br>{0.1-200}<br>((.01-100)) |
| 9 | 100 | 0 | 0.01-20<br>(0.01-10)<br>{0.01-5} | 0 | 0.1-400<br>(0.1-300)<br>{0.1-200}<br>((.01-100)) |
| 10 | 100 | 0 | 0 | 0.01-20<br>(0.01-10)<br>{0.01-5} | 0.1-400<br>(0.1-300)<br>{0.1-200}<br>((.01-100)) |
| 11 | 100 | 0 | 0.01-20<br>(0.01-10)<br>{0.01-5} | 0.01-20<br>(0.01-10)<br>{0.01-5} | 0.1-400<br>(0.1-300)<br>{0.1-200}<br>((.01-100)) |
| 12 | 100 | 0.01-20<br>(0.01-10)<br>{0.01-5} | 0.01-20<br>(0.01-10)<br>{0.01-5} | 0 | 0.1-400<br>(0.1-300)<br>{0.1-200}<br>((.01-100)) |
| 13 | 100 | 0.01-20<br>(0.01-10)<br>{0.01-5} | 0 | 0.01-20<br>(0.01-10)<br>{0.01-5} | 0.1-400<br>(0.1-300)<br>{0.1-200}<br>((.01-100)) |
| 14 | 100 | 0.01-20<br>(0.01-10)<br>{0.01-5} | 0.01-20<br>(0.01-10)<br>{0.01-5} | 0.01-20<br>(0.01-10)<br>{0.01-5} | 0.1-400<br>(0.1-300)<br>{0.1-200}<br>((.01-100)) |
| 15 | 100 | 0 | 0.1-20<br>(0.1-10)<br>{0.1-5} | 0.1-20<br>(0.1-10)<br>{0.1-5} | 0.1-400<br>(0.1-300)<br>{0.1-200}<br>((.01-100)) |
| 16 | 100 | 0.01-20<br>(0.01-10)<br>{0.01-5} | 0.01-20<br>(0.01-10)<br>{0.01-5} | 0.01-20<br>(0.01-10)<br>{0.01-5} | 0.1-400<br>(0.1-300)<br>{0.1-200}<br>((.01-100)) |

[a] base fluid,
[b] aggregating composition,
[c] coating crosslinking composition,
[d] viscosifying composition,
[e] other additives, and
[f] proppant composition - ( ) narrower range, { } still narrower range, (( )) still narrower range In certain embodiments, the viscosifying compositions include from about 80 wt. % to about 99 wt. % of one viscosifying agent or a plurality of viscosifying agents and from about 20 wt. % to about 0.1 wt. % of one crosslinking agent or a plurality of crosslinking agents. A list of viscosifying agents and crosslinking agents are set forth in the Suitable Reagents section herein.

In certain embodiments, the aggregating composition may comprise a single aggregating agent or a plurality of aggregating agents in any relative mixture, where the agent and/or mixture selection may be tailored to formation and proppant properties and characteristics.

Figure 6:
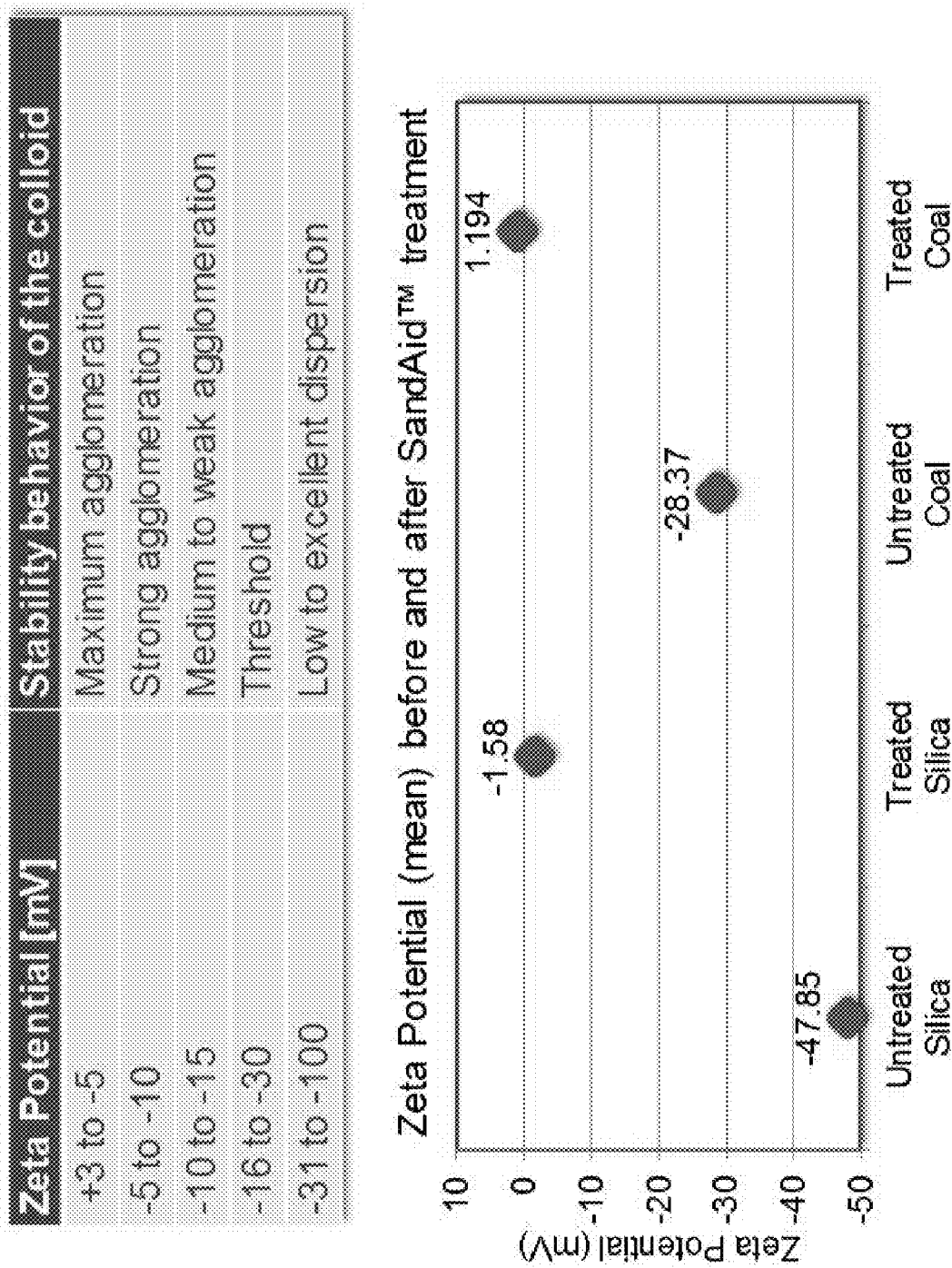
FIG. 6 depicts a table of zeta potentials and aggregating propensities and a plot of zeta potentials for untreated silica and coal and treated silica and coal.

In certain embodiments, the proppant composition of each proppant-containing fracturing fluid may include from 0 wt. % to 100 wt. % of one untreated proppant or a plurality of untreated proppants and from 0 wt. % to 100 wt. % of one treated proppant or a plurality of treated proppants, where the treated proppants comprise untreated proppants treated with one aggregating agent or untreated proppants treated with a plurality of the aggregating agents to form partial or complete aggregating coating on the proppants altering their aggregating propensity from low to maximal aggregating propensity according to the information shown in FIG. 6. It should be recognized that by changing the amount of aggregating composition used or the extend of the aggregating coating on treated proppants, the relative or bulk aggregating propensity per the table of FIG. 6 may be altered to any desired aggregating propensity to permit different proppant pillar or island formation within fractures formed in a formation during formation fracturing.

Suitable Reagents for Use in this Invention

Base Fluids

The base fluids for use in this invention include, without limitation, any liquid base fluid suitable for use in oil and gas producing wells or injections wells, or mixtures and combinations thereof. Exemplary liquid base fluids include, without limitation, aqueous base fluids, organic base fluids, water-in-oil base fluids, oil-in-water base fluids, any other base fluids used in fracturing fluids, viscosified versions thereof, or mixtures and combinations thereof. Exemplary aqueous base fluids include water, tap water, production water, salt water, brines, or mixtures and combinations thereof. Exemplary brines include, without limitation, sodium chloride brines, potassium chloride brines, calcium chloride brines, magnesium chloride brines, tetramethyl ammonium chloride brines, other chloride brines, phosphate brines, nitrate brines, other salt brines, or mixtures and combinations thereof.

Aqueous Base Fluids

Aqueous base fluids will generally comprise water, consist essentially of water, or consist of water. Water will typically be a major component by weight 50 wt. % of the aqueous base fluids. The water may be potable or non-potable. The water may be brackish or contain other materials typical of sources of water found in or near oil fields. For example, it is possible to use fresh water, brine, or even water to which any salt, such as an alkali metal or alkali earth metal salt ($NaCO_3$, NaCl, KCl, etc.) has been added. The aqueous fracturing fluids generally include at least about 80 wt. % of an aqueous base fluid. In other embodiments, the aqueous fracturing fluids including 80 wt. %, 85 wt. %, 90 wt. %, and 95 wt. % of an aqueous base fluid.

Organic Base Fluids

Organic base fluids comprise of a liquid organic carrier, consist essentially of a liquid organic carrier, or consist of a liquid organic carrier or a hydrocarbon base fluid or a hydrocarbon base fluid include a hydrocarbon soluble polymer. The organic fracturing fluids generally include at least about 80 wt. % of an organic base fluid. In other embodiments, the aqueous fracturing fluids including 80 wt. %, 85 wt. %, 90 wt. %, and 95 wt. % of an organic base fluid.

Hydrocarbon Base Fluids

Suitable hydrocarbon base fluids for use in this invention includes, without limitation, synthetic hydrocarbon fluids, petroleum based hydrocarbon fluids, natural hydrocarbon (non-aqueous) fluids or other similar hydrocarbons or mixtures or combinations thereof. The hydrocarbon fluids for use in the present invention have viscosities ranging from about $5 \times 10^{-6}$ to about $600 \times 10^{-6}$ $m^2/s$ (5 to about 600 centistokes). Exemplary examples of such hydrocarbon fluids include, without limitation, polyalphaolefins, polybutenes, polyolesters, biodiesels, simple low molecular weight fatty esters of vegetable or vegetable oil fractions, simple esters of alcohols such as Exxate from Exxon Chemicals, vegetable oils, animal oils or esters, other essential oil, diesel, diesel having a low or high sulfur content, kerosene, jet-fuel, white oils, mineral oils, mineral seal oils, hydrogenated oil such as PetroCanada HT-40N or IA-35 or similar oils produced by Shell Oil Company, internal olefins (JO) having between about 12 and 20 carbon atoms, linear alpha olefins having between about 14 and 20 carbon atoms, polyalpha olefins having between about 12 and about 20 carbon atoms, isomerized alpha olefins (IAO) having between about 12 and about 20 carbon atoms, VM&P Naptha, Linpar, Parafins having between 13 and about 16 carbon atoms, and mixtures or combinations thereof.

Suitable polyalphaolefins (PAOs) include, without limitation, polyethylenes, polypropylenes, polybutenes, polypentenes, polyhexenes, polyheptenes, higher PAOs, copolymers thereof, and mixtures thereof. Exemplary examples of PAOs include PAOs sold by Mobil Chemical Company as SHF fluids and PAOs sold formerly by Ethyl Corporation under the name ETHYLFLO and currently by Albemarle Corporation under the trade name Durasyn. Such fluids include those specified as ETYHLFLO 162, 164, 166, 168, 170, 174, and 180. Well suited PAOs for use in this invention include bends of about 56% of ETHYLFLO now Durasyn 174 and about 44% of ETHYLFLO now Durasyn 168.

Exemplary examples of polybutenes include, without limitation, those sold by Amoco Chemical Company and Exxon Chemical Company under the trade names INDOPOL and PARAPOL, respectively. Well suited polybutenes for use in this invention include Amoco's INDOPOL 100.

Exemplary examples of polyolester include, without limitation, neopentyl glycols, trimethylolpropanes, pentaerythriols, dipentaerythritols, and diesters such as dioctylsebacate (DOS), diactylazelate (DOZ), and dioctyladipate.

Exemplary examples of petroleum based fluids include, without limitation, white mineral oils, paraffinic oils, and medium-viscosity-index (MVI) naphthenic oils having viscosities ranging from about $5\times10^{-6}$ to about $600\times10^{-6}$ m$^2$/s (5 to about 600 centistokes) at 40° C. Exemplary examples of white mineral oils include those sold by Witco Corporation, Arco Chemical Company, PSI, and Penreco. Exemplary examples of paraffinic oils include solvent neutral oils available from Exxon Chemical Company, high-viscosity-index (HVI) neutral oils available from Shell Chemical Company, and solvent treated neutral oils available from Arco Chemical Company. Exemplary examples of MVI naphthenic oils include solvent extracted coastal pale oils available from Exxon Chemical Company, MVI extracted/ acid treated oils available from Shell. Chemical Company, and naphthenic oils sold under the names HydroCal and Calsol by Calumet and hydrogenated oils such as HT-40N and IA-35 from PetroCanada or Shell Oil Company or other similar hydrogenated oils.

Exemplary examples of vegetable oils include, without limitation, castor oils, corn oil, olive oil, sunflower oil, sesame oil, peanut oil, palm oil, palm kernel oil, coconut oil, butter fat, canola oil, rape seed oil, flax seed oil, cottonseed oil, linseed oil, other vegetable oils, modified vegetable oils such as crosslinked castor oils and the like, and mixtures thereof. Exemplary examples of animal oils include, without limitation, tallow, mink oil, lard, other animal oils, and mixtures thereof. Other essential oils will work as well. Of course, mixtures of all the above identified oils can be used as well.

Hydrocarbon Soluble Polymers

Suitable polymers for use as anti-settling additives or polymeric suspension agents in this invention include, without limitation, linear polymers, block polymers, graft polymers, star polymers or other multi-armed polymers, which include one or more olefin monomers and/or one or more diene monomers and mixtures or combinations thereof. The term polymer as used herein refers to homo-polymers, co-polymers, polymers including three of more monomers (olefin monomers and/or diene monomers), polymer including oligomeric or polymeric grafts, which can comprise the same or different monomer composition, arms extending form a polymeric center or starring reagent such as tri and tetra valent linking agents or divinylbenzene nodes or the like, and homo-polymers having differing tacticities or microstructures. Exemplary examples are styrene-isoprene copolymers (random or block), triblocked, multi-blocked, styrene-butadiene copolymer (random or block), ethylene-propylene copolymer (random or block), sulphonated polystyrene polymers, alkyl methacrylate polymers, vinyl pyrolidone polymers, vinyl pyridine, vinyl acetate, or mixtures or combinations thereof.

Suitable olefin monomer include, without limitation, any monounsaturated compound capable of being polymerized into a polymer or mixtures or combinations thereof. Exemplary examples include ethylene, propylene, butylene, and other alpha olefins having between about 5 and about 20 carbon atoms and sufficient hydrogens to satisfy the valency requirement, where one or more carbon atoms can be replaced by B, N, O, P, S, Ge or the like and one or more of the hydrogen atoms can be replaced by F, Cl, Br, I, OR, SR, COOR, CHO, C(O)R, C(O)NH2, C(O)NHR, C(O)NRR', or other similar monovalent groups, polymerizable internal mono-olefinic monomers or mixtures or combinations thereof, where R and R' are the same or different and are carbyl group having between about 1 to about 16 carbon atoms and where one or more of the carbon atoms and hydrogen atoms can be replaced as set forth immediately above.

Suitable diene monomer include, without limitation, any doubly unsaturated compound capable of being polymerized into a polymer or mixtures or combinations thereof. Exemplary examples include 1,3-butadiene, isoprene, 2,3-dimethyl butadiene, or other polymerizable diene monomers.

The inventors have found that Infineum SV150, an isoprene-styrene di-block and starred polymer, offers superior permanent shear stability and thickening efficiency due to its micelle forming nature.

Suitable hydrocarbon base fuels include, without limitation, t and mineral oil or diesel oil before adding organophillic clays, polar activator, the additive to be suspended (Guar or Deriatized Guar, e.g. CMHPG) and the dispersing surfactant in concentrations between 0.10-5.0% w/w.

Viscoelastic Base Fluids

Viscoelastic base fluids comprise a liquid carrier including viscoelastic surfactant (VAS) or a VAS gel.

The surfactant can generally be any surfactant. The surfactant is preferably viscoelastic. The surfactant is preferably anionic. The anionic surfactant can be an alkyl sarcosinate. The alkyl sarcosinate can generally have any number of carbon atoms. Presently preferred alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms.

The anionic surfactant can have the chemical formula $R_1CON(R_2)CH_2X$, wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

The surfactant can generally be present in any weight percent concentration. Presently preferred concentrations of surfactant are about 0.1% to about 15% by weight. A presently more preferred concentration is about 0.5% to about 6% by weight. Laboratory procedures can be employed to determine the optimum concentrations for any particular situation.

The amphoteric polymer can generally be any amphoteric polymer. The amphoteric polymer can be a nonionic water-soluble homopolysaccharide or an anionic water-soluble polysaccharide. The polymer can generally have any molecular weight, and is presently preferred to have a molecular weight of at least about 500,000.

The polymer can be a hydrolyzed polyacrylamide polymer. The polymer can be a scleroglucan, a modified scleroglucan, or a scleroglucan modified by contact with glyoxal or glutaraldehyde. The scleroglucans are nonionic water-soluble homopolysaccharides, or water-soluble anionic polysaccharides, having molecular weights in excess of about 500,000, the molecules of which consist of a main straight chain formed of D-glucose units which are bonded by $\beta$-1,3-bonds and one in three of which is bonded to a side D-glucose unit by means of a $\beta$-1,6 bond. These polysaccharides can be obtained by any of the known methods in the art, such as fermentation of a medium based on sugar and inorganic salts under the action of a microorganism of *Sclerotium* type A. A more complete description of such scleroglucans and their preparations may be found, for example, in U.S. Pat. Nos. 3,301,848 and 4,561,985, incorporated herein by reference. In aqueous solutions, the scleroglucan chains are combined in a triple helix, which explains the rigidity of the biopolymer, and consequently its features of high viscosity-increasing power and resistance to shearing stress.

It is possible to use, as source of scleroglucan, the scleroglucan which is isolated from a fermentation medium, the product being in the form of a powder or of a more or less concentrated solution in an aqueous and/or aqueous-alcoholic solvent. Scleroglucans customarily used in applications in the petroleum field are also preferred according to the present invention, such as those which are white powders obtained by alcoholic precipitation of a fermentation broth in order to remove residues of the producing organism (mycelium, for example). Additionally, it is possible to use the liquid reaction mixture resulting from the fermentation and containing the scleroglucan in solution. According to the present invention, further suitable scleroglucans are the modified scleroglucan which result from the treatment of scleroglucans with a dialdehyde reagent (glyoxal, glutaraldehyde, and the like), as well as those described in U.S. Pat. No. 6,162,449, incorporated herein by reference, ($\beta$-1,3-scleroglucans with a cross-linked 3-dimensional structure produced by *Sclerotium rolfsii*).

The polymer can be Aquatrol V (a synthetic compound which reduces water production problems in well production; described in U.S. Pat. No. 5,465,792, incorporated herein by reference), AquaCon (a moderate molecular weight hydrophilic terpolymer based on polyacrylamide capable of binding to formation surfaces to enhance hydrocarbon production; described in U.S. Pat. No. 6,228,812, incorporated herein by reference) and Aquatrol C (an amphoteric polymeric material). Aquatrol V, Aquatrol C, and AquaCon are commercially available from BJ Services Company.

The polymer can be a terpolymer synthesized from an anionic monomer, a cationic monomer, and a neutral monomer. The monomers used preferably have similar reactivities so that the resultant amphoteric polymeric material has a random distribution of monomers. The anionic monomer can generally be any anionic monomer. Presently preferred anionic monomers include acrylic acid, methacrylic acid, 2-acrylamide-2-methylpropane sulfonic acid, and maleic anhydride. The cationic monomer can generally be any cationic monomer. Presently preferred cationic monomers include dimethyl-diallyl ammonium chloride, dimethyl-amino-ethyl methacrylate, and allyltrimethyl ammonium chloride. The neutral monomer can generally be any neutral monomer. Presently preferred neutral monomers include butadiene, N-vinyl-2-pyrrolidone, methyl vinyl ether, methyl acrylate, maleic anhydride, styrene, vinyl acetate, acrylamide, methyl methacrylate, and acrylonitrile. The polymer can be a terpolymer synthesized from acrylic acid (AA), dimethyl diallyl ammonium chloride (DMDAC) or diallyl dimethyl ammonium chloride (DADMAC), and acrylamide (AM). The ratio of monomers in the terpolymer can generally be any ratio. A presently preferred ratio is about 1:1:1.

Another presently preferred amphoteric polymeric material (hereinafter "polymer 1") includes approximately 30% polymerized AA, 40% polymerized AM, and 10% polymerized DMDAC or DADMAC with approximately 20% free residual DMDAC or DADMAC which is not polymerized due to lower relative reactivity of the DMDAC or DADMAC monomer.

The fluid can further comprise one or more additives. The fluid can further comprise a base. The fluid can further comprise a salt. The fluid can further comprise a buffer. The fluid can further comprise a relative permeability modifier. The fluid can further comprise methylethylamine, monoethanolamine, triethylamine, triethanolamine, sodium hydroxide, potassium hydroxide, potassium carbonate, sodium chloride, potassium chloride, potassium fluoride, $KH_2PO_4$, or $K_2HPO_4$. The fluid can further comprise a proppant. Conventional proppants will be familiar to those skilled in the art and include sand, resin coated sand sintered bauxite and similar materials. The proppant can be suspended in the fluid.

Sarcosine (N-methylglycine) is a naturally occurring amino acid found in starfish, sea urchins and crustaceans. It can be purchased from a variety of commercial sources, or alternately produced by a number of synthetic routes known in the art including thermal decomposition of caffeine in the presence of barium hydroxide (Arch. Pharm. 232: 601, 1894); (Bull. Chem. Soc. Japan, 39: 2535, 1966); and numerous others (T. Shirai in Synthetic Production and Utilization of Amino Acids; T. Kaneko, et al., Eds.; Wiley, New York: pp. 184-186, 1974). Sodium sarcosinate is manufactured commercially from formaldehyde, sodium cyanide and methyl amine (U.S. Pat. Nos. 2,720,540 and 3,009,954). The preferred sarcosinate are the condensation products of sodium sarcosinate and a fatty acid chloride. The fatty acid chloride is reacted with sodium sarcosinate under carefully controlled alkaline conditions (i.e., the Schotten-Bauman reaction) to produce the fatty sarcosinate sodium salt which is water soluble. Upon acidification, the fatty sarcosine acid, which is also water insoluble, is formed and may be isolated from the reaction medium. The acyl sarcosines may be neutralized with bases such as the salts of sodium, potassium, ammonia, or organic bases such as triethanolamine in order to produce aqueous solutions.

Another surfactant useful in the fluids of this invention are an anionic sarcosinate surfactant available commercially from BJ Services Company as "M-Aquatrol" (MA). The MA-1 sarcosinate is a viscous liquid surfactant with at least 94% oleoyl sarcosine. For hydraulic fracturing, a sufficient quantity of the sarcosinate is present in aqueous solution to provide sufficient viscosity to suspend proppant during placement. The surfactant is preferably present at about 0.5% to about 10% by weight, most preferably at about 0.5% to about 6% by weight, based upon the weight of the total fluid.

Viscosifying Agents

The hydratable polymer may be a water soluble polysaccharide, such as galactomannan, cellulose, or derivatives thereof.

Suitable hydratable polymers that may be used in embodiments of the invention include any of the hydratable polysaccharides which are capable of forming a gel in the presence of a crosslinking agent. For instance, suitable hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Presently preferred gelling agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art.

The hydratable polymer may be present in the fluid in concentrations ranging from about 0.10% to about 5.0% by weight of the aqueous fluid. In certain embodiments, the range for the hydratable polymer is about 0.20% to about 0.80% by weight.

Viscosifying Agent Crosslinking Agents

The crosslinking agent may be a borate, titanate, or zirconium-containing compound. For example, the crosslinking agent can be sodium borate×$H_2O$ (varying waters of hydration), boric acid, borate crosslinkers (a mixture of a titanate constituent, preferably an organotitanate constituent, with a boron constituent. The organotitanate constituent can be TYZORR titanium chelate esters from E.I du Pont de Nemours & Company. The organotitanate constituent can be a mixture of a first organotitanate compound having a lactate base and a second organotitanate compound having triethanolamine base. The boron constituent can be selected from the group consisting of boric acid, sodium tetraborate, and mixtures thereof. These are described in U.S. Pat. No. 4,514,309, incorporated herein by reference, borate based ores such as ulexite and colemanite, Ti(IV) acetylacetonate, Ti(IV) triethanolamine, Zr lactate, Zr triethanolamine, Zr lactate-triethanolamine, or Zr lactate-triethanolamine-triisopropanolamine. In some embodiments, the well treatment fluid composition may further comprise a proppant.

A suitable crosslinking agent can be any compound that increases the viscosity of the fluid by chemical crosslinking, physical crosslinking, or any other mechanisms. For example, the gellation of a hydratable polymer can be achieved by crosslinking the polymer with metal ions including boron, zirconium, and titanium containing compounds, or mixtures thereof. One class of suitable crosslinking agents is organotitanates. Another class of suitable crosslinking agents is borates as described, for example, in U.S. Pat. No. 4,514,309, incorporated herein by reference. The selection of an appropriate crosslinking agent depends upon the type of treatment to be performed and the hydratable polymer to be used. The amount of the crosslinking agent used also depends upon the well conditions and the type of treatment to be effected, but is generally in the range of from about 10 ppm to about 1000 ppm of metal ion of the crosslinking agent in the hydratable polymer fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

In many instances, if not most, the viscosifying polymer is crosslinked with a suitable crosslinking agent. The crosslinked polymer has an even higher viscosity and is even more effective at carrying proppant into the fractured formation. The borate ion has been used extensively as a crosslinking agent, typically in high pH fluids, for guar, guar derivatives and other galactomannans. See, for example, U.S. Pat. No. 3,059,909, incorporated herein by reference and numerous other patents that describe this classic aqueous gel as a fracture fluid. Other crosslinking agents include, for example, titanium crosslinkers (U.S. Pat. No. 3,888,312, incorporated herein by reference), chromium, iron, aluminum, and zirconium (U.S. Pat. No. 3,301,723, incorporated herein by reference). Of these, the titanium and zirconium crosslinking agents are typically preferred. Examples of commonly used zirconium crosslinking agents include zirconium triethanolamine complexes, zirconium acetylacetonate, zirconium lactate, zirconium carbonate, and chelants of organic alphahydroxycorboxylic acid and zirconium. Examples of commonly used titanium crosslinking agents include titanium triethanolamine complexes, titanium acetylacetonate, titanium lactate, and chelants of organic alphahydroxycorboxylic acid and titanium.

Similarly, the crosslinking agent(s) may be selected from those organic and inorganic compounds well known to those skilled in the art useful for such purpose, and the phrase "crosslinking agent", as used herein, includes mixtures of such compounds. Exemplary organic crosslinking agents include, but are not limited to, aldehydes, dialdehydes, phenols, substituted phenols, ethers, and mixtures thereof. Phenol, resorcinol, catechol, phloroglucinol, gallic acid, pyrogallol, 4,4'-diphenol, 1,3-dihydroxynaphthalene, 1,4-benzoquinone, hydroquinone, quinhydrone, tannin, phenyl acetate, phenyl benzoate, 1-naphthyl acetate, 2-naphthyl acetate, phenyl chloracetate, hydroxyphenylalkanols, formaldehyde, paraformaldehyde, acetaldehyde, prop analdehyde, butyraldehyde, isobutyraldehyde, valeraldehyde, heptaldehyde, decanal, glyoxal, glutaraldehyde, terephthaldehyde, hexamethyl-enetetramine, trioxane, tetraoxane, polyoxymethylene, and divinylether may be used. Typical inorganic crosslinking agents are polyvalent metals, chelated polyvalent metals, and compounds capable of yielding polyvalent metals, including organometallic compounds as well as borates and boron complexes, and mixtures thereof. In certain embodiments, the inorganic crosslinking agents include chromium salts, complexes, or chelates, such as chromium nitrate, chromium citrate, chromium acetate, chromium propionate, chromium malonate, chromium lactate, etc.; aluminum salts, such as aluminum citrate, aluminates, and aluminum complexes and chelates; titanium salts, complexes, and chelates; zirconium salts, complexes or chelates, such as zirconium lactate; and boron containing compounds such as boric acid, borates, and boron complexes. Fluids containing additives such as those described in U.S. Pat. No. 4,683,068 and U.S. Pat. No. 5,082,579 may be used.

As indicated, mixtures of polymeric gel forming material or gellants may be used. Materials which may be used include water soluble crosslinkable polymers, copolymers, and terpolymers, such as polyvinyl polymers, polyacrylamides, cellulose ethers, polysaccharides, lignosulfonates, ammonium salts thereof, alkali metal salts thereof, alkaline earth salts of lignosulfonates, and mixtures thereof. Specific polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), ammonium and alkali metal salts thereof, and mixtures thereof. In certain embodiments, the water soluble crosslinkable polymers include hydroxypropyl guar, carboxymethylhydroxypropyl guar, partially hydrolyzed polyacrylamides, xanthan gum, polyvinyl alcohol, the ammonium and alkali metal salts thereof, and mixtures thereof.

The pH of an aqueous fluid which contains a hydratable polymer can be adjusted if necessary to render the fluid compatible with a crosslinking agent. In other embodiments, a pH adjusting material is added to the aqueous fluid after the addition of the polymer to the aqueous fluid. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., from about 5 to about 14. In other embodiments, the pH is kept neutral or basic, i.e., from about 7 to about 14. In other embodiments, the pH is between about 8 to about 12.

Breaking Agents

The breaking agent may be a metal-based oxidizing agent such as an alkaline earth metal or a transition metal. Exemplary breaking agents include, without limitation, magnesium peroxide, calcium peroxide, zinc peroxide, or mixtures and combinations thereof.

The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking" Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812, incorporated herein by reference. In some embodiments, an inorganic breaking agent is selected from alkaline earth metal or transition metal-based oxidizing agents, such as magnesium peroxides, zinc peroxides, and calcium peroxides.

In addition, enzymatic breakers may also be used in place of or in addition to a non-enzymatic breaker. Examples of suitable enzymatic breakers such as guar specific enzymes, alpha and beta amylases, amyloglucosidase, aligoglucosidase, invertase, maltase, cellulase, and hemi-cellulase are disclosed in U.S. Pat. Nos. 5,806,597 and 5,067,566, incorporated herein by reference.

A breaking agent or breaker may be used "as is" or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219, incorporated herein by reference.

Aggregating or Zeta Potential Altering Compositions

Amine-Phosphate Reaction Product Aggregating or Zeta Potential Altering Compositions Amines Suitable amines include, without limitation, any amine that is capable of reacting with a suitable phosphate ester to form a composition that forms a deformable coating on a metal-oxide-containing surface. Exemplary examples of such amines include, without limitation, any amine of the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Phosphate Compounds

Suitable phosphate compounds include, without limitation, any phosphate ester that is capable of reacting with a suitable amine to form a composition that forms a deformable coating on a metal-oxide containing surface or partially or completely coats particulate materials. Exemplary examples of such phosphate esters include, without limitation, any phosphate esters of the general formula $P(O)(OR^3)(OR^4)(OR^5)$, polymers thereof, or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, without limitation, phosphate ester of alkanols having the general formula $P(O)(OH)_x(OR^6)_y$, where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, without limitation, phosphate esters of alkanol amines having the general formula $N[R^7OP(O)(OH)_2]_3$ where $R^7$ is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the triphosphate ester of tri-ethanol amine or mixtures or combinations thereof. Other exemplary examples of phosphate esters include, without limitation, phosphate esters of hydroxylated aromatics such as phosphate esters of alkylated phenols such as Nonylphenyl phosphate ester or phenolic phosphate esters. Other exemplary examples of phosphate esters include, without limitation, phosphate esters of diols and polyols such as phosphate esters of ethylene glycol, propylene glycol, or higher glycolic structures. Other exemplary phosphate esters include any phosphate ester than can react with an amine and coated on to a substrate forms a deformable coating enhancing the aggregating potential of the substrate.

Polymeric Amine Zeta Potential Aggregating Compositions

Suitable amines capable of forming a deformable coating on a solid particles, surfaces, and/or materials include, without limitation, heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated monomers and diene monomers), or mixtures or combinations thereof, where the substituents of the substituted heterocyclic aromatic amines are carbyl groups having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. In certain embodiments, amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof. In certain embodiments, the poly vinyl heterocyclic amines include, without limitation, polymers and copolymers of vinyl pyridine, vinyl substituted pyridine, vinyl pyrrole, vinyl substituted pyrroles, vinyl piperidine, vinyl substituted piperidines, vinyl pyrrolidine, vinyl substituted pyrrolidines, vinyl indole, vinyl substituted indoles, vinyl imidazole, vinyl substituted imidazole, vinyl quinoline, vinyl substituted quinoline, vinyl isoquinoline, vinyl substituted isoquinoline, vinyl pyrazine, vinyl substituted pyrazine, vinyl quinoxaline, vinyl substituted quinoxaline, vinyl acridine, vinyl substituted acridine, vinyl pyrimidine, vinyl substituted pyrimidine, vinyl quinazoline, vinyl substituted quinazoline, or mixtures and combinations thereof. In certain embodiments, the heterocyclic aromatic amines comprise HAP™-310 available from Vertellus Specialties Inc.

Suitable alternate aggregating compositions comprise: (1) oligomeric amines (oligoamines) and/or polymeric amines (polyamines), (2) oligoamines and/or polyamines including an effective amount of quaternized amine groups, N-oxide groups, or mixtures of quaternized amine groups and N-oxide groups, or (3) mixtures and combinations thereof, where the effective is sufficient to render the compositions capable of forming partial, substantially complete, and/or complete coatings on the solid particles, surfaces and/or materials depending on the properties of the solid particles, surfaces and/or materials to be treated. The oligomeric and/or polymeric amines include repeat units of ethylenically unsaturated polymerizable monomers (vinyl and diene monomers) including an amine group, a heterocyclic amine group, an aromatic amine group, substituted analogs thereof, or mixtures and combinations thereof. The oligomeric and/or polymeric amines may also include repeat units of non-amine containing ethylenically unsaturated polymerizable monomers (vinyl and diene monomers). In certain embodiments, the aggregating compositions of this invention may also include reaction products of the aggregating compositions of this invention with a phosphate component. In certain embodiments, the aggregating compositions may also include reaction products of polyamines having 2 to 10 amino groups and phosphate compounds. In other embodiments, the aggregating compositions of this invention may also include ethoxylated alcohols and/or glymes. The aggregating compositions of this invention are believed to form complete, substantially complete, and/or partial coatings on the particles, surfaces, and/or materials altering self-aggregating properties, and/or aggregation propensities of the particles, surfaces, and/or materials. In certain embodiments, the oligomers and polymers may be of any form from homooligomers, homopolymers, random cooligomers, random copolymers, fully blocked cooligomers, fully blocked copolymers, partially blocked cooligomers, partially blocked copolymers, random, fully blocked, and/or partially blocked oligomers and polymers including three or more different type of monomeric repeat units, any other combination of two or more monomeric repeat units, or mixtures and combinations thereof to achieve desired properties so that the compositions forms partially or complete zeta altering coatings on specific formation surfaces, specific formation particles, and/or specific proppants. In other embodiments, the compositions include oligomers and/or polymers having differing amounts of non-amine containing monomeric repeat units, amine containing monomeric repeat units, quaternary amine containing monomeric repeat units, and N-oxide containing monomeric repeat units, where the amounts are adjusted so that the compositions are tailored to have specific properties to form coatings on specific solid materials, surfaces and/or substrates. The tailoring may also be based on different amounts of different oligomers and/or polymers in the formulation.

Amine Component and Amine-Phosphate Reaction Product Aggregating Compositions

Suitable amines for the amine component include, without limitation, an amine of the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence, where at least $R^1$ or $R^2$ is a nitrogen containing heterocycle, and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof. In certain embodiments, the amines of the amine components comprise alkyl pyridines.

Amine Polymeric Zeta Potential Aggregating Compositions

Suitable polymers for use in the compositions of this invention includes, without limitation, any polymer including repeat units derived from a heterocyclic or heterocyclic aromatic vinyl monomer, where the hetero atoms is a nitrogen atom or a combination of a nitrogen atom and another hetero atoms selected from the group consisting of boron, oxygen, phosphorus, sulfur, germanium, and/or. The polymers can be homopolymers of cyclic or aromatic nitrogen-containing vinyl monomers, or copolymers of any ethylenically unsaturated monomers that will copolymerize with a cyclic or aromatic nitrogen-containing vinyl monomer. Exemplary cyclic or aromatic nitrogen-containing vinyl monomers include, without limitation, vinyl pyrroles, substituted vinyl pyrroles, vinyl pyridines, substituted vinyl pyridines, vinyl quinolines or substituted vinyl quinolines, vinyl anilines or substituted vinyl anilines, vinyl piperidines or substituted vinyl piperidines, vinyl pirrolidines or substituted vinyl pyrrolidines, vinyl imidazole or substituted vinyl imidazole, vinyl pyrazine or substituted vinyl pyrazines, vinyl pyrimidine or substituted vinyl pyrimidine, vinyl quinazoline or substituted vinyl quinazoline, or mixtures or combinations thereof. Exemplary pyridine monomer include 2-vinyl pyridine, 4-vinyl pyridine, or mixtures or combinations thereof. Exemplary homopolymers include poly-2-vinyl pyridine, poly-4-vinyl pyridine, and mixtures or combinations thereof. Exemplary copolymers including copolymers or 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures of combinations thereof. All of these monomers can also includes substituents. Moreover, in all these vinyl monomers or ethylenically unsaturated monomers, one or more of the carbon atoms can be replaced by one or more hetero atoms selected from the group consisting of boron, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Of course, all of these monomers includes at least one nitrogen atom in the structure.

Examples of vinyl amine polymers covered in Weatherford U.S. Pat. No. 8,466,094.

From the claims: poly-2-vinyl pyridine, poly-4-vinyl pyridine, and mixtures or combinations thereof and copolymers selected from the group consisting of copolymers of 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures or combinations thereof and optionally a reaction product of an amine and a phosphate-containing compound.

Suitable polymers for use in the compositions of this invention includes, without limitation, any polymer including repeat units derived from a heterocyclic or heterocyclic aromatic vinyl monomer, where the hetero atoms is a nitrogen atom or a combination of a nitrogen atom and another hetero atoms selected from the group consisting of boron, oxygen, phosphorus, sulfur, germanium, and/or mixtures thereof. The polymers can be homopolymers of cyclic or aromatic nitrogen-containing vinyl monomers, or copolymers of any ethylenically unsaturated monomers that will copolymerize with a cyclic or aromatic nitrogen-containing vinyl monomer. Exemplary cyclic or aromatic nitrogen-containing vinyl monomers include, without limitation, vinyl pyrroles, substituted vinyl pyrroles, vinyl pyridines, substituted vinyl pyridines, vinyl quinolines or substituted vinyl quinolines, vinyl anilines or substituted vinyl anilines, vinyl piperidines or substituted vinyl piperidines, vinyl pyrrolidines or substituted vinyl pyrrolidines, vinyl imidazole or substituted vinyl imidazole, vinyl pyrazine or substituted vinyl pyrazines, vinyl pyrimidine or substituted vinyl pyrimidine, vinyl quinazoline or substituted vinyl quinazoline, or mixtures or combinations thereof.

For further details on the aggregating compositions used in this invention the reader is referred to U.S. Pat. Nos. 7,392,847; 7,956,017; 8,466,094; and 8,871,694; and United States Pub. Nos. 20100212905, and 20130075100.

Coacervates Aggregating Compositions

The surfactant which is oppositely charged from the polymer is sometimes called herein the "counterionic surfactant." By this we mean a surfactant having a charge opposite that of the polymer.

Suitable cationic polymers include polyamines, quaternary derivatives of cellulose ethers, quaternary derivatives of guar, homopolymers and copolymers of at least 20 mole percent dimethyl diallyl ammonium chloride (DMDAAC), homopolymers and copolymers of methacrylamidopropyl trimethyl ammonium chloride (MAPTAC), homopolymers and copolymers of acrylamidopropyl trimethyl ammonium chloride (APTAC), homopolymers and copolymers of methacryloyloxyethyl trimethyl ammonium chloride (METAC), homopolymers and copolymers of acryloyloxyethyl trimethyl ammonium chloride (AETAC), homopolymers and copolymers of methacryloyloxyethyl trimethyl ammonium methyl sulfate (METAMS), and quaternary derivatives of starch.

Suitable anionic polymers include homopolymers and copolymers of acrylic acid (AA), homopolymers and copolymers of methacrylic acid (MAA), homopolymers and copolymers of 2-acrylamido-2-methylpropane sulfonic acid (AMPSA), homopolymers and copolymers of N-methacrylamidopropyl N,N-dimethyl amino acetic acid, N-acrylamidopropyl N,N-dimethyl amino acetic acid, N-methacryloyloxyethyl N,N-dimethyl amino acetic acid, and N-acryloyloxyethyl N,N-dimethyl amino acetic acid.

Anionic surfactants suitable for use with the cationic polymers include alkyl, aryl or alkyl aryl sulfates, alkyl, aryl or alkyl aryl carboxylates or alkyl, aryl or alkyl aryl sulfonates. Preferably, the alkyl moieties have about 1 to about 18 carbons, the aryl moieties have about 6 to about 12 carbons, and the alkyl aryl moieties have about 7 to about 30 carbons. Exemplary groups would be propyl, butyl, hexyl, decyl, dodecyl, phenyl, benzyl and linear or branched alkyl benzene derivatives of the carboxylates, sulfates and sulfonates. Included are alkyl ether sulphates, alkaryl sulphonates, alkyl succinates, alkyl sulphosuccinates, N-alkoyl sarcosinates, alkyl phosphates, alkyl ether phosphates, alkyl ether carboxylates, alpha-olefin sulphonates and acyl methyl taurates, especially their sodium, magnesium ammonium and mono-, di- and triethanolamine salts. The alkyl and acyl groups generally contain from 8 to 18 carbon atoms and may be unsaturated. The alkyl ether sulphates, alkyl ether phosphates and alkyl ether carboxylates may contain from one to 10 ethylene oxide or propylene oxide units per molecule, and preferably contain 2 to 3 ethylene oxide units per molecule. Examples of suitable anionic surfactants include sodium lauryl sulphate, sodium lauryl ether sulphate, ammonium lauryl sulphosuccinate, ammonium lauryl sulphate, ammonium lauryl ether sulphate, sodium dodecylbenzene sulphonate, triethanolamine dodecylbenzene sulphonate, sodium cocoyl isethionate, sodium lauroyl isethionate, and sodium N-lauryl sarcosinate.

Cationic surfactants suitable for use with the anionic polymers include quaternary ammonium surfactants of the formula $X^-N^+R^1R^2R^3$ where $R^1$, $R^2$, and $R^3$ are independently selected from hydrogen, an aliphatic group of from about 1 to about 22 carbon atoms, or aromatic, aryl, an alkoxy, polyoxyalkylene, alkylamido, hydroxyalkyl, or alkylaryl group having from about 1 to about 22 carbon atoms; and X is an anion selected from halogen, acetate, phosphate, nitrate, sulfate, alkylsulfate radicals (e.g., methyl sulfate and ethyl sulfate), tosylate, lactate, citrate, and glycolate. The aliphatic groups may contain, in addition to carbon and hydrogen atoms, ether linkages, and other groups such as hydroxy or amino group substituents (e.g., the alkyl groups can contain polyethylene glycol and polypropylene glycol moieties). The longer chain aliphatic groups, e.g., those of about 12 carbons, or higher, can be saturated or unsaturated. More preferably, $R^1$ is an alkyl group having from about 12 to about 18 carbon atoms; $R^2$ is selected from H or an alkyl group having from about 1 to about 18 carbon atoms; $R^3$ and $R^4$ are independently selected from H or an alkyl group having from about 1 to about 3 carbon atoms; and X is as described above.

Suitable hydrophobic alcohols having 6-23 carbon atoms are linear or branched alkyl alcohols of the general formula $C_MH_{2M+2-N}(OH)_N$, where M is a number from 6-23, and N is 1 when M is 6-12, but where M is 13-23, N may be a number from 1 to 3. Our most preferred hydrophobic alcohol is lauryl alcohol, but any linear monohydroxy alcohol having 8-15 carbon atoms is also preferable to an alcohol with more or fewer carbon atoms.

By a gel promoter we mean a betaine, a sultaine or hydroxysultaine, or an amine oxide. Examples of betaines include the higher alkyl betaines such as coco dimethyl carboxymethyl betaine, lauryl dimethyl carboxymethyl betaine, lauryl dimethyl alphacarboxyethyl betaine, cetyl dimethyl carboxymethyl betaine, cetyl dimethyl betaine, lauryl bis-(2-hydroxyethyl)carboxymethyl betaine, oleyl dimethyl gamma-carboxypropyl betaine, lauryl bis-(2-hydroxypropyl)alpha-carboxyethyl betaine, coco dimethyl sulfopropyl betaine, lauryl dimethyl sulfoethyl betaine, lauryl bis-(2-hydroxyethyl)sulfopropyl betaine, amidobetaines and amidosulfobetaines (wherein the $RCONH(CH_2)_3$ radical is attached to the nitrogen atom of the betaine, oleyl betaine, and cocamidopropyl betaine. Examples of sultaines and hydroxysultaines include materials such as cocamidopropyl hydroxysultaine.

By a Zeta potential having an absolute value of at least 20 we mean a Zeta potential having a value of +20 of higher or −20 or lower.

Amphoteric surfactants suitable for use with either cationic polymers or anionic polymers include those surfactants broadly described as derivatives of aliphatic secondary and tertiary amines in which the aliphatic radical can be straight or branched chain and wherein one of the aliphatic substituents contains from about 8 to about 18 carbon atoms and one contains an anionic water solubilizing group such as carboxy, sulfonate, sulfate, phosphate, or phosphonate. Suitable amphoteric surfactants include derivatives of aliphatic secondary and tertiary amines in which the aliphatic radical can be straight or branched chain and wherein one of the aliphatic aliphatic substituents contains from about 8 to about 18 carbon atoms and one contains an anionic water solubilizing group, e.g., carboxy, sulfonate, sulfate, phosphate, or phosphonate. Examples of compounds falling within this definition are sodium 3-dodecylaminopropionate, and sodium 3-dodecylaminopropane sulfonate.

Suitable amine oxides include cocoamidopropyl dimethyl amine oxide and other compounds of the formula $R^1R^2R^3N \rightarrow O$ wherein $R^3$ is a hydrocarbyl or substituted hydrocarbyl having from about 8 to about 30 carbon atoms, and $R^1$ and $R^2$ are independently hydrogen, a hydrocarbyl or substituted hydrocarbyl having up to 30 carbon atoms. Preferably, $R^3$ is an aliphatic or substituted aliphatic hydrocarbyl having at least about 12 and up to about 24 carbon atoms. More preferably $R^3$ is an aliphatic group having at least about 12 carbon atoms and having up to about 22, and most preferably an aliphatic group having at least about 18 and no more than about 22 carbon atoms.

Suitable phosphorus-containing compounds suitable for use in the invention include, without limitation, phosphates or phosphate equivalents or mixtures or combinations thereof. Suitable phosphates include, without limitation, mono-alkali metal phosphates (PO(OH)(OM)), where M is Li, Na, K, Rd, or Cs), di-alkali metal phosphates (PO(OH)(OM)$_2$, where each M is the same or different and is Li, Na, K, Rd, or Cs) such as dipotassium phosphate (PO(OH)(OK)$_2$) and disodium phosphate, (PO(OH)(ONa)$_2$), tri-alkali metal phosphates (PO(OM)$_3$, where each M is the same or different and is Li, Na, K, Rd, or Cs) such as trisodium phosphate (PO(ONa)$_3$) and tripotassium phosphate (PO(OK)$_3$), carbyl phosphates (PO(OR$^1$)(OM)$_2$, where $R^1$ is a carbyl group and M is H, Li, Na, K, Rd, and/or Cs), dicarbyl phosphates (PO(OR$^1$)(OR$^2$)(OM), where $R^1$ and $R^2$ are the same or different carbyl groups and M is H, Li, Na, K, Rd, or Cs), tricarbyl phosphates (PO(OR$^1$)(OR$^2$)(OR$^3$), where $R^1$, $R^2$, and $R^3$ are the same or different carbyl groups), or mixtures or combinations thereof.

Suitable carbyl group include, without limitations, carbyl group having between about 3 and 40 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. The carbyl group can be an alkyl group, an alkenyl group, an aryl group, an alkaaryl group, an aryalkyl group, or mixtures or combinations thereof, i.e., each carbyl group in the phosphate can be the same or different. In certain embodiments, the carbyl group has between about 3 and about 20, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the carbyl group has between about 3 and about 16, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the carbyl group has between about 3 and about 12, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the carbyl group has between about 4 and about 8, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group.

Suitable tri-alkyl phosphates include, without limitations, alkyl group having from about 3 to about 20 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the tri-alkyl phosphate includes alkyl groups having from about 4 to about 12 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In other embodiments, the tri-alkyl phosphate includes alkyl groups having from about 4 to about 8 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. Such phosphates can be produced by reacting a phosphate donor such as phosphorus pentoxide and a mixture of alcohols in desired proportions.

Solid Materials and Proppants

Suitable solid materials and/or proppants capable of being pre-treated or treated with the aggregating compositions of this invention include, without limitation, metal oxides and/or ceramics, natural or synthetic, metals, plastics and/or other polymeric solids, solid materials derived from plants, any other solid material that does or may find use in downhole applications, treated analogs thereof, where solid materials and/or proppants are treated with the aggregating compositions of this invention, or mixtures or combinations thereof. Metal oxides including any solid oxide of a metallic element of the periodic table of elements. Exemplary examples of metal oxides and ceramics include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides. Exemplary examples of plant materials include, without limitation, shells of seed bearing plants such as walnut shells, pecan shells, peanut shells, shells for other hard shelled seed forming plants, ground wood or other fibrous cellulosic materials, or mixtures or combinations thereof.

Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired.

Sand, resin-coated sand, and ceramic particles are the most commonly used proppants, though the literature, for instance U.S. Pat. No. 4,654,266, incorporated herein by reference, also mentions the used of walnut hull fragments coated with some bonding additives, metallic shots, or metal-coated beads—nearly spherical but having a passageways to improve their conductibility.

The proppant conductivity is affected principally by two parameters, the proppant pack width and the proppant pack permeability. To improve fracture proppant conductivity, typical approaches include high large diameter proppants. More generally, the most common approaches to improve proppant fracture performance include high strength proppants, large diameter proppants, high proppant concentrations in the proppant pack to obtain wider propped fractures, conductivity enhancing materials such as breakers, flowback aides, fibers and other material that physically alter proppant packing, and use of non-damaging fracturing fluids such as gelled oils, viscoelastic surfactant based fluids, foamed fluids or emulsified fluids. It is also recognized that grain size, grain-size distribution, quantity of fines and impurities, roundness and sphericity and proppant density have an impact on fracture conductivity.

As mentioned above, the main function of the proppant is to keep the fracture open by overcoming the in-situ stress. Where the proppant strength is not high enough, the closure stress crushes the proppant, creating fines and reducing the conductivity. Sand is typically suitable for closure stresses of less than about 6000 psi (41 MPa), resin-coated sand may be used up to about 8000 psi (55 MPa). Intermediate-strength proppant typically consists of fused ceramic or sintered-bauxite and is used for closure stresses ranging between 5000 psi and 10000 psi (34 MPa to 69 MPa). High-strength proppant, consisting of sintered-bauxite with large amounts of corundum is used at closure stresses of up to about 14000 psi (96 MPa).

Permeability of a propped fracture increases as the square of the grain diameter. However, larger grains are often more susceptible to crush, have more placement problems and tend to be more easily invaded by fines. As the result, the average conductivity over the life of a well may be actually higher with smaller proppants.

It should be recognized that the proppant itself is may be of any shape including irregular shapes, essentially spherical shapes, elongated shapes, etc. Adding fibers or fiber-like products to the fluids may contribute to a reduction of the proppant flowback and consequently to a better packing of the proppant islands in the fracture, as the fibers will adhere to the islands because the islands include an amount of proppants coated with an aggregating composition of this invention or treated with an aggregating composition and a coating crosslinking composition. Additionally, the fibers may prevent or reduce fine migrations and consequently, prevent or reduce a reduction of the proppant conductivity by forming new types of proppant islands that will lead to higher formation conductivity.

Fibers and Organic Particulate Materials

Non-Erodible Fibers

Suitable non soluble or non erodible fibers include, without limitation, natural fibers, synthetic fibers, or mixtures and combinations thereof. Exemplary examples of natural fibers include, without limitation, abaca, cellulose, wool such as alpaca wool, cashmere wool, mohair, or angora wool, camel hair, coir, cotton, flax, hemp, jute, ramie, silk, sisal, byssus fibers, chiengora fibers, muskox wool, yak wool, rabbit hair, kapok, kenaf, raffia, bamboo, Piiia, asbestos fibers, glass fibers, cellulose fibers, wood pulp fibers, treated analogs thereof, or mixtures and combinations thereof. Exemplary examples of synthetic fibers include, without limitation, regenerated cellulose fibers, cellulose acetate fibers, polyester fibers, aramid fibers, acrylic fibers, fibre optic fibers, polyamide and polyester fibers, polyethylene fibers, polypropylene fibers, acrylic fibers, aramid fibers, silk fibers, azlon fibers, BAN-LON® fibers (registered trademark of Joseph Bancroft & Sons Company), basalt fiber, carbon fiber, CELLIANT® fiber (registered trademark of Hologenix, LLC), cellulose acetate fiber, cellulose triacetate fibers, CORDURA® fibers (registered trademark of INVISTA, a subsidiary of privately owned Koch Industries, Inc.), crimplene (a polyester) fibers, cuben fibers, cuprammonium rayon fibers, dynel fibers, elasterell fibers, elastolefin fibers, glass fibers, GOLD FLEX® fibers (registered trademark of Honeywell), INNEGRA S™ fibers (brandname of Innegra Technologies LLC), aramid fibers such as KEVLAR® fibers (registered trademark of DuPont), KEVLAR® KM2 fibers (registered trademark of DuPont), LASTOL® fibers (registered trademark of DOW Chemicals Company), Lyocell fibers, M5 fibers, modacrylic fibers, Modal fibers, NOMEX® fibers (registered trademark of DuPont), nylon fibers such as nylon 4 fibers, nylon 6 fibers, nylon 6-6 fibers, polyolefin fibers, poly(p-phenylene sulfide) fibers, polyacrylonitrile fibers, polybenzimidazole fibers, polydioxanone fibers, polyester fibers, qiana fibers, rayon fibers, polyvinylidene chloride fibers such as Saran fibers, of poly(trimethylene terephthalate) fibers such as Sorona fibers, spandex or elastane fibers, Taklon fibers, Technora fibers, THINSULATE® fibers (registered trademark of 3M), Twaron™ fibers (brandname of Teijin Aramid), ultra-high-molecular-weight polyethylene fibers, syndiotactic polypropylene fibers, isotactic polypropylene fibers, polyvinylalcohol fibers, cellulose xanthate fibers, poly(p-phenylene-2,6-benzobisoxazole) fibers, polyimide fibers, other synthetic fibers, or mixtures and combinations thereof. These fibers can additionally or alternatively form a three-dimensional network, reinforcing the proppant and limiting its flowback.

Non-Erodible Particles

Suitable solid organic polymeric particulate materials include, without limitation, polymeric particulate matter derived from cellulose, acrylic acid, aramides, acrylonitrile, polyamides, vinylidene, olefins, diolefins, polyester, polyurethane, vinyl alcohol, and vinyl chloride, may be used. Preferred compositions, assuming the required reactivity and/or decomposition characteristics may be selected from rayon, acetate, triacetate, cotton, wool (cellulose group); nylon, acrylic, modacrylic, nitrile, polyester, saran, spandex, vinyon, olefin, vinyl, (synthetic polymer group); azlon, rubber (protein and rubber group), and mixtures thereof. Polyester and polyamide particles of sufficient molecular weight, such as from Dacron® and nylon, respectively, and mixtures thereof, are most preferred. Again, composite particles, comprising natural and/or synthetic materials of appropriate characteristics, may be employed. For example, a suitable composite particle might comprise a core and sheath structure where the sheath material and the core material degrade over different desired periods of time. The compounds or compositions employed as organic polymeric material according to the invention need not be pure, and commercially available materials containing various additives, fillers, etc. or having coatings may be used, so long as such components do not interfere with the required activity. The organic polymeric particulate material level, i.e., concentration, provided initially in the fluid may range from 0.02 percent up to about 10 percent by weight of the fluid. Most preferably, however, the concentration ranges from about 0.02 percent to about 5.0 percent by weight of fluid.

Particle size and shape, while important, may be varied considerably, depending on timing and transport considerations. In certain embodiments, if irregular or spherical particles of the organic polymer are used, particle size may range from 80 mesh to 2.5 mesh (Tyler), preferably from 60 mesh to 3 mesh. Fibers and/or platelets of the specified polymeric materials are preferred for their mobility and transfer aiding capability. In the case of fibers of the organic polymer, the fibers employed according to the invention may also have a wide range of dimensions and properties. As employed herein, the term "fibers" refers to bodies or masses, such as filaments, of natural or synthetic material(s) having one dimension significantly longer than the other two, which are at least similar in size, and further includes mixtures of such materials having multiple sizes and types. In other embodiments, individual fiber lengths may range upwardly from about 1 millimeter. Practical limitations of handling, mixing, and pumping equipment in wellbore applications, currently limit the practical use length of the fibers to about 100 millimeters. Accordingly, in other embodiments, a range of fiber length will be from about 1 mm to about 100 mm or so. In yet other embodiments, the length will be from at least about 2 mm up to about 30 mm. Similarly, fiber diameters will preferably range upwardly from about 5 microns. In other embodiments, the diameters will range from about 5 microns to about 40 microns. In other embodiments, the diameters will range from about 8 microns to about 20 microns, depending on the modulus of the fiber, as described more fully hereinafter. A ratio of length to diameter (assuming the cross section of the fiber to be circular) in excess of 50 is preferred. However, the fibers may have a variety of shapes ranging from simple round or oval cross-sectional areas to more complex shapes such as trilobe, figure eight, star-shape, rectangular cross-sectional, or the like. Preferably, generally straight fibers with round or oval cross sections will be used. Curved, crimped, branched, spiral-shaped, hollow, fibrillated, and other three dimensional fiber geometries may be used. Again, the fibers may be hooked on one or both ends. Fiber and platelet densities are not critical, and will preferably range from below 1 to 4 g/cm$^3$ or more.

Those skilled in the art will recognize that a dividing line between what constitute "platelets", on one hand, and "fibers", on the other, tends to be arbitrary, with platelets being distinguished practically from fibers by having two dimensions of comparable size both of which are significantly larger than the third dimension, fibers, as indicated, generally having one dimension significantly larger than the other two, which are similar in size. As used herein, the terms "platelet" or "platelets" are employed in their ordinary sense, suggesting flatness or extension in two particular dimensions, rather than in one dimension, and also is understood to include mixtures of both differing types and sizes. In general, shavings, discs, wafers, films, and strips of the polymeric material(s) may be used. Conventionally, the term "aspect ratio" is understood to be the ratio of one dimension, especially a dimension of a surface, to another dimension. As used herein, the phrase is taken to indicate the ratio of the diameter of the surface area of the largest side of a segment of material, treating or assuming such segment surface area to be circular, to the thickness of the material (on average). Accordingly, the platelets utilized in the invention will possess an average aspect ratio of from about 10 to about 10,000. In certain embodiments the average aspect ration is from 100 to 1000. In other embodiments, the platelets will be larger than 5 microns in the shortest dimension, the dimensions of a platelet which may be used in the invention being, for example, 6 mm×2 mm×15 μm.

In a particularly advantageous aspect of the invention, particle size of the organic polymeric particulate matter may be managed or adjusted to advance or retard the reaction or degradation of the gelled suspension in the fracture. Thus, for example, of the total particulate matter content, 20 percent may comprise larger particles, e.g., greater than 100 microns, and 80 percent smaller, say 80 percent smaller than 20 micron particles. Such blending in the gelled suspension may provide, because of surface area considerations, a different time of completion of reaction or decomposition of the particulate matter, and hence the time of completion of gel decomposition or breaking, when compared with that provided by a different particle size distribution.

The solid particulate matter, e.g., fibers, or fibers and/or platelet, containing fluid suspensions used in the invention may be prepared in any suitable manner or in any sequence or order. Thus, the suspension may be provided by blending in any order at the surface, and by addition, in suitable proportions, of the components to the fluid or slurry during treatment on the fly. The suspensions may also be blended offsite. In the case of some materials, which are not readily dispersible, the fibers should be "wetted" with a suitable fluid, such as water or a wellbore fluid, before or during mixing with the fracturing fluid, to allow better feeding of the fibers. Good mixing techniques should be employed to avoid "clumping" of the particulate matter.

Erodible Particles and Fibers

Suitable dissolvable, degradable, or erodible proppants include, without limitation, water-soluble solids, hydrocarbon-soluble solids, or mixtures and combinations thereof. Exemplary examples of water-soluble solids and hydrocarbon-soluble solids include, without limitation, salt, calcium carbonate, wax, soluble resins, polymers, or mixtures and combinations thereof. Exemplary salts include, without limitation, calcium carbonate, benzoic acid, naphthalene based materials, magnesium oxide, sodium bicarbonate, sodium chloride, potassium chloride, calcium chloride, ammonium sulfate, or mixtures and combinations thereof. Exemplary polymers include, without limitation, polylactic acid (PLA), polyglycolic acid (PGA), lactic acid/glycolic acid copolymer (PLGA), polysaccharides, starches, or mixtures and combinations thereof.

As used herein, "polymers" includes both homopolymers and copolymers of the indicated monomer with one or more comonomers, including graft, block and random copolymers. The polymers may be linear, branched, star, cross-linked, derivatized, and so on, as desired. The dissolvable or erodible proppants may be selected to have a size and shape similar or dissimilar to the size and shape of the proppant particles as needed to facilitate segregation from the proppant. Dissolvable, degradable, or erodible proppant particle shapes can include, for example, spheres, rods, platelets, ribbons, and the like and combinations thereof. In some applications, bundles of dissolvable, degradable, or erodible fibers, or fibrous or deformable materials, may be used.

The dissolvable, degradable, or erodible proppants may be capable of decomposing in the water-based fracturing fluid or in the downhole fluid, such as fibers made of polylactic acid (PLA), polyglycolic acid (PGA), polyvinyl alcohol (PVOH), and others. The dissolvable, degradable, or erodible fibers may be made of or coated by a material that becomes adhesive at subterranean formation temperatures. The dissolvable, degradable, or erodible fibers used in one embodiment may be up to 2 mm long with a diameter of 10-200 microns, in accordance with the main condition that the ratio between any two of the three dimensions be greater than 5 to 1. In another embodiment, the dissolvable, degradable, or erodible fibers may have a length greater than 1 mm, such as, for example, 1-30 mm, 2-25 mm or 3-18 mm, e.g., about 6 mm; and they can have a diameter of 5-100 microns and/or a denier of about 0.1-20, preferably about 0.15-6. These dissolvable, degradable, or erodible fibers are desired to facilitate proppant carrying capability of the treatment fluid with reduced levels of fluid viscosifying polymers or surfactants. Dissolvable, degradable, or erodible fiber cross-sections need not be circular and fibers need not be straight. If fibrillated dissolvable, degradable, or erodible fibers are used, the diameters of the individual fibrils maybe much smaller than the aforementioned fiber diameters.

Other Fracturing Fluid Components

The fracturing fluid may also include ester compound such as esters of polycarboxylic acids. For example, the ester compound may be an ester of oxalate, citrate, or ethylene diamine tetraacetate. The ester compound having hydroxyl groups can also be acetylated. An example of this is that citric acid can be acetylated to form acetyl triethyl citrate. A presently preferred ester is acetyl triethyl citrate.

Gases

Suitable gases for foaming the foamable, ionically coupled gel composition include, without limitation, nitrogen, carbon dioxide, or any other gas suitable for use in formation fracturing, or mixtures or combinations thereof.

Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkyl-substituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: C1 to C8 monocarboxylic acids such as formic acid, acetic acid, propanoic acid, butanoic acid, pentanoic acid, hexanoic acid, heptanoic acid, octanoic acid, 2-ethylhexanoic acid, or the like; C2 to C12 dicarboxylic acids, C2 to C12 unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Fracturing Fluid Additives

The fracturing fluids of this invention may also include other additives such as pH modifiers, scale inhibitors, carbon dioxide control additives, paraffin control additives, oxygen control additives, salt inhibitors, or other additives.

pH Modifiers

Suitable pH modifiers for use in this invention include, without limitation, alkali hydroxides, alkali carbonates, alkali bicarbonates, alkaline earth metal hydroxides, alkaline earth metal carbonates, alkaline earth metal bicarbonates, rare earth metal carbonates, rare earth metal bicarbonates, rare earth metal hydroxides, amines, hydroxylamines ($NH_2OH$), alkylated hydroxyl amines ($NH_2OR$, where R is a carbyl group having from 1 to about 30 carbon atoms or heteroatoms—O or N), and mixtures or combinations thereof. Preferred pH modifiers include NaOH, KOH, $Ca(OH)_2$, CaO, $Na_2CO_3$, $KHCO_3$, $K_2CO_3$, $NaHCO_3$, MgO, $Mg(OH)_2$ and mixtures or combinations thereof. Preferred amines include triethylamine, triproplyamine, other trialkylamines, bis hydroxyl ethyl ethylenediamine (DGA), bis hydroxyethyl diamine 1-2 dimethylcyclohexane, or the like or mixtures or combinations thereof.

Scale Control

Suitable additives for Scale Control and useful in the compositions of this invention include, without limitation: Chelating agents, e.g., $Na^+$, $K^+$ or $NH_4^+$ salts of EDTA; Na, K or $NH_4^+$ salts of NTA; $Na^+$, $K^+$ or $NH_4^+$ salts of Erythorbic acid; $Na^+$, $K^+$ or $NH_4^+$ salts of thioglycolic acid (TGA); $Na^+$, $K^+$ or $NH_4^+$ salts of Hydroxy acetic acid; $Na^+$, $K^+$ or $NH_4^+$ salts of Citric acid; $Na^+$, $K^+$ or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaerythritol, neopentyl glycol or the like; Tris & Tetra hydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or $C_{10}$ to $C_{24}$ amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus Nitrilotriacetamide available from Clearwater International, LLC of Houston, Tex.

DETAILED DESCRIPTION OF THE DRAWINGS

Referring now to FIG. 1A, an embodiment of a fracturing pulse or slug sequence, generally 100, is shown to include a pad stage 102 having a pad duration $t_{pad}$, a proppant placement stage 104 having a proppant placement duration $t_{pp}$, and a tail-in stage 106 having a tail-in duration $t_t$. The proppant placement stage 104 includes four sub-stages 108, 110, 112, and 114, each sub-stage 108, 110, 112, and 114 include two proppant-free fluid pulses 108a&b, 110a&b, 112a&b, and 114a&b and two proppant-containing fluid pulses 108c&d, 110c&d, 112c&d, and 114c&d. Each sub-stage 108, 110, 112, and 114 is described by a pulse cycle duration $t_{pcycle}$. The pulse cycle duration $t_{pcycle}$ includes a proppant-containing fluid pulse duration $t_{pcp}$ and a proppant-free fluid pulse duration $t_{pfp}$, where the durations $t_{pcycle}$, $t_{pcp}$, and $t_{pfp}$ may be the same or different for each sub-stage 108, 110, 112, and 114 and the durations $t_{pcp}$ and $t_{pfp}$ in each cycle may be the same or different.

Figure 1B:
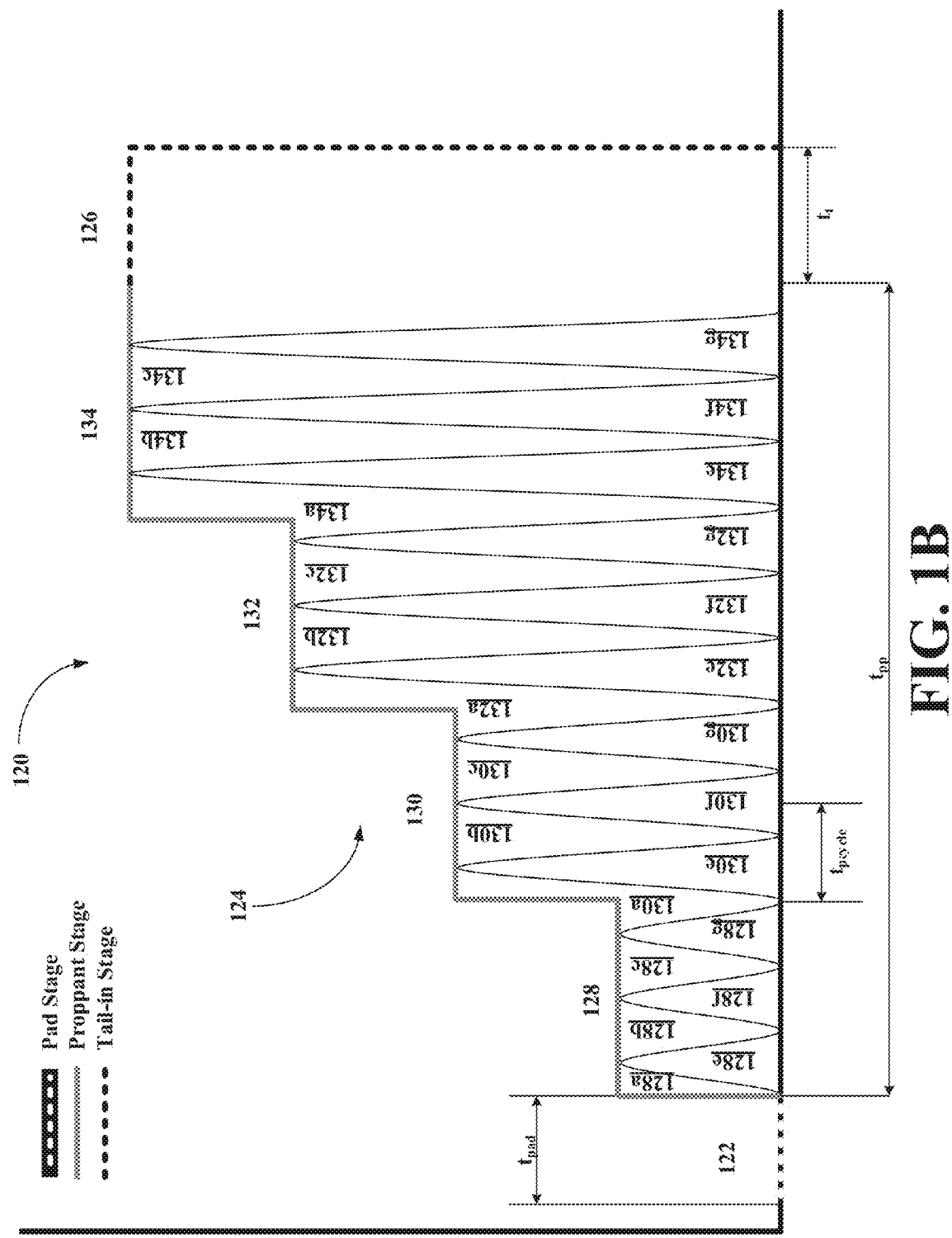
FIG. 1B depicts another embodiment of a fracturing profile of this invention.

Referring now to FIG. 1B, another embodiment of a fracturing pulse or slug sequence, generally 120, is shown to include a pad stage 122 having a pad duration $t_{pad}$, a proppant placement stage 124 having a proppant placement duration $t_{pp}$, and a tail-in stage 126 having a tail-in duration $t_t$. The proppant placement stage 124 includes four sub-stages 128, 130, 132, and 134, each sub-stage 128, 130, 132, and 134 include a plurality of sinusoidal proppant-free fluid pulses 128a-c, 130a-c, 132a-c, and 134a-c and a plurality of sinusoidal proppant-containing fluid pulses 128e-g, 130e-g, 132e-g, and 134e-g. Each sub-stage 128, 130, 132, and 134 is described by a sinusoidal pulse cycle duration $t_{pcycle}$. The pulse cycle durations $t_{pcycle}$ may be the same or different for each sub-stage 128, 130, 132, and 134 and durations of the sinusoidal proppant-containing phases and durations of the sinusoidal proppant-free phases in each cycle may be the same or different.

Figure 1C:
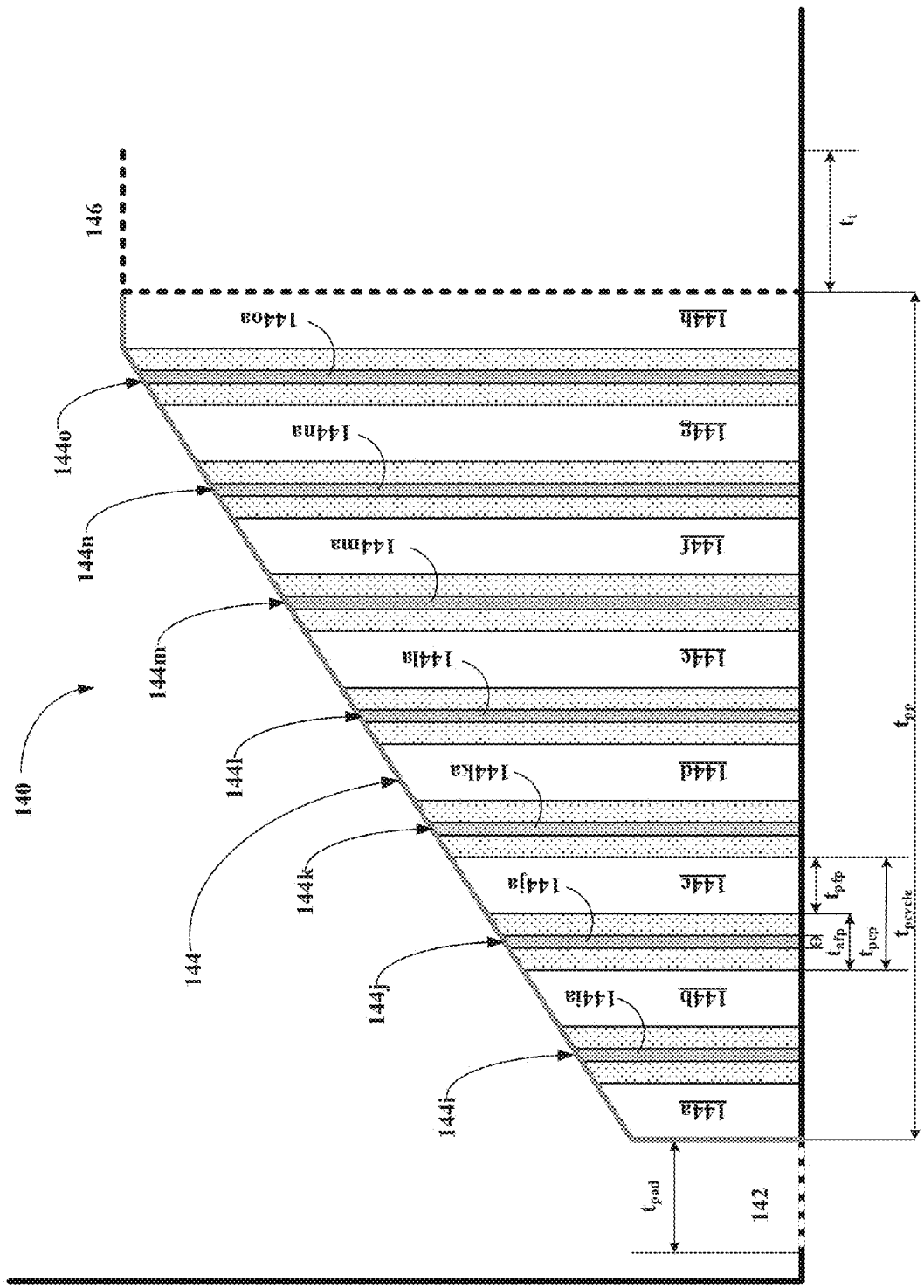
FIG. 1C depicts another embodiment of a fracturing profile of this invention.

Referring now to FIG. 1C, another embodiment of a fracturing pulse or slug sequence, generally 140, is shown to include a pad stage 142 having a pad duration $t_{pad}$, a proppant placement stage 144 having a proppant placement duration $t_{pp}$, and a tail-in stage 146 having a tail-in duration $t_t$. The proppant placement stage 144 is shown here as a continuous increasing volume ramp. The ramp 144 includes a plurality of proppant-free fluid pulses 144a-h and a plurality of proppant-containing fluid pulses 104i-o. Each of the proppant-containing fluid pulses 104i-o comprises an aggregating composition or an aggregating composition and a coating crosslinking composition pulse, which may be centered in the proppant-containing fluid pulses 104i-o sub-stage 108, 110, 112, and 114 is described by a pulse cycle duration $t_{pcycle}$. The pulse cycle duration $t_{pcycle}$ includes a proppant-containing fluid pulse duration $t_{pcp}$ and a proppant-free fluid pulse duration $t_{pfp}$, where the durations $t_{pcycle}$, $t_{pcp}$, and $t_{pfp}$ may be the same or different for each sub-stage 108, 110, 112, and 114 and the durations $t_{pcp}$ and $t_{pfp}$ in each cycle may be the same or different.

Referring now to FIG. 1D, another embodiment of a fracturing pulse or slug sequence, generally 160, is shown to include a pad stage 162 having a pad duration $t_{pad}$, a proppant placement stage 164 having a proppant placement duration $t_{pp}$, and a tail-in stage 166 having a tail-in duration $t_t$. The proppant placement stage 164 is shown here as a continuous increasing volume ramp. The ramp 164 includes a continuous increasing proppant-containing fluid injection 164a and a plurality of an aggregating composition or an aggregating composition and a coating crosslinking composition pulses 164b-h. Each of the pulses 164b-h may be of the same or different duration.

Figure 2A:
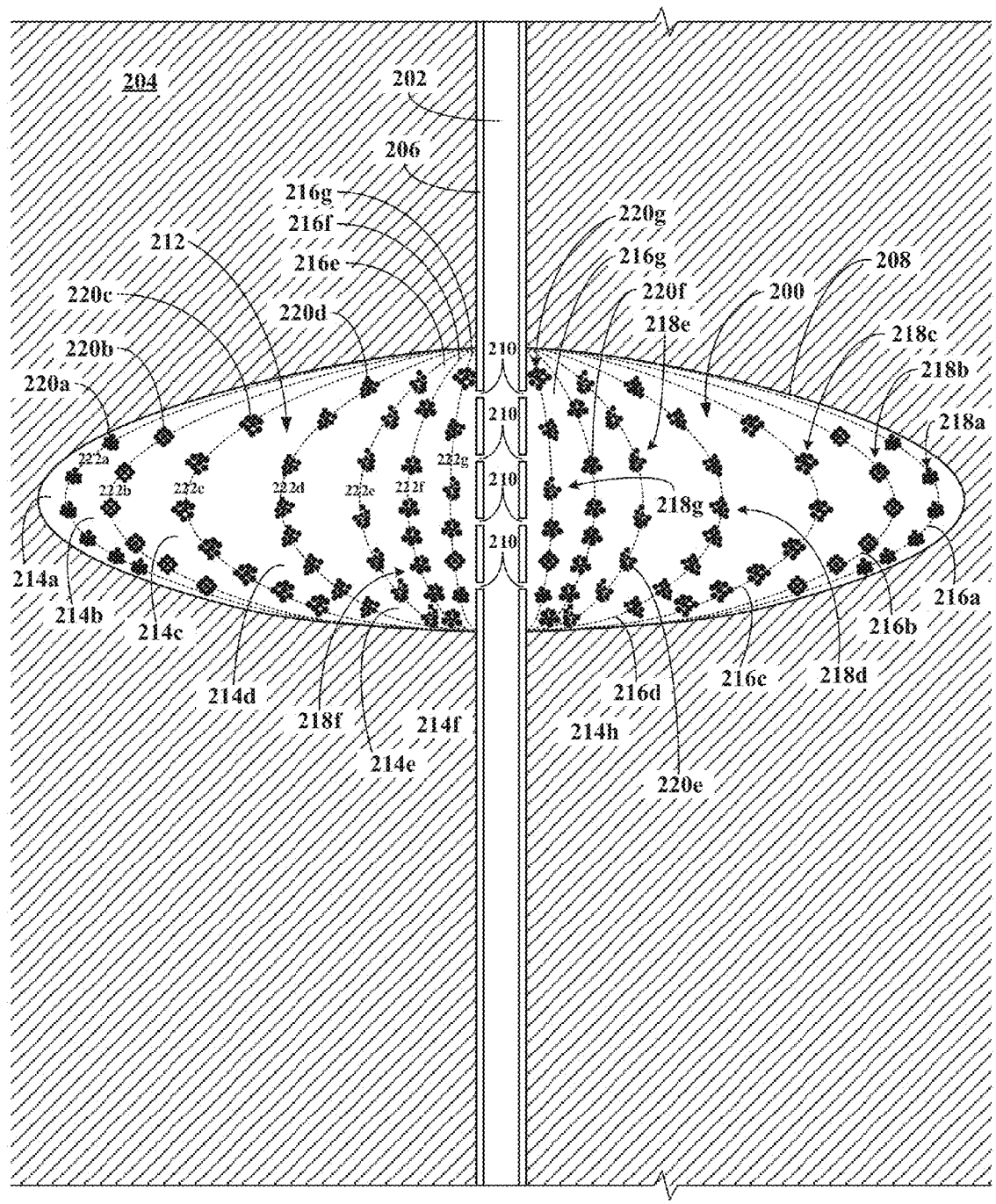
FIG. 2A depicts an embodiment a proppant pattern or network within a board fracture.

Referring now to FIG. 2A, an embodiment of a proppant pattern established in a formation penetrated by a well bore by a proppant placement stage, generally 200, is shown to include a well bore 202 penetrating a formation 204. The well bore 202 includes a cemented or uncemented casing string 206 and a broad fracture 208 formed in the formation 204 through a plurality of perforations 210 in the string 206 by a viscosified pad fluid injected into the formation 204 at a sufficient pressure to form the fracture 208. The fracture 208 includes a proppant pattern 212 formed by the proppant placement stage 200 including a plurality of proppant-free fluid pulses 214a-h and an alternating plurality of proppant-containing fluid pulses 216a-g. The proppant pattern 212 comprises a set of proppant networks 218a-g including proppant pillars 220a-g and flow pathways 222a-g. The proppant-containing fluid pulses 216a-g have the same or different proppant compositions (shown here as different) giving rise to the same or different proppant pillars 218a-g (shown here as different), where the proppant-containing fluid pulse proppant compositions differ in at least one proppant composition property including proppant type, proppant size, proppant shape, and concentrations of each proppant type, size, shape, or mixtures thereof and mixtures or combinations thereof.

Figure 2B:
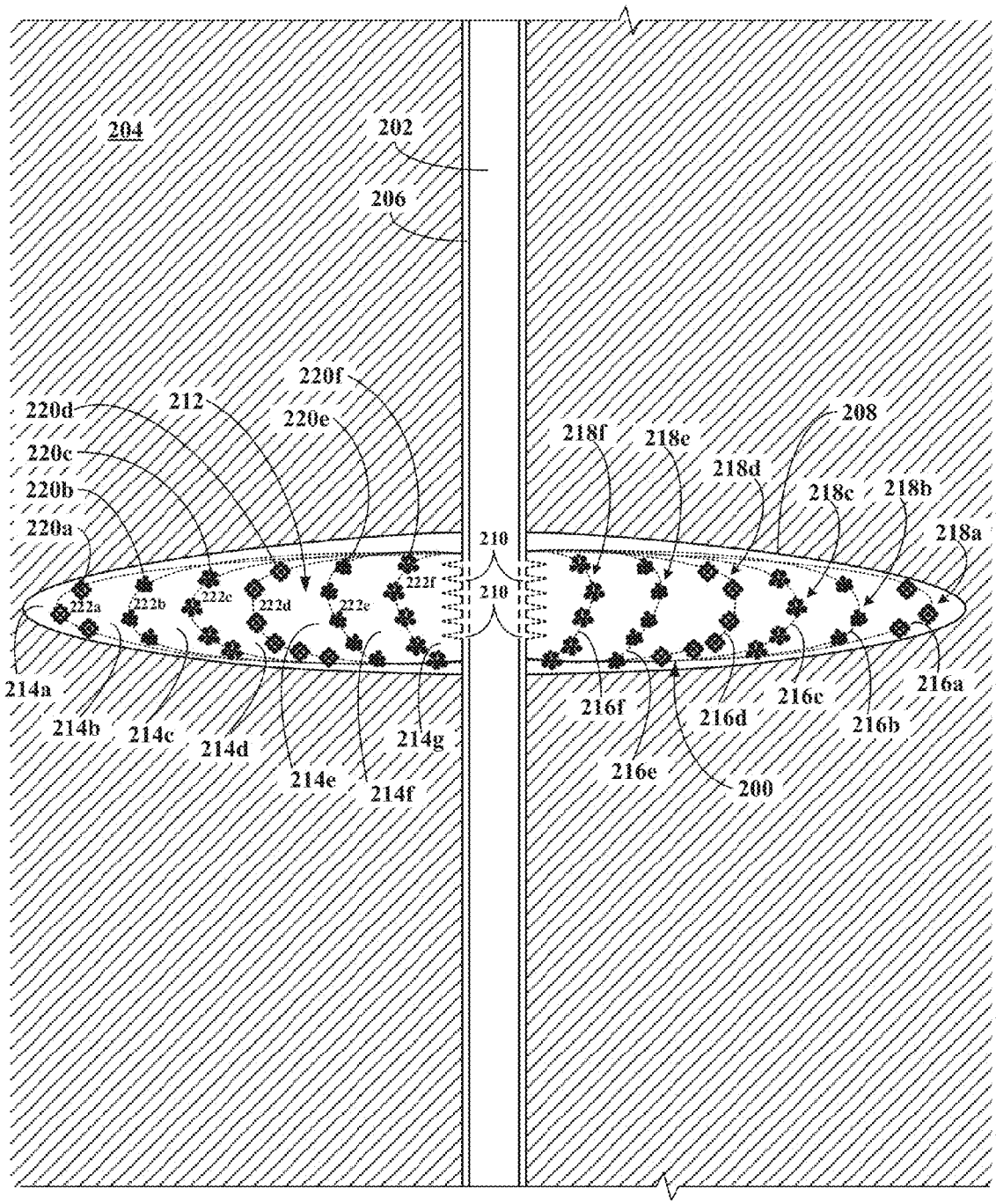
FIG. 2B depicts an embodiment a proppant pattern or network within a narrow fracture.

Referring now to FIG. 2B, an embodiment of a proppant pattern established in a formation penetrated by a well bore by a proppant placement stage, generally 200, is shown to include a well bore 202 penetrating a formation 204. The well bore 202 includes a cemented or uncemented casing string 206 and a narrow fracture 208 formed in the formation 204 through a plurality of perforations 210 in the string 206 by a viscosified pad fluid injected into the formation 204 at a sufficient pressure to form the fracture 208. The fracture 208 includes a proppant pattern 212 formed by the proppant placement stage 200 including a plurality of proppant-free fluid pulses 214a-g and an alternating plurality of proppant-containing fluid pulses 216a-f. The proppant pattern 212 comprises a set of proppant networks 218a-f including proppant pillars 220a-f and flow pathways 222a-f. The proppant-containing fluid pulses 216a-f have the same or different proppant compositions (shown here as different) giving rise to the same or different proppant pillars 220a-f (shown here as different), where the proppant-containing fluid pulse proppant compositions differ in at least one proppant composition property including proppant type, proppant size, proppant shape, and concentrations of each proppant type, size, shape, or mixtures thereof and mixtures or combinations thereof.

Figure 2C:
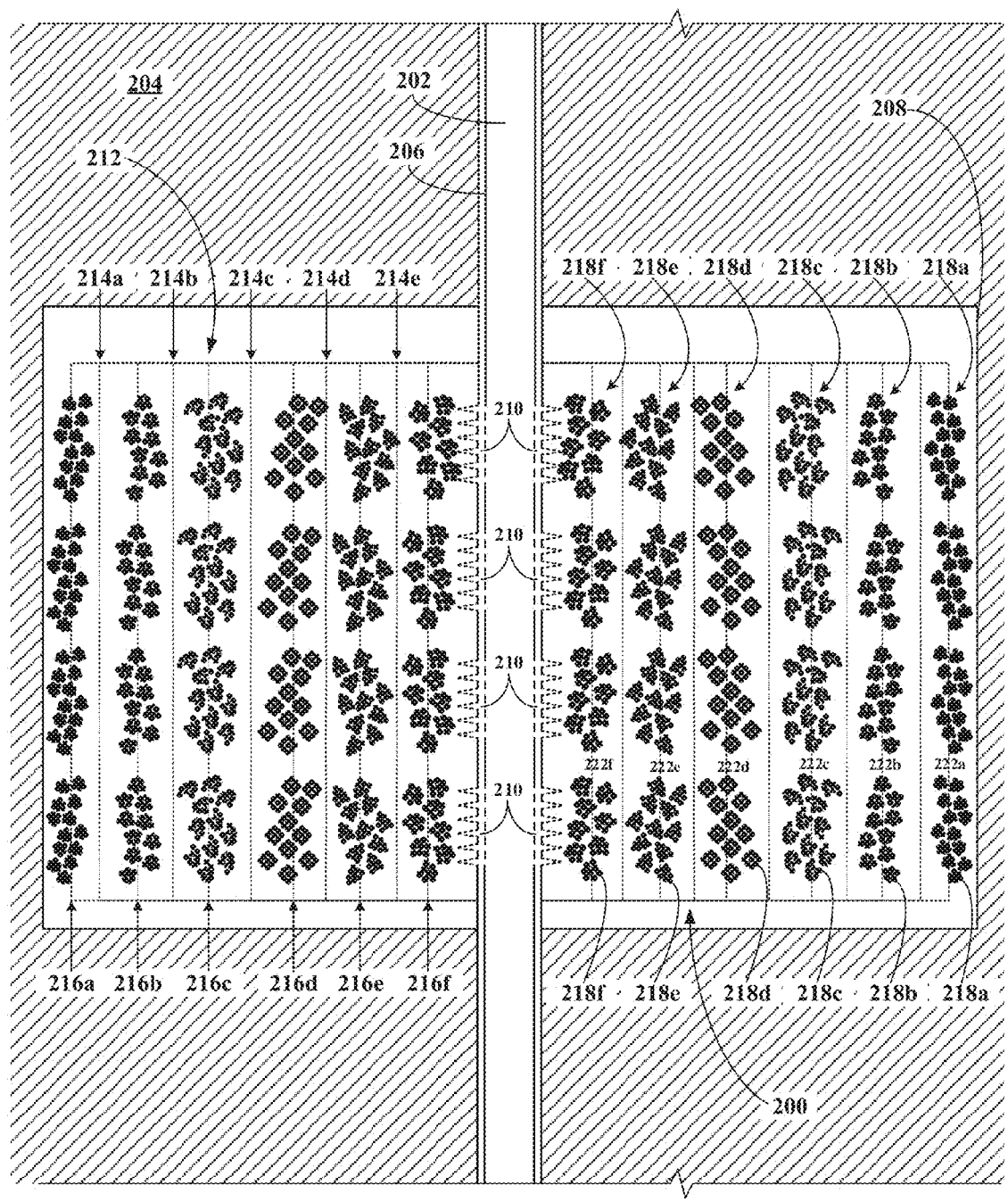
FIG. 2C depicts an embodiment a proppant pattern or network within an illustrative square fracture.

Referring now to FIG. 2C, an embodiment of a proppant pattern established in a formation penetrated by a well bore by a proppant placement stage, generally 200, is shown to include a well bore 202 penetrating a formation 204. The well bore 202 includes a cemented or uncemented casing string 206 and a illustrative square fracture 208 formed in the formation 204 through a plurality of perforations 210 in the string 206 by a viscosified pad fluid injected into the formation 204 at a sufficient pressure to form the fracture 208. The fracture 208 includes a proppant pattern 212 formed by the proppant placement stage 200 including a plurality of proppant-free fluid pulses 214a-e and an alternating plurality of proppant-containing fluid pulses 216a-f. The proppant pattern 212 comprises a set of proppant networks 218a-f including proppant pillar groups 220a-f and major flow pathways 222a-f and minor flow pathways within pillar groups (not shown, but evident from the groups). The proppant-containing fluid pulses 216a-f have the same or different proppant compositions (shown here as different) giving rise to the same or different proppant pillars 220a-f (shown here as different), where the proppant-containing fluid pulse proppant compositions differ in at least one proppant composition property including proppant type, proppant size, proppant shape, and concentrations of each proppant type, size, shape, or mixtures thereof and mixtures or combinations thereof.

Figure 2D:
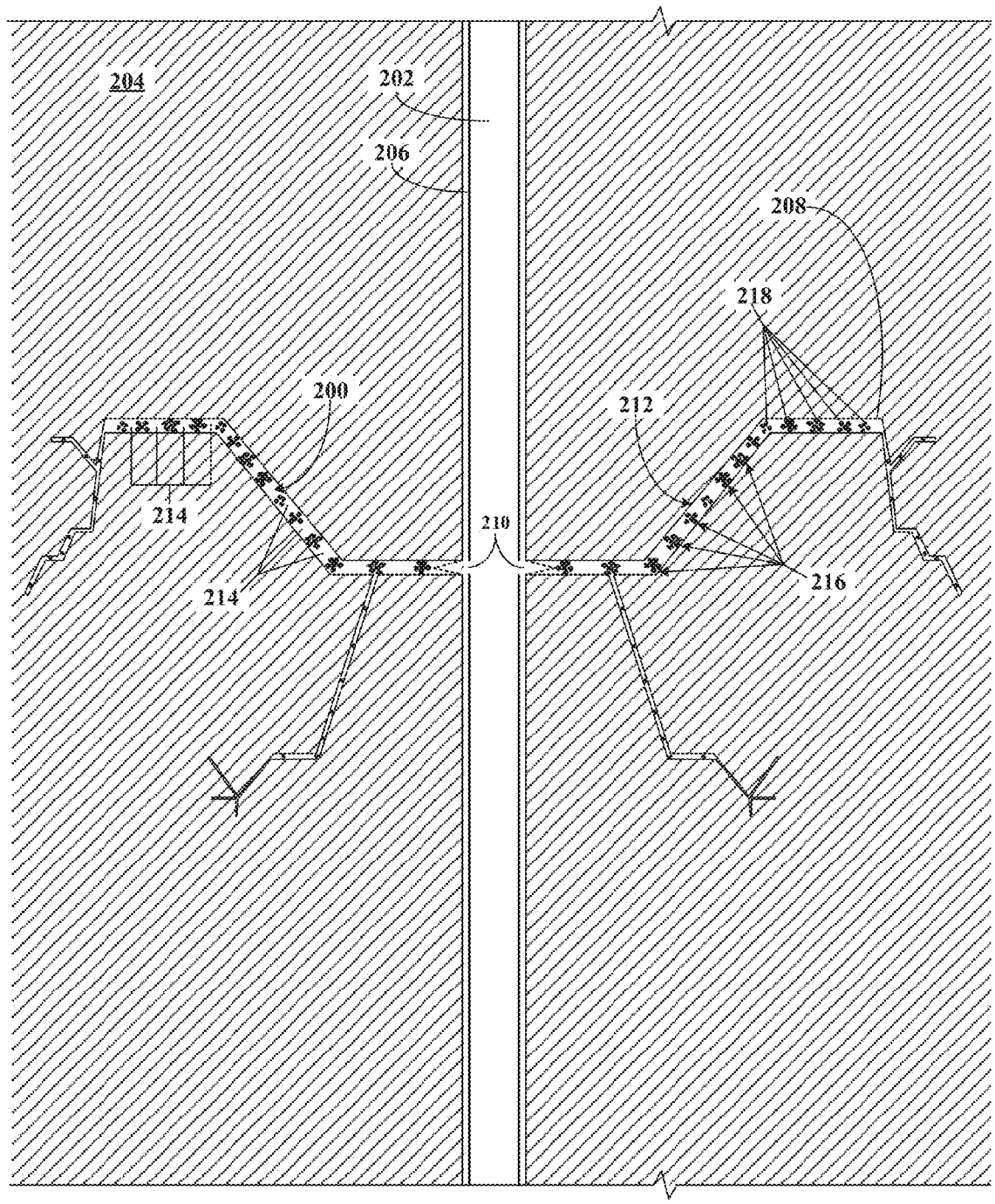
FIG. 2D depicts an embodiment a proppant pattern or network within a branched fracture.

Referring now to FIG. 2D, an embodiment of a proppant pattern established in a formation penetrated by a well bore by a proppant placement stage, generally 200, is shown to include a well bore 202 penetrating a formation 204. The well bore 202 includes a cemented or uncemented casing string 206 and a highly branched fracture 208 formed in the formation 204 through perforations 210 in the string 206 by a viscosified pad fluid injected into the formation 204 at a sufficient pressure to form the fracture 208. The fracture 208 includes a proppant pattern 212 formed by the proppant placement stage 200 including a plurality of proppant-free fluid pulses 214 and an alternating plurality of proppant-containing fluid pulses 216. The proppant pattern 212 comprises proppant pillars 218 and flow pathways within pillar groups (not shown). The proppant-containing fluid pulses 216 may have the same or different proppant compositions (shown here as different) giving rise to the same or different proppant pillars 218 (shown here as different), where the proppant-containing fluid pulse proppant compositions differ in at least one proppant composition property including proppant type, proppant size, proppant shape, and concentrations of each proppant type, size, shape, or mixtures thereof and mixtures or combinations thereof.

Figure 2E:
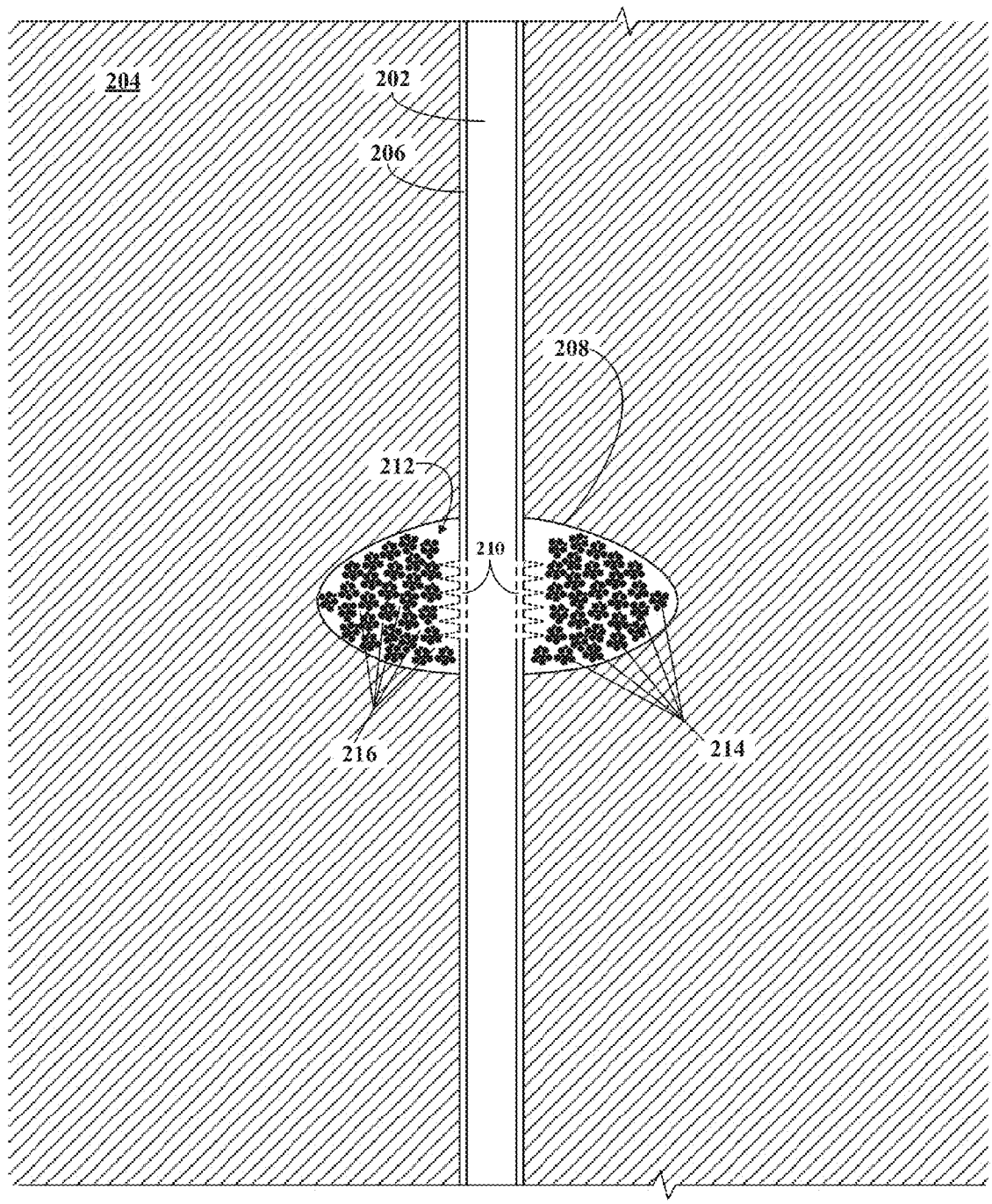
FIG. 2E depicts an embodiment a proppant pattern or network within a frac pack.

Referring now to FIG. 2E, an embodiment of a frac pack pattern established in a formation penetrated by a well bore, generally 200, is shown to include a well bore 202 penetrating a formation 204. The well bore 202 includes a cemented or uncemented casing string 206 and a frac pack 208 formed in the formation 204 through a plurality of perforations 210 in the string 206 by a viscosified proppant-containing fluid injected into the formation 204 at a sufficient pressure to form the frac pack 208. The frac pack 208 includes a proppant pillar pattern 212 including a plurality of proppant pillars 214 and a plurality of flow pathways 216 therethrough.

Referring now to FIGS. 3A-I, nine different pillar configurations are illustrated, each configuration including different proppant types in different arrangements. Looking at FIG. 3A, a regular proppant configuration 300 is shown to include treated solid proppant particles 302 having an aggregating composition coating 304 thereon. Looking at FIG. 3B, an irregular proppant configuration 306 is shown to include treated solid proppant particles 308 having an aggregating composition coating 310 thereon and hollow untreated proppant particles 312. Looking at FIG. 3C, another irregular proppant configuration 314 is shown to include treated hollow proppant particles 316 having an aggregating composition coating 318 thereon and solid untreated proppant particles 320. Looking at FIG. 3D, another irregular proppant configuration 322 is shown to include two different sized treated solid proppant particles 324 and 326 having an aggregating composition coating 328 and 330 thereon. Looking at FIG. 3E, another irregular proppant configuration 332 is shown to include treated solid regular shaped proppant particles 334 having an aggregating composition coating 336 thereon, treated solid irregular shaped proppant particles 338 having an aggregating composition coating 340 thereon, and untreated solid regular proppant particles 342. Looking at FIG. 3F, another irregular proppant configuration 344 is shown to include treated solid regular proppant particles 346 having an aggregating composition coating 348 thereon and untreated solid regular proppant particles 350. Looking at FIG. 3G, another regular proppant configuration 352 is shown to include treated solid regular proppant particles 354 having an aggregating composition coating 356 thereon and a non-erodible fibers 358 entangled with and partially surrounding the cluster. Looking at FIG. 3H, another irregular proppant configuration 360 is shown to include treated solid regular proppant particles 362 having an aggregating composition coating 364 thereon and untreated solid regular proppant particles 366 and an entangled non-erodible fiber 368. Looking at FIG. 3I, another irregular proppant configuration 370 is shown to include treated solid regular proppant particles 372 having an aggregating composition coating 374 thereon and untreated hollow regular proppant particles 376 and surrounding non-erodible fibers 378. Of course, it should be recognized that any given fracturing application may include any of this proppant groups in any relative proportions.

Referring now to FIGS. 4A-J, ten different pillar groups are illustrated, each group including four pillars, each figure having a different proppant pillar type differing in proppant particle type and pillar pillar configuration. Looking at FIG. 4A, a pillar group configuration 400 is shown to include four irregular proppant pillars 402 including treated solid regular proppant particles 404 and untreated regular proppant particles 406. Looking at FIG. 4B, another pillar group configuration 408 is shown to include four regular proppant pillars 410 including treated solid regular proppant particles 412. Looking at FIG. 4C, a pillar group configuration 414 is shown to include four irregular proppant pillars 416 including treated solid regular proppant particles 418 and untreated hollow regular proppant particles 420. Looking at FIG. 4D, a pillar group configuration 422 is shown to include four irregular proppant pillars 424 including treated solid regular proppant particles 426, treated solid irregular proppant particle 428 and untreated regular proppant particles 430. Looking at FIG. 4E, a pillar group configuration 432 is shown to include four irregular proppant pillars 434 including two different sized treated solid proppant particles 436 and 438. Looking at FIG. 4F, a pillar group configuration 440 is shown to include four irregular proppant pillars 442 including treated hollow regular proppant particles 444 and untreated solid regular proppant particles 446. Looking at FIG. 4G, a pillar group configuration 448 is shown to include six different proppant pillar types 450a-f including different treated solid proppant particles 452 and different untreated proppant particles 454. Looking at FIG. 4H, a pillar group configuration 456 is shown to include two irregular proppant pillar types 458a&b including treated solid regular proppant particles 460 and untreated regular proppant particles 462. Looking at FIG. 4I, a pillar group configuration 464 is shown to include two irregular proppant pillar types 466a&b including different treated solid proppant particles 468 and different untreated proppant particles 470. Looking at FIG. 4J, a pillar group configuration 472 is shown to include regular and irregular proppant pillar types 474a&b including different treated solid regular proppant particles 476 and different untreated particles 478.

Referring now to FIGS. 5A-D, four perforation patterns are illustrated, each pattern including different perforation groups separated by non-perforation spans. Looking at FIG. 5A, a perforation interval 500 is shown in a well bore 502 that my be cased with a cemented or non-cemented casing 504. The interval 500 includes two perforation groups 506 and 508. The perforation group 506 comprises six tightly spaced perforations 510, while the second group 508 includes a single perforation 512. Looking at FIG. 5B, a perforation interval 520 is shown in a well bore 522 that my be cased with a cemented or non-cemented casing 524. The interval 520 includes two perforation groups 526 and 528. The perforation group 526 comprises six tightly spaced perforations 530, while the second group 528 includes three tightly spaced perforations 532. Looking at FIG. 5C, a perforation interval 540 is shown in a well bore 542 that my be cased with a cemented or non-cemented casing 544. The interval 540 includes three perforation groups 546, 548, and 550. The perforation group 546 comprises five tightly spaced perforations 552; the second group 548 includes three tightly perforations 554; and the third perforation group 550 includes three tightly perforations 556. Looking at FIG. 5D, a perforation interval 560 is shown in a well bore 562 that my be cased with a cemented or non-cemented casing 564. The interval 560 includes three perforation groups 566, 568, and 570. The perforation group 566 comprises four less tightly spaced perforations 572; the second group 568 includes three tightly perforations 574; and the third perforation group 570 includes six tightly spaced perforations 576. It should be recognized that the above perforation intervals are simply included as illustrations of different perforation configuration. These intervals may be repeated in blocks in patterns to produce long or short perforation configurations. Additionally, it should be recognized that dimensions of the perforation may be adjusted so that each group of perforation will selectively permit different proppant particles sizes therethrough.

Experiments of the Invention

Referring now to FIG. 6, a table is shown that provides zeta potential ranges and corresponding aggregating propensities. Maximal aggregating potential or propensity is associated with zeta potentials between +3 mV and −5 mV; strong aggregating potential or propensity is associated with zeta potentials between −5 mV and −10 mV; medium to weak aggregating potential or propensity is associated with zeta potentials between −10 mV and −15 mV; a threshold aggregating potential or propensity is associated with zeta potentials between −16 mV and −30 mV; and low or little aggregating potential or propensity is associated with zeta potentials between −31 mV and −100 mV or lower.

FIG. 6 also includes experimental data of untreated silica and silica treated with the aggregating agent SandAid™, an amine-phosphate reaction product type aggregating agent available from Weatherford International, which forms a partial or complete coating on the silica altering the aggregating propensity of the treated silica. In fact, untreated silica have a zeta potential of about −47.85 mV, while the SandAid™ treated silica has a zeta potential of about −1.58 mV, thus, changing a non-aggregating proppant into a maximally aggregating proppant. Similarly, untreated coal which as a zeta potential of about −28.37 mV, a threshold aggregating proppant, when treated with SandAid™, the untreated coal is converted into a treated coal proppant having a zeta potential of about 1.194 mV, converting the threshold aggregating proppant into a maximally aggregating proppant. By changing the relative amounts of treated and untreated silica or coal, one may readily adjust the bulk or relative zeta potential of a proppant composition for used in the proppant-containing fracturing fluids of this invention.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A composition for forming proppants islands within a formation or zone thereof, where the composition comprises: a fracturing fluid containing from about 1 to about 8 lbs of a treated proppant per gal of the fracturing fluid, where the treated proppant comprises a proppant having a partial or complete coating of a zeta potential altering composition consisting of an amine-phosphate reaction product; an amine component selected from the group consisting of aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, imidazole and alkyl imidazole or mixtures of alkyl imidazole, pyrazine and alkyl pyrazine or mixture of alkyl pyrazine, acridine and alkyl acridine or mixture of alkyl acridine, pyrimidine and alkyl pyrimidine or mixture of alkyl pyrimidine, and quinazoline and alkyl quinazoline or mixture of alkyl quinazoline; or mixtures and combinations thereof.

2. The proppant islands and composition of claim 1, further comprising: an untreated proppant, a non-erodible fiber, and an erodible material comprising erodible particles, erodible fibers, or mixtures and combinations thereof.

3. A re-healable proppant island comprising: a composition for forming proppant islands as claimed in claim 1, wherein the amount of the treated proppant is sufficient: (a) to allow formation of proppant islands in fractures formed in a formation or zone thereof during fracturing operations and to maintain the proppant islands substantially intact, if the proppant islands and/or particles within the proppant islands move within the formation during and/or after fracturing operations, or during injection operations, or during production operations, or (b) to allow formation of proppant islands in fractures formed in a formation or zone thereof during fracturing operations, to allow the proppant islands to re-heal or break apart and reform during and/or after fracturing operations, or during injection operations, or during production operations maintaining high fracture conductivity, and to capture formation fines during and/or after fracturing operations, or during injection operations, or during production operations.

4. A self healing proppant island comprising: a composition for forming a proppant island as claimed in claim 1, wherein the amount of the treated proppant is sufficient: (a) to allow formation of proppant islands in fractures formed in a formation or zone thereof and to allow the islands to break apart and reform without substantial loss in proppant during and/or after fracturing operations, or during injection operations, or during production operations, or (b) to allow formation of proppant islands in fractures formed in a formation or zone thereof, to allow the islands to break apart and reform without substantial loss in proppant during and/or after fracturing operations, or during injection operations, or during production operations, and to capture formation fines during and/or after fracturing operations, or during injection operations, or during production operations.

* * * * *